United States Patent
Blumenau et al.

(10) Patent No.: US 6,988,130 B2
(45) Date of Patent: *Jan. 17, 2006

(54) VIRTUAL PORTS FOR PARTITIONING OF DATA STORAGE

(75) Inventors: Steven M. Blumenau, Holliston, MA (US); Yoav Raz, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 573 days.

This patent is subject to a terminal disclaimer.

(21) Appl. No.: 10/139,490

(22) Filed: May 6, 2002

(65) Prior Publication Data

US 2002/0194294 A1 Dec. 19, 2002

Related U.S. Application Data

(63) Continuation of application No. 09/106,299, filed on Jun. 29, 1998, now Pat. No. 6,421,711.

(51) Int. Cl.
G06F 15/167 (2006.01)

(52) U.S. Cl. .................. 709/213; 709/228; 709/229; 709/200

(58) Field of Classification Search ......... 709/213–215, 709/228, 229; 345/512; 711/147; 370/438, 370/235; 714/798, 5, 6; 379/245; 710/37; 725/115
See application file for complete search history.

(56) References Cited

U.S. PATENT DOCUMENTS

| | | | |
|---|---|---|---|
| 4,207,609 A | 6/1980 | Luiz et al. | 364/200 |
| 4,577,272 A | 3/1986 | Ballew et al. | 364/200 |
| 4,959,856 A * | 9/1990 | Bischoff et al. | 379/245 |
| 4,961,224 A | 10/1990 | Yung | 380/25 |
| 5,146,605 A | 9/1992 | Beukema et al. | 395/575 |
| 5,206,939 A | 4/1993 | Yanai et al. | 395/400 |
| 5,321,813 A * | 6/1994 | McMillen et al. | 714/798 |
| 5,321,816 A | 6/1994 | Rogan et al. | 395/200 |
| 5,335,352 A | 8/1994 | Yanai et al. | 395/800 |
| 5,381,539 A | 1/1995 | Yanai et al. | 395/425 |
| 5,434,850 A | 7/1995 | Fielding et al. | 370/321 |

(Continued)

FOREIGN PATENT DOCUMENTS

WO  WO 97/16023  5/1997

OTHER PUBLICATIONS

An IRAM–Based Architecture for a Single–Chip ATM Switch—Papaefstathiou Brown Simer (1997) ; www.ics-.forth.gr/~ygp/PUB/icecs99.pdf.*

(Continued)

*Primary Examiner*—Thong Vu
(74) *Attorney, Agent, or Firm*—Richard C. Auchterlone; Novak Druce & Quigg, LLP

(57) ABSTRACT

A storage controller has at least one physical data port for a data network including host processors. The storage controller is programmed to provide a plurality of virtual ports for access to storage, and a virtual switch for routing storage access requests from the physical port to the virtual ports. The virtual ports and the virtual switch are defined by software. The virtual ports appear to the hosts as physical ports in the data network. For example, in a Fiber-Channel network, the virtual ports have World Wide Names (WWNs) and are assigned temporary addresses (S_IDs), and the virtual switch provides a name server identifying the WWNs and S_IDs of the virtual ports. For convenient partitioning of storage among host processors, one or more virtual ports are assigned to each host, and a set of storage volumes are made accessible from each virtual port.

40 Claims, 28 Drawing Sheets

U.S. PATENT DOCUMENTS

| | | | |
|---|---|---|---|
| 5,440,716 A | 8/1995 | Schultz | 395/441 |
| 5,461,611 A | 10/1995 | Drake, Jr. et al. | 370/54 |
| 5,487,155 A * | 1/1996 | Drewry et al. | 370/438 |
| 5,517,494 A | 5/1996 | Green | 370/60 |
| 5,526,414 A | 6/1996 | Bedárd et al. | 379/221 |
| 5,528,755 A | 6/1996 | Beardsley et al. | 395/185.01 |
| 5,544,313 A | 8/1996 | Shachnai et al. | 395/200.01 |
| 5,544,327 A | 8/1996 | Dan et al. | 395/250 |
| 5,544,347 A | 8/1996 | Yanai et al. | 395/489 |
| 5,553,160 A | 9/1996 | Dawson | 382/166 |
| 5,557,611 A | 9/1996 | Cappellari et al. | 370/60.1 |
| 5,568,629 A | 10/1996 | Gentry et al. | 395/441 |
| 5,579,475 A | 11/1996 | Blaum et al. | 395/182.05 |
| 5,583,995 A | 12/1996 | Gardner et al. | 395/200.09 |
| 5,619,497 A | 4/1997 | Gallagher et al. | 370/394 |
| 5,630,067 A | 5/1997 | Kindell et al. | 395/200.09 |
| 5,634,111 A | 5/1997 | Oeda et al. | 395/480 |
| 5,646,676 A | 7/1997 | Dewkett et al. | 348/7 |
| 5,657,468 A | 8/1997 | Stallmo et al. | 395/441 |
| 5,680,580 A * | 10/1997 | Beardsley et al. | 714/6 |
| 5,689,678 A | 11/1997 | Stallmo et al. | 395/441 |
| 5,727,151 A | 3/1998 | Sugahara et al. | 709/231 |
| 5,734,830 A | 3/1998 | Balogh et al. | 709/208 |
| 5,740,422 A | 4/1998 | Foltz et al. | 395/609 |
| 5,742,792 A | 4/1998 | Yanai et al. | 395/489 |
| 5,748,905 A | 5/1998 | Hauser et al. | 709/249 |
| 5,768,623 A * | 6/1998 | Judd et al. | 710/37 |
| 5,774,660 A | 6/1998 | Brendel et al. | 395/200.31 |
| 5,778,426 A | 7/1998 | DeKoning et al. | 711/122 |
| 5,787,459 A | 7/1998 | Stallmo et al. | 711/112 |
| 5,790,176 A * | 8/1998 | Craig | 725/115 |
| 5,793,385 A | 8/1998 | Nale | 345/515 |
| 5,796,966 A | 8/1998 | Simcoe et al. | 395/311 |
| 5,802,301 A | 9/1998 | Dan et al. | 395/200.53 |
| 5,825,772 A | 10/1998 | Dobbins et al. | 370/396 |
| 5,860,137 A | 1/1999 | Raz et al. | 711/202 |
| 5,862,403 A | 1/1999 | Kanai et al. | 395/826 |
| 5,884,103 A | 3/1999 | Terho et al. | 395/892 |
| 5,892,915 A | 4/1999 | Duso et al. | 395/200.49 |
| 5,892,924 A | 4/1999 | Lyon et al. | 709/245 |
| 5,893,140 A | 4/1999 | Vahalia et al. | 711/118 |
| 5,893,919 A | 4/1999 | Sarkozy et al. | 711/114 |
| 5,901,327 A | 5/1999 | Ofek et al. | 395/325 |
| 5,907,837 A | 5/1999 | Ferrel et al. | 707/3 |
| 5,914,939 A | 6/1999 | Serkowski et al. | 370/254 |
| 5,920,893 A | 7/1999 | Nakayama et al. | 711/147 |
| 5,930,827 A | 7/1999 | Sturges | 711/170 |
| 5,935,205 A | 8/1999 | Murayama et al. | 709/216 |
| 5,940,612 A | 8/1999 | Brady et al. | 709/103 |
| 5,948,062 A | 9/1999 | Tzelnic et al. | 709/219 |
| 5,951,694 A | 9/1999 | Choquier et al. | 714/15 |
| 5,959,968 A | 9/1999 | Chin et al. | 370/216 |
| 5,974,453 A | 10/1999 | Andersen et al. | 709/220 |
| 5,978,951 A | 11/1999 | Lawler et al. | 714/758 |
| 5,991,793 A | 11/1999 | Mukaida et al. | 709/104 |
| 6,006,342 A * | 12/1999 | Beardsley et al. | 714/5 |
| 6,009,535 A | 12/1999 | Halligan et al. | 714/5 |
| 6,011,910 A * | 1/2000 | Chau et al. | 709/229 |
| 6,023,281 A | 2/2000 | Grigor et al. | 345/512 |
| 6,026,441 A | 2/2000 | Ronen | 709/227 |
| 6,044,442 A | 3/2000 | Jesionowski | 711/153 |
| 6,085,234 A | 7/2000 | Pitts et al. | 709/217 |
| 6,092,096 A | 7/2000 | Lewis | 709/200 |
| 6,111,894 A | 8/2000 | Bender et al. | 370/469 |
| 6,119,121 A | 9/2000 | Zhu | 707/101 |
| 6,141,689 A * | 10/2000 | Yasrebi | 709/228 |
| 6,145,028 A | 11/2000 | Shank et al. | 710/31 |
| 6,160,813 A | 12/2000 | Banks et al. | 370/422 |
| 6,161,104 A | 12/2000 | Stakutis et al. | 707/10 |
| 6,167,446 A | 12/2000 | Lister et al. | 709/223 |
| 6,173,306 B1 | 1/2001 | Raz et al. | 709/102 |
| 6,185,188 B1 * | 2/2001 | Hasegawa | 370/235 |
| 6,185,601 B1 | 2/2001 | Wolff | 709/203 |
| 6,192,408 B1 | 2/2001 | Vahalia et al. | 709/229 |
| 6,209,023 B1 | 3/2001 | Dimitroff et al. | 709/211 |
| 6,260,120 B1 | 7/2001 | Blumenau et al. | 711/152 |
| 6,263,445 B1 | 7/2001 | Blumenau | 713/201 |
| 6,278,705 B1 | 8/2001 | Chau et al. | 370/352 |
| 6,295,575 B1 | 9/2001 | Blumenau et al. | 711/5 |
| 6,421,711 B1 * | 7/2002 | Blumenau et al. | 709/213 |

OTHER PUBLICATIONS

Virtual Port API Developer's Reference Manual (6567–10): Introduction; www.nmss.com/manuals/6567–10/chap1.htm.*

Upgrading NETBuilder Family Software; support.3com.com/infodeli/tools/bridrout/u_guides/html/nb1 . . . mily/upgrade/umgneed2.htm.*

Fibre Channel—FAQ's Answers, Technology, Mar. 18, 1998, pp. 1–15; http://www.fibrechannel.com/technology/answer.htm.

Fiber Channel Tutorial, Technology, pp 1–8, Mar. 7, 1998, pp. 1–8; http://www.fibrechannel.com/technology/tutorial, htm.

Networking Group, Internet–Draft, Paul J. Leach, Dilip C. Naik, "A Common Internet File System (CIFS/1.0) Protocol", Dec. 19, 1997, pp. 1–121.

Fibre Channel Overview, Zoltán Meggyesi, KFKI–RMKI, Research Institute for Particle and Nuclear Physics, Dec. 9, 1997; pp 1–10, http://www1.cern.ch/HSI/fcs/spec/overview.htm.

Fibre Channel, TR–20–199x, "Fabric Loop Attachment" (FC–FLA) Rev. 2.7, NCITS Working Draft Proposed Technical Report, Aug. 12, 1997, pp. i–xiv, 1–122.

TINA, "A Common Software Architecture for Multimedia and Information Services" Emmanuel Darmois, Motoo Hoshi, Aug. 9, 1997, pp. 1–6. http://www.tinac.com/about/nutshell.htm.

IEEE/IEEE Electronic Library, "Performance Model of the Argonne Voyager" Dixz, T.; Olson, R; Steven, R.; Div. of Math & Comput.Sci., Argonne Nat. Lab, IL, USA; Application–Specific Systems, Architectures and Processors 1997, Conference held: Jul. 14–16, 1997, pp. 316–327.

IEEE/IEE Electronic Library, "Scheduling for Interactive Operations in Parallel Video Servers" Min–You Wu; Wei Shu, Dept. of Comput. Sci., State Univ. of New York, Buffalo, NY; Multimedia Computing and Systems '97, Jun. 3–6, 1997, pp. 178–185.

IEEE/IEE Electronic Library, "On The Efficient Retrieval of VBR Video in a Multimedia Server" Sambit Shau; Zhi–Li Zhang; Kurose, J.; Towsley, D. Dept. of Comput. Sci., Massachusetts Univ., MA. Multimedia Computing and Systems '97, Jun. 3–6, 1997, pp. 46–53.

IEEE/IEE ELectronic Library, "Scheduling of Storage and Cache Servers For Replicated Multimedia Data" Park Kyeongho; Yanghee Choi; Chong Sang Kim, Dept. of Comput. Eng., Seoul Nat. Univ., South Koria; High Performance Computing on the Information Superhighway, 1997 HPC Asia '97, Apr. 18–May 1, 1997, pp. 484–487.

Fibre Channel, Fabric Generic Requirements (FC–FG) Rev. 3.5; ANSI X3.289–199x; X3T11/Project 958–D; Working Draft Proposed American National Standard for Information Systems, Aug. 7, 1996, pp. i–x, 1–23.

IEEE/IEE Electronic Library, "The Design and Implementation of a Multimedia Storage Server to Support Video–On– Demand Applications" Molano, A.; Garcia–Martinez, A.; Vina A.; Univ. Autonoma de Madrid, Spain; EUROMICRO Conference, Sep. 2–5, 1996, pp. 564–571.

IEEE/IEE Electronic Library; "Techniques for Increasing the Stream Capacity of a Multimedia Server" Jadav, D.; Choudhary, A.; ECE Dept., Syracuse Univ., NY, $3^{rd}$ Intl. Conf. on High Performance Computing, Dec. 19–22, 1996, pp. 43–48.

IEEE/IEE Electronic Library, "MMPacking: A Load and Storage Balancing Algorithm for Distributed Multimedia Servers" Serpanos, D.N.; Georgiadis, L.; Bouloutas, T.; IBM Thomas J. Watson Res. Center, Yorktown Heights, NY;1996 IEEE Int'l Conf. on Computer Design VLSI in Computers and Processors, Oct. 7–9, 1996, pp. 170–174.

Fibre Channel, Generic Services (FC–GS) Rev. 3.1, dpANS X3.288–199X X3T11/Project 1050D; Working Draft Proposed American National Standard for Information Systems, Aug. 7, 1996, pp. i–xiv, 1–84.

RFC 1910, RFC Archive; "User–Based Security Model for SNMPv2", G. Waters, Editor, Bell–Northern Research Ltd., Feb. 1996, pp. 1–40.

IEEE/IEE Electronic Library, "High–Performance VOD Server AIMS" Nishikawa, K.; Egawa, H.; Kawai, O.; Inamoto, Y.; Fujitsu Labs. Ltd., Kawasaki, Japan; Global Telecommunications Conference, Nov. 13–17, 1995, pp. 795–798.

Fibre Channel Arbitrated Loop (FC–AL) Rev. 4.5; X3.272–199x X3T11/Project 960D; Working Draft Proposal American National Standard For Information Technology, Jun. 1, 1995, pp. i–x, 1–92.

IEEE/IEE Electronic Library, "Multimedia Servers–design and Performance" Ghafir, H.; Chadwick, H.; IBM Corp., Bethesda, MD; Global Telecommunications Conference, Nov. 28–Dec. 2, 1994, pp. 886–890.

IEEE/IEE Electronic Library, "Multimedia Storage Servers: A Tutorial" Gemmell, D.J.; Vin, H.M.; Kandlur, D.D.; Venkat Rangan, P.; Rowe, L.A.; Simon Fraser Univ., Burnaby, BC, Canada; Computer, May 1995, pp. 40–49.

IEEE/IEE Electronic Library, "An Observation–Based Admission Control Algorithm For Multimedia Servers" Vin, H.M.; Goyal, A.; Goyal P.; Dept. of Comput. Sci., Texas Univ., Austin, TX; International Conference on Multimedia Computing and Systems, 1994, May 15–19, 1994, pp. 234–243.

"Symmetrix Model 55XX Product Manual, P/N 200–810–550 Rev D" EMC Corporation, Hopkinton, Mass., May 1994, pp. 1–236.

IEEE/IEE Electronic Library, "Data Organization and Storage Hierarchies in a Multimedia Server" Christodoulakis, S.; Anestopoulos, D; Argyropoulos, S.; Tech. Univ. of Crete, Chania, Greece; Compcon Spring '93, Feb. 22–26, 1993, pp. 596–604.

Lev Vaitzblitr, "The Design and Implementation of a High–Bandwidth File Server for Continuous Media" Thesis, Master of Science, Massachusetts Institute of Technology, Cambridge, Mass., Sep. 1991, pp. 1–95.

J. Case, M. Fedor, M. Schoffstall, J. Davin, "A Simple Network Management Protocol (SNMP)," May 1990, MIT Laboratory for Computer Science, Cambridge, Mass., pp. 1–35.

Ulyless Black, "TCP/IP and Related Protocols", McGraw–Hill, Inc., New York, N.Y., pp. 304–130.

* cited by examiner

| VOLUME GROUP NAME | HOST CONTROLLER WWN | HOST CONTROLLER S_ID | PRIVATE /SHARED FLAG | VOLUME LIST POINTER |
|---|---|---|---|---|
| HOST 22-1 | 0276ADF1 | 0000B8 | 1 | 0472 |
| HOST 23-2 | 0276ADC2 | 0000B9 | 0 | 0476 |
| HOST 24-2 | 0276AE32 | 0001A7 | 0 | 048E |
| HOST 25-1 | 0276AE51 | 0001A6 | 1 | 04AO |
| ⋮ | ⋮ | ⋮ | ⋮ | ⋮ |

*Fig. 5*

| |
|---|
| BEGINNING VOLUME No. |
| ENDING VOLUME No. |
| STRIDE-1 |

*Fig. 6*

| VOLUME GROUP NAME | HOST CONTROLLER WWN | PRIVATE /SHARED FLAG | VOLUME BITMAP | VOLUME LIST | PORT ADAPTER INDEX LIST |
|---|---|---|---|---|---|
| — | — | — | — | — | — |
| — | — | — | — | — | — |
| ... | ... | ... | ... | ... | ... |

*Fig. 8*

| HOST CONTROLLER S_ID | PRIVATE /SHARED FLAG | VOLUME BITMAP | PERSISTENT TABLE INDEX |
|---|---|---|---|
| — | — | — | — |
| — | — | — | — |
| ... | ... | ... | ... |

*Fig. 9*

| SID MODULUS | LISTS OF S_IDs AND TRANSIENT TABLE INDICES |
|---|---|
| 0 | (S_ID, INDEX), (S_ID, INDEX), ... |
| 1 | (S_ID, INDEX), (S_ID, INDEX), ... |
| ... | ... |

*Fig. 10*

| LUN | VOL_No. |
|---|---|
| 1 | 8 |
| 2 | 10 |
| 3 | 12 |
| 8 | 16 |
| 9 | 18 |
| 10 | 20 |
| ⋮ | ⋮ |

VOL_LIST_PTR → (210, 211)

Fig. 19

| LUN | N | VOL_No. | S |
|---|---|---|---|
| 1 | 3 | 8 | 2 |
| 8 | 3 | 16 | 2 |
| ⋮ | ⋮ | ⋮ | ⋮ |

VOL_LIST_PTR → (220, 211)

Fig. 20

| HOST_ID | PORT_A/B | WWN | S_ID | V_PORT INDEX | V_PORT LIST POINTER |
|---|---|---|---|---|---|
| – | – | – | – | – | – |
| – | – | – | – | – | – |
| ⋮ | ⋮ | ⋮ | ⋮ | ⋮ | ⋮ |

| V_PORT_ID | HOST INDEX | PRIVATE/ SHARED FLAG | LUN TO LOGICAL VOLUME MAP |
|---|---|---|---|
| – | – | – | ------ |
| – | – | – | ------ |
| ⋮ | ⋮ | ⋮ | |

STORAGE SUBSYSTEM 1
ADAPTER PORT 1A

VIRTUAL PORT 1

VIRTUAL PORTS FOR PARTITIONING OF DATA STORAGE

RELATED APPLICATIONS

This application is a continuation of application Ser. No. 09/106,299 filed Jun. 29, 1998, now U.S. Pat No. 6,421,711 incorporated herein by reference.

BACKGROUND OF THE INVENTION

1. Technical Field

The present invention relates generally to data processing networks and data storage subsystems, and more particularly to a data processing network in which a large number of hosts can access volumes of data storage in a data storage subsystem.

2. Description of the Related Art

Due to advances in computer technology, there has been an ever increasing need for data storage in data processing networks. In a typical data processing network, there has been an increase in the number of volumes of data storage and an increase in the number of hosts needing access to the volumes. This has been especially true for networks of workstations. Not only have a greater number of workstations been added to the typical network, but also the increase in data processing capabilities of a typical workstation has required more data storage per workstation for enhanced graphics and video applications.

The increased demand for data storage in a network is typically met by using more storage servers in the network or by using storage servers of increased storage capacity and data transmission bandwidth. From the standpoint of cost of storage, either of these solutions appears to be satisfactory. However, a greater number of storage servers in a network substantially increases the cost of managing the storage. This increased cost of management often appears some time after installation, when one of the servers reaches its capacity and some of its volumes must be reassigned to less heavily loaded servers. Network administrators aware of the cost of storage management realize that network storage should be consolidated to the minimum possible number of servers. The management problem is reduced by reducing the number of objects to be managed.

Due to the storage needs of present networks and the desire to consolidate servers, it is practical to provide a single storage subsystem with up to 20 terabytes (TB) storage, or approximately 4000 logical volumes. It may be possible for any host to have access to any volume in a data storage subsystem to which the host has access. However, it may be desirable to restrict the set of volumes that can be seen by any one host. Restricted access is desirable for security of private data. For example, private volumes should be assigned to each host for storage of private data, and other hosts should not be permitted to see or modify the private volumes of other hosts. Moreover, the "boot" process for a host is slowed down by searching for and reporting all the volumes to which the host has access. Certain operating systems are limited by the number of storage devices that they can manage at a given period of time, and for a host running such an operating system, it is not only desirable but also necessary to limit the number of volumes that the host can access.

It is possible to restrict access of a host to a limited set of logical volumes in the data storage subsystem by restricting the set of logical volumes accessible through a particular port adapter of the storage subsystem and linking the host to only that particular port adapter. For convenience, however, there should not be any restrictions on which logical storage volumes are accessible from each port adapter. Otherwise, during a reconfiguration of the data processing system, it may be necessary to physically switch the links that are connected to the network ports of the hosts or the port adapters, for example by manually disconnecting and reconnecting the links to the ports. Even in the case where the data network has a fabric for automatically establishing a link between any of the hosts and any of the port adapters, the physical possibility of any port adapter to access any logical storage volume provides alternative data paths that could be used in case of port adapter failure or port adapter congestion. For example, if a host sends a data access request to a port adapter and receives a busy response from the port adapter, then the host can send the data access request to another port adapter. Port adapter congestion is likely, for example, if the storage subsystem is a continuous media server, in which video data is often streamed through a single port adapter to a host for a relatively long period of time.

In open network systems, it is known to use authentication and authorization protocols in order to authenticate that a request for access to a specified file originates from a particular host, and once the request for access is authenticated, to check whether the host is authorized to access the specified file. For example, a network server authenticates the request by checking whether a password in the request matches the hosts' password stored in a client directory, and the network server authorizes the request by checking a file directory to determine whether the host is listed in the file directory as having access rights to the specified file. However, the use of high-level authentication and authorization procedures for discriminating among all access requests by the hosts to the logical storage volumes would unduly burden the host and the storage subsystem. What is desired is a method that may be transparent to any high-level file system procedures that may be used by the hosts for managing access to files stored in the logical volumes to which a host is permitted to access. The method should restrict the logical storage volumes seen by the host during a boot operation, and seen by the operating system when the operating system determines what logical volumes are accessible to the host.

SUMMARY OF THE INVENTION

In accordance with one aspect of the invention, there is provided a data storage subsystem that includes data storage and a storage controller coupled to the data storage for controlling access to the data storage. The storage controller has at least one physical data port for connecting the storage controller into a data network for data transmission between the data storage and host processors in the data network. The storage controller is programmed to provide a plurality of virtual ports that are not physical ports in the data network but that appear to the host processors to be physical ports in the data network that provide access to the data storage and that are connected to the physical data port by a switch in the storage controller for routing storage access requests from the physical data port to the virtual ports.

In accordance with another aspect, the invention provides a data storage subsystem including data storage and a storage controller coupled to the data storage for controlling access to the data storage. The storage controller has at least one physical data port for connecting the storage controller into a data network for data transmission between the data storage and host processors in the data network. The storage controller is programmed to provide a plurality of virtual ports that are not physical ports in the data network but that appear to the host processors to be physical ports in the data network that provide access to the data storage and that are connected to the physical data port by a switch in the storage controller for routing storage access requests from the physical data port to the virtual ports. The storage controller is programmed with a permanent network name for each of the virtual ports, and with a temporary network address for each of the virtual ports. The storage controller is programmed to route from the physical data port to a specified virtual port a storage access request containing a temporary address that specifies the specified virtual port. The storage controller is also programmed to provide access at each virtual port to only a respective assigned subset of the data storage. The storage controller is programmed to permit assignment of more than one virtual port to each host processor such that each host processor may access storage from every virtual port assigned to the host processor. The storage controller is further programmed so that none of the virtual ports is assigned to more than one host processor so that not more than one host processor may access the data storage from any one of the virtual ports.

In accordance with another aspect, the invention provides a machine-readable program storage device containing a program that is executable by a storage controller for controlling access to data storage. The storage controller has at least one physical data port for connecting the storage controller into a data network for data transmission between the data storage and host processors in the data network. The program is executable by the storage controller to provide a plurality of virtual ports that are not physical ports in the data network but that appear to the host processors to be physical ports in the data network that provide access to the data storage and that are connected to the physical data port by a switch in the storage controller for routing storage access requests from the physical data port to the virtual ports.

In accordance with yet another aspect, the invention provides a machine-readable program storage device that is executable by a storage controller for controlling access to data storage. The storage controller has at least one physical data port for connecting the storage controller into a data network for data transmission between the data storage and host processors in the data network. The program is executable by the storage controller to provide a plurality of virtual ports that are not physical ports in the data network but that appear to the host processors to be physical ports in the data network that provide access to the data storage and that are connected to the physical data port by a switch in the storage controller for routing storage access requests from the physical data port to the virtual ports. The program is executable by the storage controller so that the storage controller will have a permanent network name for each of the virtual ports and a temporary network address for each of the virtual ports. The program is executable by the storage controller to route from the physical data port to a specified virtual port a storage access request containing a temporary address that specifies the specified virtual port. The program is executable by the storage controller to provide access at each virtual port to only a respective assigned subset of the data storage. The program is executable by the storage controller to permit assignment of more than one virtual port to each host processor such that each host processor may access storage from every virtual port assigned to the host processor. The program is also executable by the storage controller so that none of the virtual ports is assigned to more than one host processor so that not more than one host processor may access the data storage from any one of the virtual ports.

In accordance with still another aspect, the invention provides a method of operating a storage controller for controlling access to data storage. The storage controller has at least one physical data port for connecting the storage controller into a data network for data transmission between the data storage and host processors in the data network. The method includes the storage controller receiving storage access requests from the host processors at the physical data port, inspecting network addresses in the storage access requests to find network addresses of virtual ports in the storage controller to which the storage access requests are directed, and controlling access to the data storage in accordance with the network addresses of the virtual ports to which the storage access requests are directed. The virtual ports are not physical data ports in the data network, but the storage controller is operated to cause the virtual ports to appear to the host processors to be physical ports in the data network that provide access to the data storage and that are connected to the physical data port by a switch in the storage controller for routing storage access requests from the physical data port to the virtual ports.

In accordance with a final aspect, the invention provides a method of operating a storage controller for controlling access to data storage. The storage controller has at least one physical data port for connecting the storage controller into a data network for data transmission between the data storage and host processors in the data network. The method includes the storage controller receiving storage access requests from the host processors at the physical data port, and inspecting network addresses in the storage access requests to find network addresses of virtual ports in the storage controller to which the storage access requests are directed, and controlling access to the data storage in accordance with the network addresses of the virtual ports to which the storage access requests are directed. The virtual ports are not physical data ports in the data network, but the storage controller is operated to cause the virtual ports to appear to the host processors to be physical ports in the data network that provide access to the data storage and that are connected to the physical data port by a switch in the storage controller for routing storage access requests from the physical data port to the virtual ports. The storage controller maintains a permanent network name for each of the virtual ports and a temporary network address for each of the virtual ports. The storage controller provides access at each virtual port to only a respective assigned subset of the data storage. The storage controller permits assignment of more than one virtual port to each host processor such that each host processor may access storage from every virtual port assigned to the host processor. Moreover, none of the virtual ports is assigned to more than one host processor so that not more than one host processor may access the data storage from any one of the virtual ports.

BRIEF DESCRIPTION OF THE DRAWINGS

Other objects and advantages of the invention will become apparent upon reading the following detailed description with reference to the accompanying drawings wherein:

FIG. 5 is a diagram showing a simplified construction that could be used for the volume access table introduced in FIG. 4;

FIG. 6 is a diagram of a volume list entry defining a vector of logical storage volumes in a disk spread;

FIG. 8 is a diagram showing a preferred construction for a volume access table stored in the cache memory as introduced in FIG. 7;

FIG. 9 is a diagram showing a preferred construction for the volume access table stored in port adapter memory;

FIG. 10 is a diagram of a directory for searching the volume table of FIG. 9;

FIG. 19 is a diagram of a volume list that comprises a mapping table for mapping logical unit numbers (LUNs) to logical storage volume numbers;

FIG. 20 is a diagram of a volume list that comprises a mapping table for mapping ranges of LUNs to vectors of logical storage volume numbers;

Figure 1:
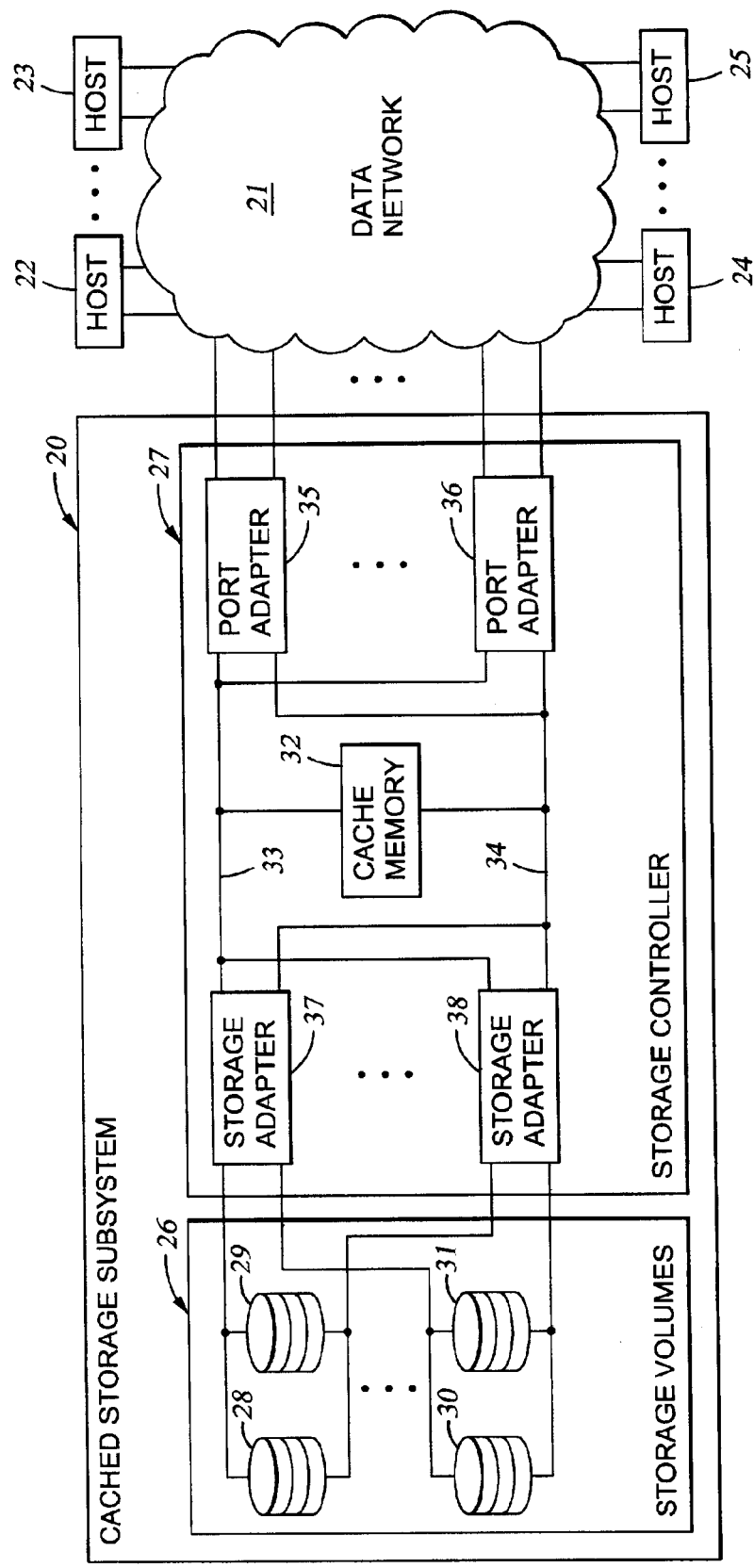
FIG. 1 is a block diagram of a data processing system including a cached storage subsystem linked by a data network to a multiplicity of host processors.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DESCRIPTION OF THE PREFERRED EMBODIMENTS

With reference to FIG. 1 of the drawings, there is shown a cached storage subsystem 20 connected via a data network 21 to a plurality of hosts 22, 23, 24, 25. The cached storage subsystem 20 includes storage volumes 26 and a storage controller for controlling access of the hosts to the storage volumes. The storage volumes are logical units of storage distributed over one more storage devices 28, 29, 30, and 31. The storage devices are magnetic disk drives, optical disk drives, tape drives, solid-state memory devices, or other storage devices capable of providing nonvolatile data storage. Presently the preferred storage devices are magnetic disk drives each having a storage capacity of at least 46 gigabytes.

The storage controller 27 includes a dual port cache memory 32, a plurality of port adapters 35, 36, and a plurality of storage adapters 37, 38. The cache memory 32 is accessed via any one of two back-plane busses 33, 34. Each of the port adapters 35, 36 link the data network 21 to each of the two back-plane busses 33, 34. Each of the storage adapters 37, 38 links a respective set of the storage devices 28, 29, 30, 31 to each of the two back-plane busses 33, 34. For example, the cached storage subsystem includes up to eight storage adapters and up to eight port adapters, and each port adapter provides two independent data ports to the data network.

When a port adapter 35 or 36 receives a storage access request from one of the hosts 22, 23, 24, 25, the port adapter accesses a directory in the cache memory 32 to determine whether or not the data to be accessed resides in the cache memory. If the data to be accessed resides in the cache memory, then the port adapter accesses the data in the cache memory. If the data to be accessed does not reside in the cache memory, then the port adapter forwards a storage access request to the storage adapters 37, 38. One of the storage adapters 37, 38 responds to the storage access request by performing a logical-to-physical translation to determine where the data to be accessed resides on the storage devices, and reads the data from the storage devices and writes the data to the cache memory, for access by the port adapter. The storage adapters 37, 38 also perform a write-back operation to ensure that that data written to the cache memory 32 by the port adapters eventually becomes written to the storage volumes 26.

The cache memory 32 ensures that data frequently accessed by the hosts is likely to be found in cache in order to avoid the data access time of the storage devices and in order to minimize loading on the storage adapters and the port adapters. Consolidation of network storage into a large cached storage subsystem provides a benefit that cache resources are consolidated into one large cache, which is more efficient than a number of smaller caches having in total the same cache memory capacity. A large cache is more likely to contain the most recently accessed data than the combined cache memory of the smaller caches.

The storage subsystem 20 is constructed for high data availability so that a single high-capacity storage subsystem is at least as fault-tolerant as a local collection of conventional network storage servers. Fault tolerance is ensured by dual, redundant components and busses in the path from any one of the port adapters 35, 36 to any one of the storage devices 28, 29, 30, and 31. Mirroring or RAID (redundant array of inexpensive disks) techniques ensure that the storage adapters 37, 38 can recover data in the event of failure of any one of the storage devices. In a similar fashion, the data network 21 can be made fault tolerant by ensuring that each of the hosts 22, 23, 24, 25 has independent paths through the data network 21 to each of two of the port adapters 35, 36, as will be further described below with reference to FIG. 2.

In a preferred form of construction, the cache memory 32 is composed of dynamic RAM memory cards mounted in a card-cage or main-frame, and the port adapters and storage adapters are programmed micro-processor cards that are also mounted in the card-cage or main-frame. Each port adapter 35, 36 has one or more processors for handling the communication protocol of the data network 21 and communicating with the cache memory busses 33, 34. Each storage adapter 37, 38 has one or more processors for handling the communication protocol of the storage devices and for communicating with the cache memory busses 33, 34. For example, the links between the storage adapters 37 and the storage devices 28, 29, 30, and 31 are FWD (fast, wide, differential) SCSI or Fibre Channel fiber-optic loops. The port adapters 35, can be programmed to communicate with the network via any number of communication and/or network protocols, such as Bus and Tag CKD, ESCON, SCSI, Ethernet, FDDI, ATM, DS1, DS3, T3, TCP, UDP, NFS, SNMP, and Fibre Channel. Further details regarding the preferred construction and operation of the cached storage subsystem 20 are disclosed in Yanai et al., U.S. Pat. No. 5,206,939, issued Apr. 27, 1993; Yanai et al. U.S. Pat. No. 5,335,352, issued Aug. 2, 1994; and Yanai et al. U.S. Pat. No. 5,381,539, issued Jan. 10, 1995; all incorporated herein by reference.

Figure 2:
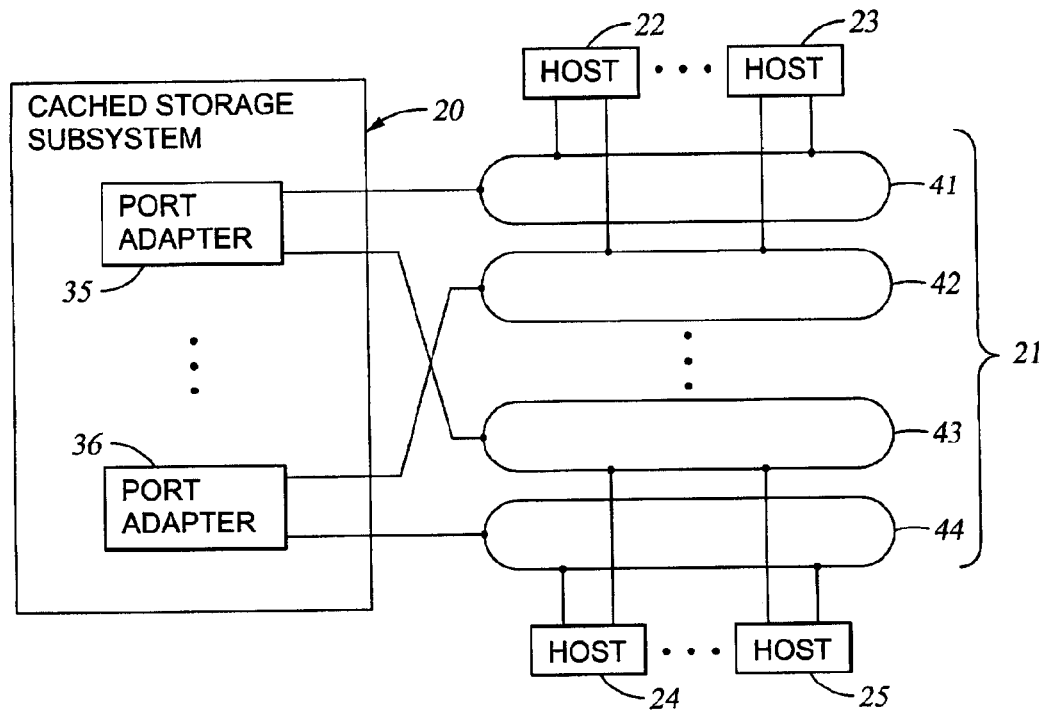
FIG. 2 is a block diagram of the data processing system of FIG. 1 further showing a typical fault-tolerant implementation for the data network.

Referring to FIG. 2, there is shown a fault-tolerant way of connecting a large number of hosts 22, 23, 24, 25 to the cached storage subsystem 20. In this example, the data network 21 includes a respective loop 41, 42, 43, 44 connected to each port of the port adapters 35, 36, and each host has at least two ports, each of which is connected to a respective loop connected to the port of a different one of the port adapters. Therefore, if there is a single failure of any one of the loops or a single failure of any one of the port adapters, there will still be an operational path from each host to the internal back-plane busses (33, 34 in FIG. 1) in the cached disk storage subsystem. The loops 41, 42, 43, 44, for example, operate in accordance with the Ethernet or Fibre Channel standards. Each loop could connect up to fifty hosts, for a total of 400 hosts connected via dual-redundant paths from eight port adapters. For workstation hosts where dual-redundant paths would not be needed, only one port of each workstation could be connected to the network 21, so that up to 800 workstations could be connected to the storage subsystem by connecting this single port of each workstation to only one of sixteen loops, as will be further described below with reference to FIG. 37.

Figure 38:
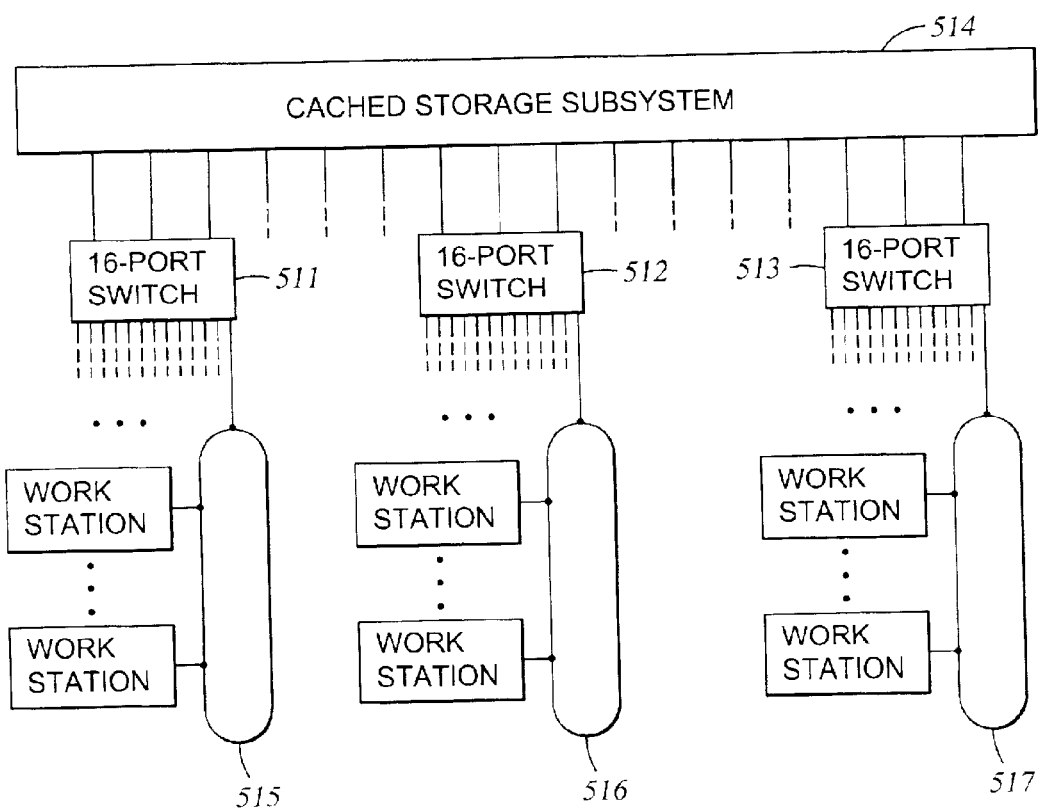
FIG. 38 is a block diagram of a storage network configuration especially suited for up to 3300 workstations.

It is possible to replace each of the loops 41–44 in FIG. 2 with a switch, or to use switches together with loops for connecting hosts to the storage subsystem, as will be further described below with reference to FIG. 38. In general, for a given number of ports, a loop will be less expensive that a switch, but a switch may provide more bandwidth that a loop. The additional bandwidth of a switch may be needed for 11 ensuring concurrent host access to the storage subsystem or for supporting bandwidth-intensive applications such as interactive video applications.

In general, the data network 21 of FIG. 1 could have various topologies and simultaneously use a number of different communication protocols. For example, the data network 31 could connect ports of various devices by dedicated port-to-port connections (i.e., so-called point-to-point connections), loops, or switches, or combinations of these connections. In addition to switches, the data network 21 could include other connectivity devices such as hubs, bridges and routers. The data network could include additional processors or computers for buffering or streaming data from the cached storage subsystem to hosts or to archival storage such as a tape library. For example, the use of a cached storage subsystem in connection with stream servers, a tape library, and an ATM switch, for continuous-media isochronous data access, and on-line backup storage, is described in Vishlitzky et al., U.S. Pat. No. 5,737,747 issued Apr. 7, 1998.

The data network 21 could also include one or more additional cached storage subsystems, preferably at different geographical locations, to provide redundancy and protection from a catastrophic failure of the cached storage subsystem 20, as will be further described below with reference to FIGS. 39 and 40. The cached storage subsystems could be linked for automatic remote mirroring of data to provide recovery from a disaster, as described in Yanai et al., U.S. Pat. No. 5,544,347 issued Aug. 6, 1996, incorporated herein by reference, and in Yanai et al., U.S. Pat. No. 5,742,792 issued Apr. 21, 1998 (Ser. No. 08/654,511 filed May 28, 1996), incorporated herein by reference.

Figure 3:
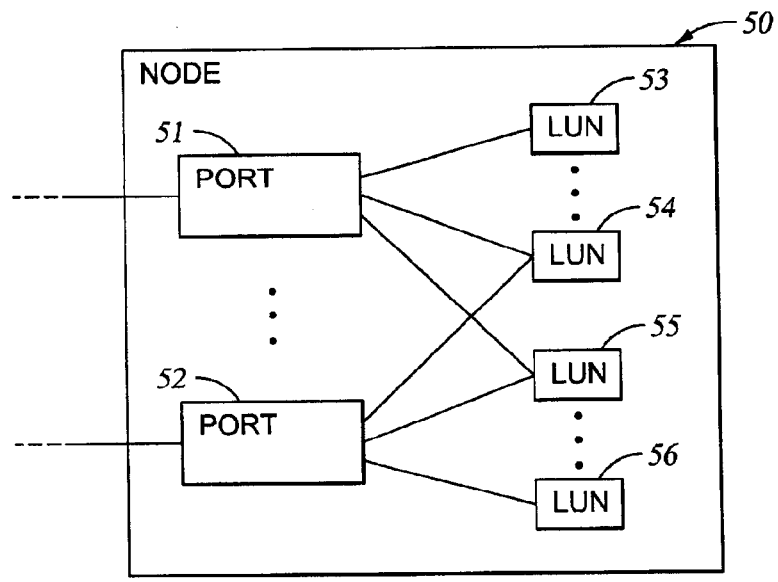
FIG. 3 is a generalized block diagram of a node linked to the data network of FIG. 1.

Because the data network 21 could have various topologies, it is desirable to provide a facility for enabling any device in the network to determine the configuration of at least that portion of the network that is accessible to the device. With reference to FIG. 3, for example, there is shown a node 50 having a number of ports, including ports and 52, which may be connected to the data network 21. In this context, the node 50 can represent any device having ports which may be connected to the data network 21. The node also has a number of entities 53, 54, 55, 56, which are accessible through one or more of the ports, and which are identified by logical unit numbers (LUNs), each of which is unique for any single node. For example, if the node 50 is a storage subsystem, each logical storage volume is assigned a unique LUN. As will be further described below, it is also possible to establish a mapping between the LUNs as specified by or reported to a host and the logical volumes, so that one logical volume could be mapped to more than one LUN. Each port 51, 52 is constructed or programmed to respond to a "Report LUNs" command by returning a list of LUNs which are accessible from the port. In the fashion, a host can send "Report LUNs" commands to each port of each storage subsystem to which it is connected, to obtain a list of the logical volumes to which the host is connected. This is typically done by a host operating system at "boot" time.

The format for the Report LUNs command and the manner of its use by the host is determined by the protocol used by the network. For example, for a host connected to a storage node via a SCSI link, then the host addresses the storage volume by a Bus/Target/LUN triple,. and the host can send a SCSI "Report LUNs" command over the bus to each target on the bus to obtain a list of LUNs accessible through each target. Such a Report LUNs command is subsumed in the Fibre Channel standards, which define additional capabilities for permitting a host to determine the present configuration of a network to which the host is connected. The Fibre Channel standards are currently being developed by the American National Standards Institute (ANSI).

In a Fibre Channel network, each port has a 64-bit port identifier called a "World Wide Name" (WWN). To ensure that the WWN is unique, for example, it may include a unique identifier of the manufacturer of the device including the port (e.g, an Organizationally Unique Identifier as registered with the IEEE in New York, N.Y.), and the manufacturer's serial number of the device. A logical storage volume in a Fibre Channel storage subsystem therefore can be identified by the combination of the WWN of the storage subsystem and the LUN of the logical volume.

In a Fiber Channel network, the portion of the network connected to each port has one of four distinct topologies; namely, point-to-point, private loop, public loop, and fabric. A point-to-point topology has one port connected directly to one other port. A loop is a single simplex media linking three or more nodes such that transmission can occur between a single pair of nodes on the media at any given time. A hub is a specific implementation of a loop in which a node can be inserted into or removed from the hub without breaking the loop. A private loop is a dedicated or closed loop. A public loop is a loop attached to a node of a fabric. A fabric is a topology that permits multiple simultaneous transmissions between pairs of nodes connected to it. The fabric routes or switches data frames from a source node to a destination node. A switch is an implementation of the fabric topology.

In a Fiber Channel network, a node of a host directly connected to a loop can determine all other nodes in the loop by polling. A response from a node on the loop can indicate whether or not the responding node is or is not a fabric port. When a node is identified, its associated LUNs can be requested by sending a Report LUNs request to the node. A node of a fabric port can be further interrogated about the identity of other nodes of the fabric to which the node of the fabric port is directly connected through the fabric. For example, associated with the fabric is a "name server" that will respond with a list of nodes directly accessible through the fabric. The name server has a predefined address on the fabric. A node of the host can also probe the configuration of a point-to-point connection or loop connected to each node directly accessible through the fabric, by addressing a port of the fabric to route interrogation requests to other ports.

A request from one port to another on a loop or fabric must identify the destination port so that only the destination port will respond to the request. A request from one port to another on a loop or fabric must also identify the source of the request so that a response can be directed back to the source. Although the WWNs of the source and destination ports could be used in each request to uniquely identify the source and destination ports, each WWN contains so many bits that an undue amount of transmission bandwidth and data processing capability would be expended if the source and destination WWNs were used in each request. Therefore, it is desirable to assign a temporary identifier to each port in the data network in such a fashion that the identifier is unique to the configuration of the network at any given time, but not necessarily unique to each port for all time. Therefore, such a temporary identifier can have fewer bits than a WWN yet uniquely identify a source or desired destination of a request transmitted through the network.

Figure 34:
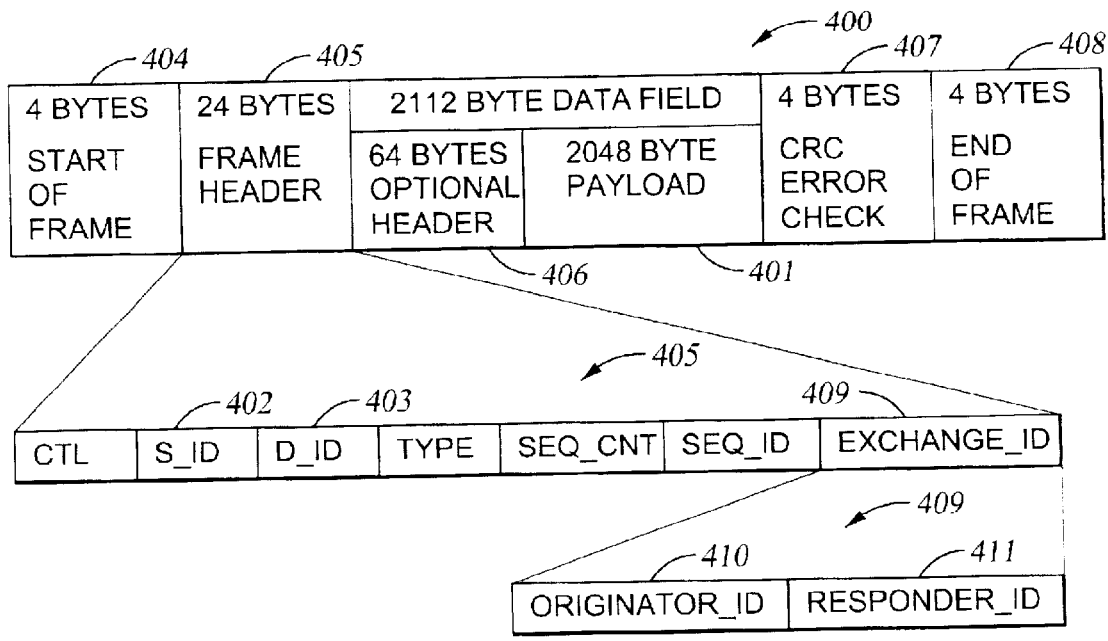
FIG. 34 is a block diagram showing components of a Fibre Channel Frame.

The Fiber Channel standards specify that data is transmitted over the Fiber Channel network in packets having a predefined format, and such a packet is called a "frame." Each frame includes a source address (S_ID) and a destination address (D_ID). The S_ID is a temporary identifier of the port which is the source of the frame, and the D_ID is a temporary identifier of the port which is the desired destination of the frame. Further details regarding the format of the frame are described below with reference to FIG. 34.

The use of temporary rather than permanent identifiers for source and destination addresses in the network introduces the problem of assigning and reassigning the temporary identifiers when the configuration of the network is defined and changed. For example, when a private loop is changed into a public loop by connecting a port of a switch to the loop, temporary addresses must be assigned to other ports of the switch and to the ports of devices that become connected to those other ports.

If a Fiber Channel network includes a fabric, then the temporary identifiers of ports in the network are assigned by the fabric at the time of a fabric login if the fabric supports a fabric login. Otherwise, the temporary identifiers must be known by the ports implicitly. For example, in a fabric containing only one switch, when that one switch is powered on or reset, then that one switch implicitly knows its own ports, and a "domain controller" of the switch searches for nodes connected to the switch ports, assigns temporary IDs to all the nodes that become known to it, and reports to the ports that it has found the temporary IDs assigned to them. During this fabric login process, a "name server" of the fabric may build a table of the WWNs of the ports that are known to the fabric and their corresponding temporary IDs. If the Fibre Channel network includes multiple switches, then only one of them, designated as the master switch, assigns ranges of temporary IDs to be used by each of the switches during the fabric login process. The Fibre Channel network can be constructed so that the name server automatically obtains information from the domain controller when the domain controller learns about the ports that become connected to the network, or the Fibre Channel network can be constructed so that a port must log into the domain controller to obtain its temporary ID, and then log into the name server so that the name server obtains the temporary ID of the port. The first case is known as an implicit name server login, and the second case is known as an explicit name server login.

After an initial fabric login process, it is possible for the configuration of the network to become changed as a result of addition or replacement of devices having ports connected to the network. The data processing system could be shut down and then reconfigured so that the new ports become known implicitly, or a fabric login could be initiated so that temporary IDs become assigned to the new ports. In the case of a data network having a fabric supporting a fabric login, it is also possible for a device added to the network to initiate a process of obtaining temporary IDs for its ports by requesting a "port login" from the fabric.

The Fiber Channel specifications provide a mechanism for the network to automatically detect certain changes of state which may indicate that the configuration of the system has changed. For example, idle signals are transmitted over the links to enable detection of link failure. Frame transmission errors are detected by cyclic redundancy checks and sequence identification numbers in the frames. When transmission over a link is restored after detection of a link failure, a fabric may require the ports connected by the link to login for reassignment of temporary IDs to the ports. A fabric may also support a "state change notification" process in which ports having operational links to the fabric may request to be notified by the fabric when a state change is detected.

As described above, the data processing system in FIG. 1 has facilities for ensuring that the logical storage volumes 28, 29, 30, and 31 are accessible to the hosts 22, 23, 24, 25. It is not only physically possible for any host to have access to any logical volume in the data storage subsystem, but for fault tolerance is desirable for there to be at least two independent paths through the data network 21 and through the cached storage subsystem from each host to each logical storage volume.

Although it may be physically possible in the data processing system of FIG. 1 for any host to have access to any logical storage volume, it may be desirable to restrict the set of volumes that can be seen by any one host. Certain "private" volumes should be assigned to each host and other hosts should not be permitted to see or modify the private volumes of other hosts. Moreover, the "boot" process for a host is slowed down by searching for and reporting all the volumes to which the host has access. Certain operating systems are limited by the number of devices that they can handle at a given period of time, and for a host using such an operating system, it is not only desirable but also necessary to limit the number of volumes that the host can access.

The problem of restricting the set of volumes that can be seen by any one host is solved by a method of named groups and/or a method of virtual ports. The method of named groups is applicable to all Fiber Channel topologies for the connections of hosts to one or more ports of a storage controller. The method of virtual ports causes at least one port of the storage controller to appear as if it were a port of a fabric. The method of virtual ports could cause the port of the storage controller to appear as if it were a Fibre-Channel FL_Port (a port in a loop that is part of a fabric), E_Port (a port that is an interlink between two switches), or F_Port (fabric port). The two methods could be used at the same time in the same storage controller. In either the method of named groups or the method of virtual ports, the limited set of volumes accessible to a host can be specified by a list of logical volumes in the limited set, or by a procedure that defines the limited set of volumes. An example of a specification for a procedure that defines the limited set of volumes is a vector defining what will be called a "disk spread."

Figure 4:
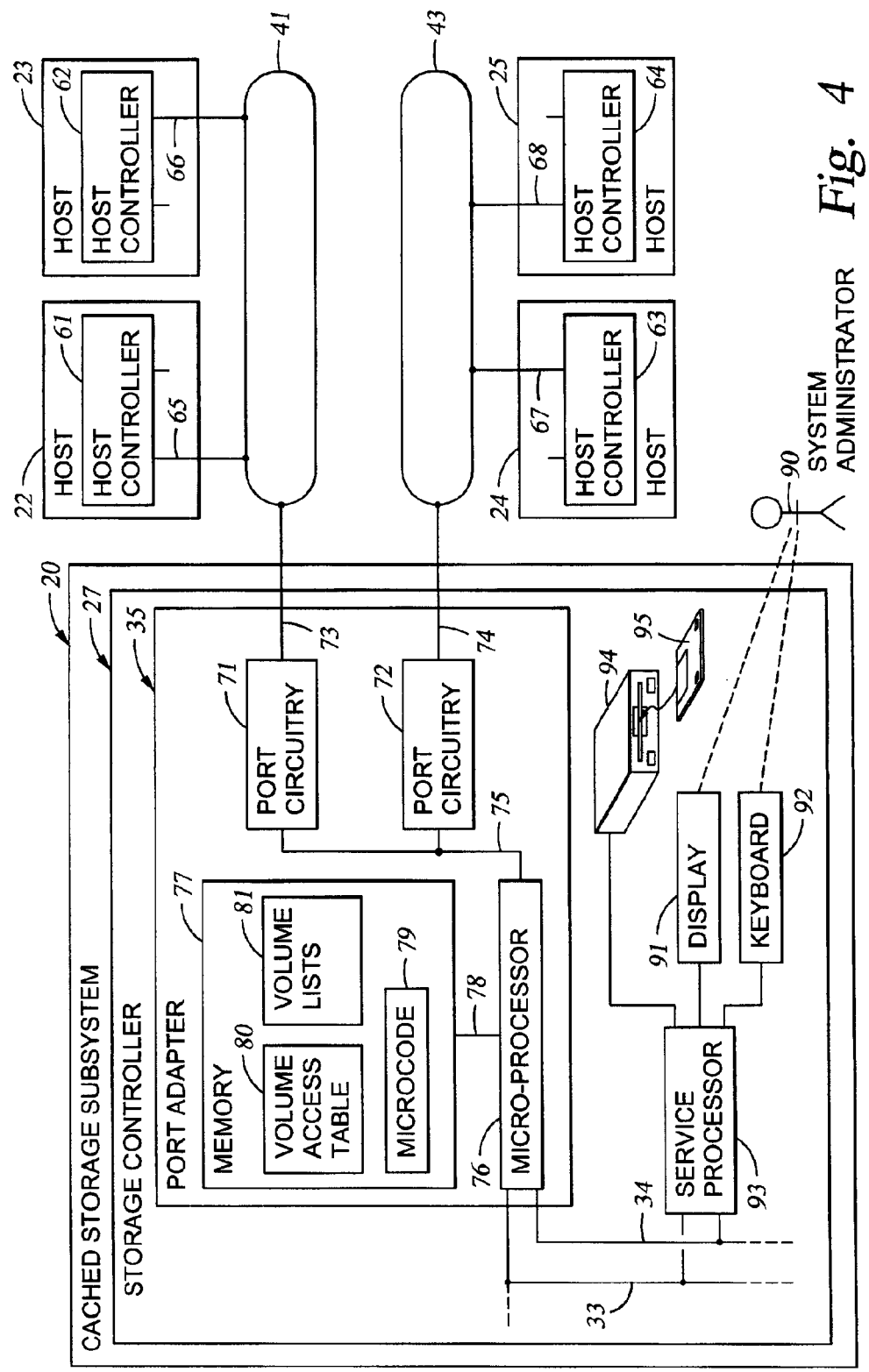
FIG. 4 is a block diagram of the data processing system of FIG. 1 showing a port adapter in the cached storage subsystem using a volume access table for assignment of logical storage volumes to respective host controller ports.

Referring to FIG. 4, there are shown further details of the data processing system of FIG. 1. In FIG. 4, each of the hosts 22, 23, 24 and 25 is shown to have a respective host controller 61, 62, 63, 64 for each host port 65, 66, 67, 68 directly linked to the port adapter 35. In the context of this specification, the term "host controller" refers to the controller of the host ports on the data network. In the data processing art, such a host controller is often referred to as a "host bus adapter" or "HBA". The term "host controller" will be used instead to avoid confusion with the "port adapter" of the storage controller or storage subsystem. Each host controller 61, 62, 63, 64 is programmed with a unique WWN for circuitry in the host controller for each of the respective ports 65, 66, 67, 681. In other words, if a host controller is replaced with a different host controller, the WWN associated with the host port will change. Moreover, a host controller may provide more than one port, and the host controller is programmed with a different WWN for each of its ports.

As further shown in FIG. 4, the port adapter 35 includes port circuitry 71 and 72 for each of its two ports 73 and 74. The port circuitry, for example, includes application-specific integrated circuits (ASICs) for communicating over the loops 41 and 43 in accordance with the Fibre Channel standards. The port circuitry is connected to an input/output bus 75 of a microprocessor 76. The microprocessor 76 is connected to a random access memory 77 by a memory bus 78. The microprocessor 76 is also interfaced to the storage controller busses 33 and 34. The memory 77 stores microcode 79 executed by the microprocessor 76.

Storage Volume Partitioning by Named Groups

In order to restrict the set of volumes that can be seen by any one host, the memory 77 of the port adapter 35 stores information defining a correspondence between hosts in the data processing system and the set of volumes accessible to each host through the port adapter. For example, a volume access table 80 and volume lists 81 are stored in the memory 77. The volume access table specifies a correspondence between hosts and respective lists of volumes accessible to the hosts. A back-up copy of the volume access table and volume list could be stored in one of the storage volumes of the cached storage subsystem.

The information in the volume access table 80 and the volume lists 81 can be accessed by a system administrator viewing a display 91 and operating a keyboard 92 of a service processor 93 interfaced to the controller busses 33, 34. The display 91, keyboard 92, and service processor 93, for example, are provided by a conventional lap-top computer mounted behind a door (not shown) in the cabinet (not shown) of the storage controller. The service processor 93, for example, is programmed to provide a graphical user interface for volume configuration, partitioning, and other storage management functions. The service processor also has a floppy-disc drive for down-loading of the microcode 79 from a from a floppy-disc program carrier 95. Alternatively, a system administrator at a remote terminal or host could access the information in the volume access table 80 and volume lists 81 and down-load microcode via a modem or dedicated link or via the data network (21 in FIG. 1) using an appropriate communications protocol such as the Simple Network Management Protocol (SNMP).

Referring to FIG. 5, there is shown a simplified construction for a volume access table 82. A preferred form of construction for the volume access table 80 in FIG. 4 will be described below with reference to FIGS. 7 to 10. In the simplified construction of FIG. 5, each entry in the volume access table includes a volume group name, a host controller port WWN, a host controller port S_ID, a private/shared flag, and a pointer to a volume list. The volume group name includes a host name and a number identifying a particular one of possibly many host ports linked to the port adapter. The volume group name provides a stable and unique identification number for a group of logical storage volumes to be accessed from a host port. At any given time, the S_ID and host controller port WWN also provide unique identification numbers for the volume group, but the S_ID is changed upon booting of the host controller, and the WWN is changed upon controller replacement. Using a stable ID permits automation of booting, and simplifies management of controller replacement. Moreover, by providing a path through the data network from a host controller to each port adapter and by including an entry in the volume access table in each port adapter defining a volume group name for the host controller, it is possible to provide port independence in the sense that a host controller may access its corresponding set of logical volumes through any of the port adapters. When set, the private/shared flag indicates that all of the logical volumes in the volume list are private and no permission is needed from a lock manager before the host controller port can accessing any logical volume in its assigned volume list.

The volume group names and the volumes in each volume list are defined by the system administrator. The host controller port WWNs are entered into the volume access table 80 automatically during installation or replacement of a host controller. The host controller S_ID is entered and updated automatically during each boot. The system administrator defines the host names, for example, by sequentially assigning numbers to the hosts. The host names are also known to the hosts, so that the relationship between each host and the volumes assigned to the host can be re-established automatically if both the S_IDs and WWNs would happen to change, for example as a result of host controller replacement and a change in the configuration of the data network. In this situation, the host controller port can transmit its corresponding group name to the storage subsystem during a login process or in response to a request from the storage subsystem in response to a state change notification so that the storage subsystem can reestablish the relationship of the host controller port's volume group name and volume list with respect to its new WWN and S_ID.

In the table 82 of FIG. 5, for example, the entry "HOST22-1" indicates the first controller port of host no. 22, and it could be coded as a number 221, although the entry could be displayed as "HOST22-1" for viewing by the system administrator. The other entries in the table are shown as hexadecimal numbers. The volume access table itself can have any suitable organization in the port adapter memory 77, such as a fixed-size block of contiguous memory locations, or doubly-linked lists of the table entries.

The specification of the particular volumes in a volume group should permit flexibility in assigning a variable number of volumes to each group, and also permit flexibility in defining overlap between the groups corresponding to certain volumes that are shared by the host processors. However, controller memory is a valuable resource, and it is necessary to rapidly determine whether or not a volume specified by a storage access request from a host controller port is included in the port's volume list. The searching of a long list of pseudo-random logical volume numbers, for example, would directly impact storage access time. Search time is especially critical in a cached storage system, since the search time may be comparable to the data access time if the requested data resides in the cache memory. In any case, the assignment of a long list of pseudo-random logical volume numbers complicates the storage management problem, because it is difficult for the storage administrator to comprehend how the volumes are assigned or shared when the volumes in the volume list become nearly full and additional volumes must be allocated to the hosts.

Hashing techniques can be used to search a long volume list rather efficiently, for example, by using the last couple of digits of the specified logical volume number as a hash table index. Since the list is changed infrequently, the list entries can be sorted for a binary search procedure. Moreover, it is possible to reduce the number of entries in the volume list and speed up the search process by specifying a range or vector of volume numbers in each list entry. Shown in FIG. 6, for example, is a volume list entry 83 specifying a beginning volume number 84, an ending volume number 85, and a value 86 of one minus a stride (S). For example, the beginning volume number is coded in three bytes, the ending volume number is coded as three bytes, and the stride is coded as two bytes. The stride (S) indicates the difference between neighboring volume numbers of the volumes in a disk spread. The stride (S), for example, is a positive integer ranging from 1 to 256 decimal.

Figure 7:
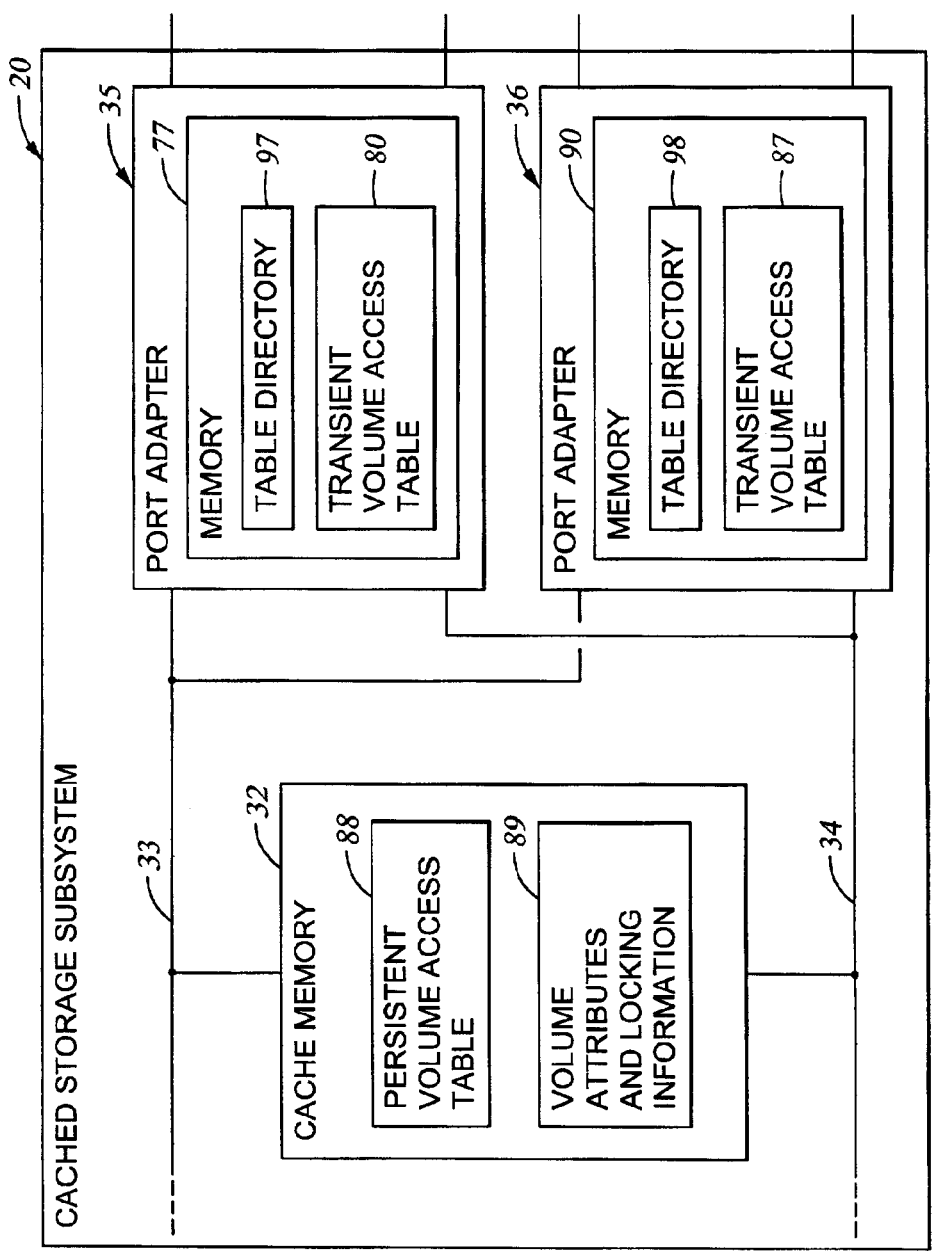
FIG. 7 is a block diagram of the cached storage subsystem showing further data structures used with the volume access table stored in port adapter memory.

Referring to FIG. 7, there is shown a preferred form of construction in which the volume access table 80 in the memory 77 of the port adapter 35 stores only the volume access information need for processing of a data access request by a host controller, and an additional volume access table 88 in the cache memory 32 stores information that appears in the table 82 of FIG. 5 but is not needed to process a data access request by a host controller. The table 80 in the port adapter memory 77 is further identified as a "transient" volume access table because it includes the transient S_IDs of the host controller ports that have logged in to the port adapter 35. The table 88 in the cache memory 32 is further identified as a "persistent" volume access table because it includes the relatively permanent WWNs of the host controller ports that have logged in to the port adapter 35. As further shown in FIG. 7, the port adapter 36 has a similar transient volume access table 87 in its port adapter memory 90. The transient volume access table 87 includes the transient S_IDs of the host controller ports that have logged in to the port adapter 36. In this case, example, the persistent volume access table 88 includes the WWNs of the host controller ports that have logged in to the port adapter in addition to the WWNs of the host controller ports that have logged in to the port adapter 35. It is desirable to share a persistent volume access table among a number of transient volume access tables in the case where a host controller may access the same volume group from the ports of different port adapters, since this avoids duplication of persistent volume access table entries that would otherwise occur. Also shown in FIG. are volume attributes and locking information 89 stored in the cache memory 32, and respective table directories 97, 98 that are stored in the port adapter memories 77, 90 and used to speed up the process of searching the transient volume access tables 80 and 87.

The persistent volume access table 88 and the volume attributes and locking information 89 also reside in a logical storage volume and be maintained in cache in a fashion similar to any other logical storage volume accessed by a host controller. However, it is preferred to locate the persistent volume access table 88 and the volume attributes and locking information in a reserved area of cache memory, called "shared memory," that is never deallocated, so that this information will always be found in the cache memory when a port adapter attempts to access it.

Referring to FIG. 8, there is shown a preferred construction for the persistent volume access table 88. The persistent volume access table 88 includes an entry for each distinct group of volumes to be accessible to a particular host controller from a particular port adapter. The persistent volume access table 88 has columns for volume group names, host controller WWNs, a private/shared flag, and pointers to volume lists, and these columns are similar to the corresponding columns in the table 82 of FIG. 5. The persistent volume access table 88 further includes columns for a volume bitmap and a port adapter index list. A volume bitmap has a respective bit for each logical volume in the storage subsystem, and the respective bit is set if the logical volume associated with the bit is included in the volume list, and not set if the logical volume associated with the bit is excluded from the volume list. The port adapter index list includes the table index of each corresponding entry in a transient volume access table. Therefore, the port adapter index list could include an index for each port adapter to which the host controller is currently logged into. It may be desirable, but not necessary, for the hosts to log out of the port adapters. This would ensure that the volume access tables more precisely reflect the current state of the data network, and prevent any misdirection of messages if a network failure would prevent a storage adapter from being notified of a state change that would cause any S_ID in the transient volume access table to be reassigned.

In the persistent table 88 of FIG. 8, the information in each volume bitmap is redundant with the information in each volume list. In this case, the volume list is the original form of the information as specified by the system administrator at configuration time. The volume bitmap is used for rapidly searching whether a specified volume is in the volume list, for example in response to a data access request from the host controller port to which the volume list is associated. The volume bitmap is generated automatically from the volume list when the volume list is entered or modified by the system administrator. The volume list is retained for viewing and revision by the system administrator. In a system with a limited number of logical volumes, the volume list could be quickly generated from the volume bitmask, and therefore there would be no need to retain the volume list it in memory or include the volume list in the volume access table.

Referring to FIG. 9, there is shown a preferred format for the transient volume access table 80. The table 80 includes an entry for each host controller port currently logged into the port adapter. The table 80 includes columns for the host controller S_ID, the private/shared flag for the volume list, the volume bitmap, and a persistent table index. The persistent table index in each entry of the transient volume access table 80 points to the entry in the persistent volume access table having the same private/shared flag and volume bitmap as the entry of the transient volume access table, and having a host controller WWN corresponding to the host controller S_ID in the entry of the transient volume access table.

Referring to FIG. 10, there is shown a preferred format for the table directory 93. The table directory includes, in each entry, a list of pairs of the S_ID and corresponding index to the transient volume access table for each SID having a certain modulus of the S_ID. The modulus each S_ID in the table directory corresponds to the index of the directory table entry containing the S_ID. For example, the modulus of the S_ID is a certain number of least significant bits of the S_ID, and in this case the number of entries in the table directory 93 is two raised to the number of the least significant bits.

To search the transient volume access table 80 for an entry having a specified host controller S_ID, an index is computed by masking off the least significant bits of the specified S_ID to obtain the corresponding modulus, and the modulus is used to index the table directory to find a list of S_IDs and corresponding indices that should include the specified S_ID if the specified S_ID is somewhere in the transient volume access table. The list in the entry indexed by the modulus is searched for the specified SID, and if it is found, then its corresponding index is the index to the transient volume access table entry containing the specified S_ID. If the specified SID is not found in the list in the entry indexed by the modulus, the specified S_ID does not appear in the S_ID column of the transient volume access table.

Since S_IDs are assigned to hosts controller ports sequentially when the host controller ports share a loop, the size of the table directory 93 can be determined based on reasonable constraints on the network geometry. For example, if the most complex network geometry connects a certain maximum number of loops to one or both of the two physical ports of the port adapter (for example, as described below with reference to FIG. 38), then the number of entries in the table directory can be chosen to be greater or equal to the maximum number of host controller ports on a single loop, and the number of pairs of S_IDs and corresponding transient table indices in each entry of the table directory can be set to the maximum number of loops that can be connected to each port through one switch. However, the number of possible S_IDs in each entry of the table directory 97 can be reduced still further if one assumes a particular kind of connection between each loop and each port adapter port. For example, if a single switch is used to connect loops to the port adapter (for example, as shown in FIG. 38), and all of the host controller ports are assigned S_IDs sequentially by this switch, then the number of entries in the table directory can be chosen to be the smallest power of two greater or equal to the maximum number of host controller ports linked to the port adapter ports, and there will be at most one S_ID and corresponding transient volume access table index in each entry of the table directory.

Figure 11:
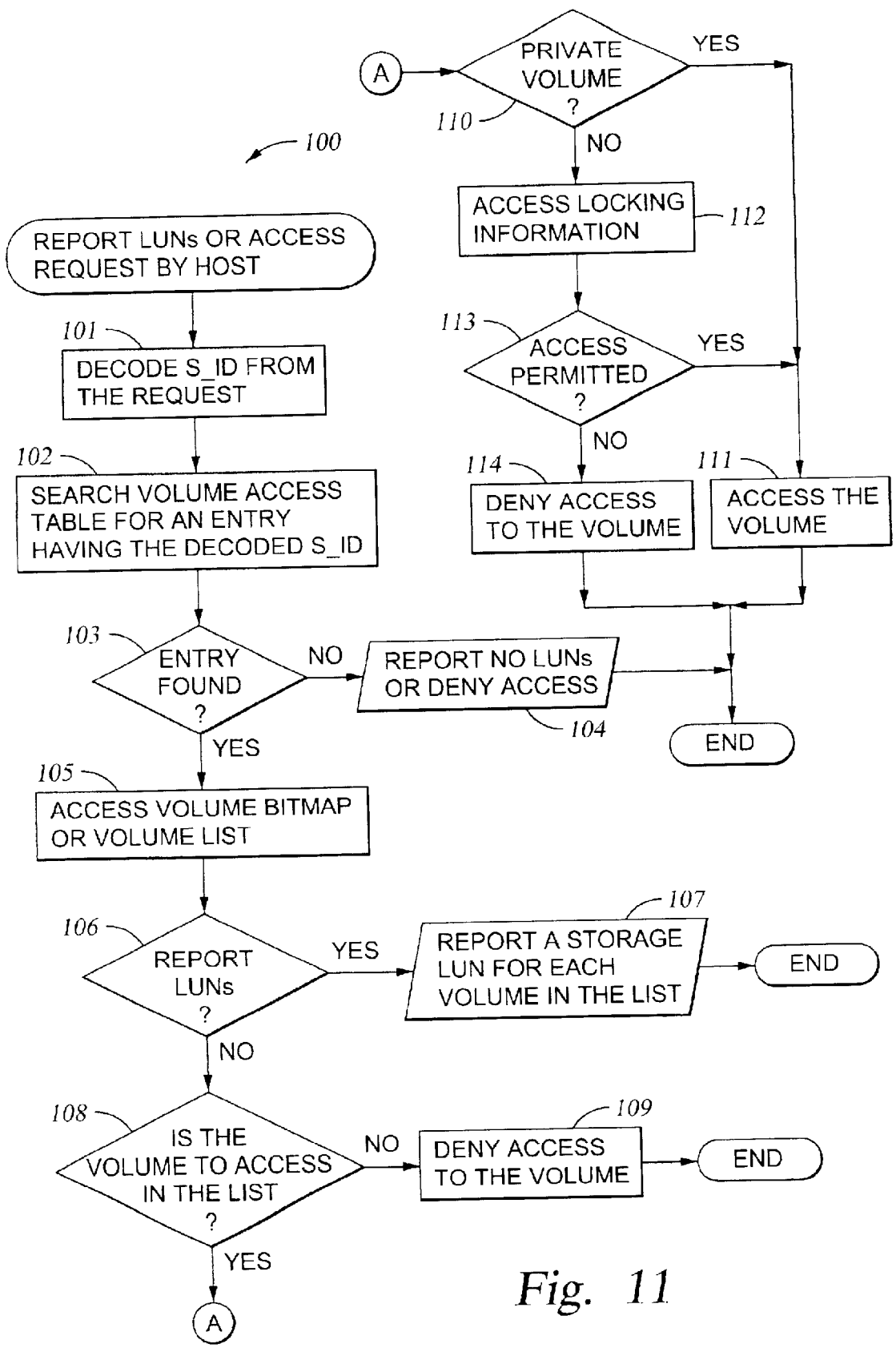
FIG. 11 is a flowchart of a microcode routine executed by a port adapter of the cached storage subsystem of FIG. 1 when using the volume access table of FIG. 5 or FIG. 9 in response to a "Report LUNs" or access request by a host processor.

Referring to FIG. 11, there is shown a flowchart of a microcode routine executed by the microprocessor (76 in FIG. 4) of the port adapter (35 in FIG. 4) in response to a "Report LUNs" or access request by a host. In a first step 101, the microprocessor decodes the S_ID from the request. Then in step 102, the microprocessor searches the volume access table for an entry having the S_ID from the request. For example, this is done by indexing the table directory of FIG. 10 with a modulus of the S_ID from the request, searching the indexed entry of the table directory for the S_ID from the request, and if the S_ID from the request is found in the entry, then indexing the volume access table of FIG. 9 with the corresponding index in the entry of the table directory. If the S_ID of the request is not found in the volume access table, then execution branches to step 104 to report no LUNs or deny the access request, and the routine is finished.

If the S_ID of the request is found in the volume access table, then execution continues to step 105. In step 105, the volume bitmap or volume list is accessed. For the volume access table format of FIG. 9 the volume bitmap is accessed, and for the volume access table format of FIG. 5, the volume list is accessed. In step 106, execution branches to step 107 for a "Report LUNs" request. In step 107, the port adapter reports to the host controller a storage LUN for each volume in the volume bitmap or volume list, and the routine is finished. For an access request, execution continues from step 106 to step 108. In step 108, execution branches to step 109 if the volume to access is not in the volume bitmap or volume list. For a bitmap, this can be done simply by addressing the bit corresponding to the logical volume specified by the host controller. In general, the volume list is searched by using a technique most suitable for quickly searching the volume list. In step 109, the port adapter denies the storage controller access to the logical volume, and the routine is finished.

If the volume to access is in the volume bitmap or list, then execution continues from step 108 to step 110. In step 110, the private/shared flag is inspected for the indexed entry of the volume access table. If the private/shared flag is set, then execution continues from step 110 to step 111. In step 111, the port adapter accesses the logical volume specified by the host controller, and the routine is finished. If the private/shared flag is not set, then execution branches from step 110 to step 112 to access the locking information the cache memory. If the private/shared flag is set, then access is permitted, and execution branches from step 113 to step 111 to access the volume. If the volume to access is public and is already locked in a fashion incompatible with the access requested by the host (e.g., the volume is already write locked and the host controller requests a read or a write access, or the volume is already read locked and the host controller requests a write access) then access is not presently permitted. The host controller's S_ID is placed on a wait list, in order to notify the host controller when the logical volume becomes available; execution branches from step 113 to step 114 to temporarily deny access to the volume, and the routine is finished. If the volume to access is public and is not locked or is locked in a fashion compatible with the requested access by the host controller (e.g., the volume is already read locked and the host controller requests a read access), then a lock is granted to the host controller, and execution branches from step 113 to step 111 to access the volume, and the routine is finished.

Figure 12:
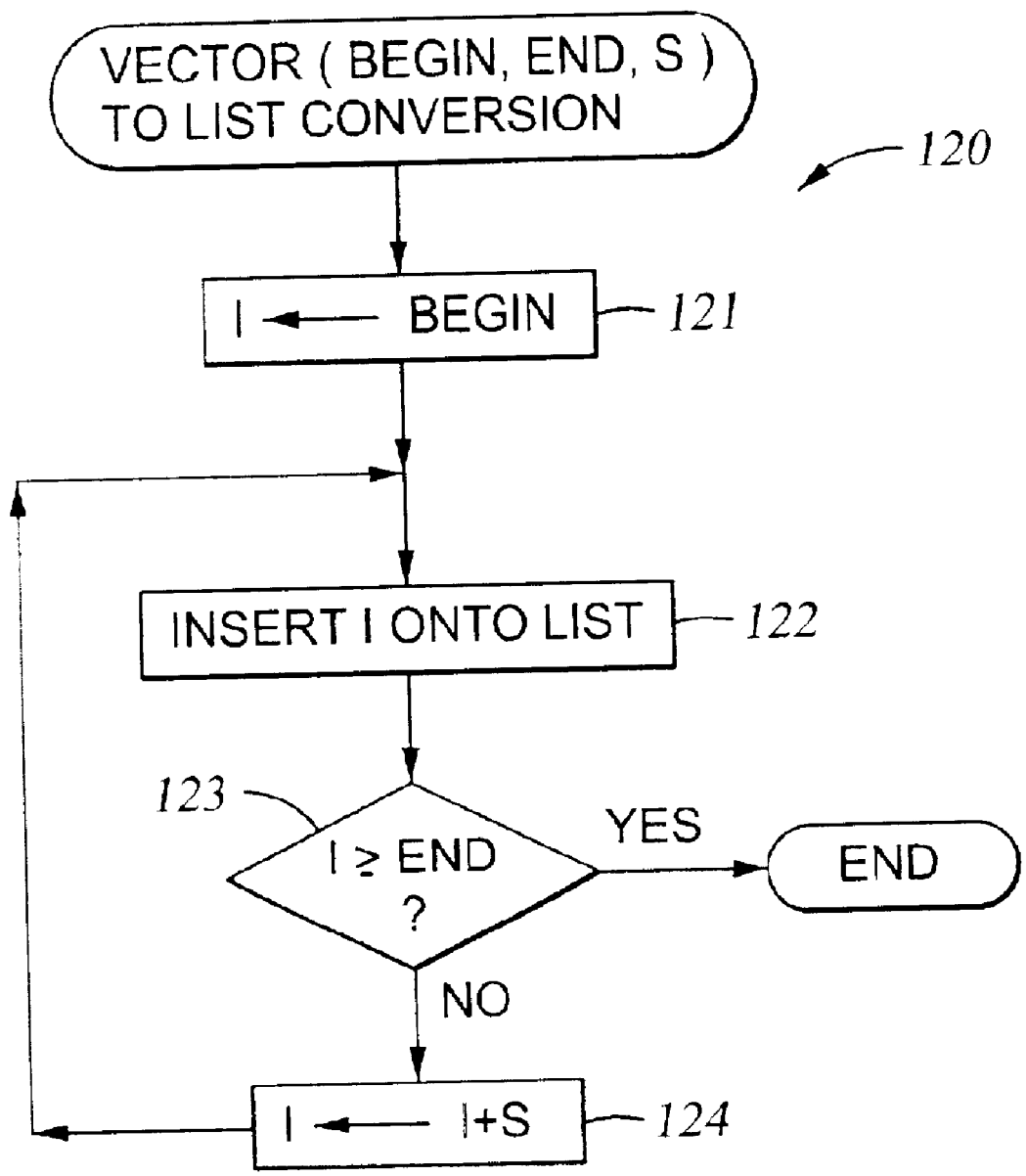
FIG. 12 is a flowchart of a microcode routine executed by a port adapter of the cached storage subsystem of FIG. 1 when converting the vector representation of FIG. 6 to a list of logical storage volume numbers.

Referring to FIG. 12, there is shown a flowchart 120 of a microcode routine 120 executed by the microprocessor (76 in FIG. 4) of the port adapter (35 in FIG. 4) when converting the vector representation of FIG. 6 to a list of logical storage volume identifiers. This routine is used, for example, in step 106 to report the storage LUNs in a disk spread defined by an entry in the volume list. In a first step 121, an index (I) is set to the first volume number (BEGIN) for the disk spread. Next, in step 122, the value of the index I is inserted onto the list. Then in step 123, the value of the index is compared to the last volume number (END) of the disk spread. If the value of the index is greater or equal to the value of the last volume number (END), then the routine terminates. Otherwise, execution continues from step 123 to step 124. In step 124, the index (I) is incremented by the stride (S), and execution loops back to step 122.

Figure 13:
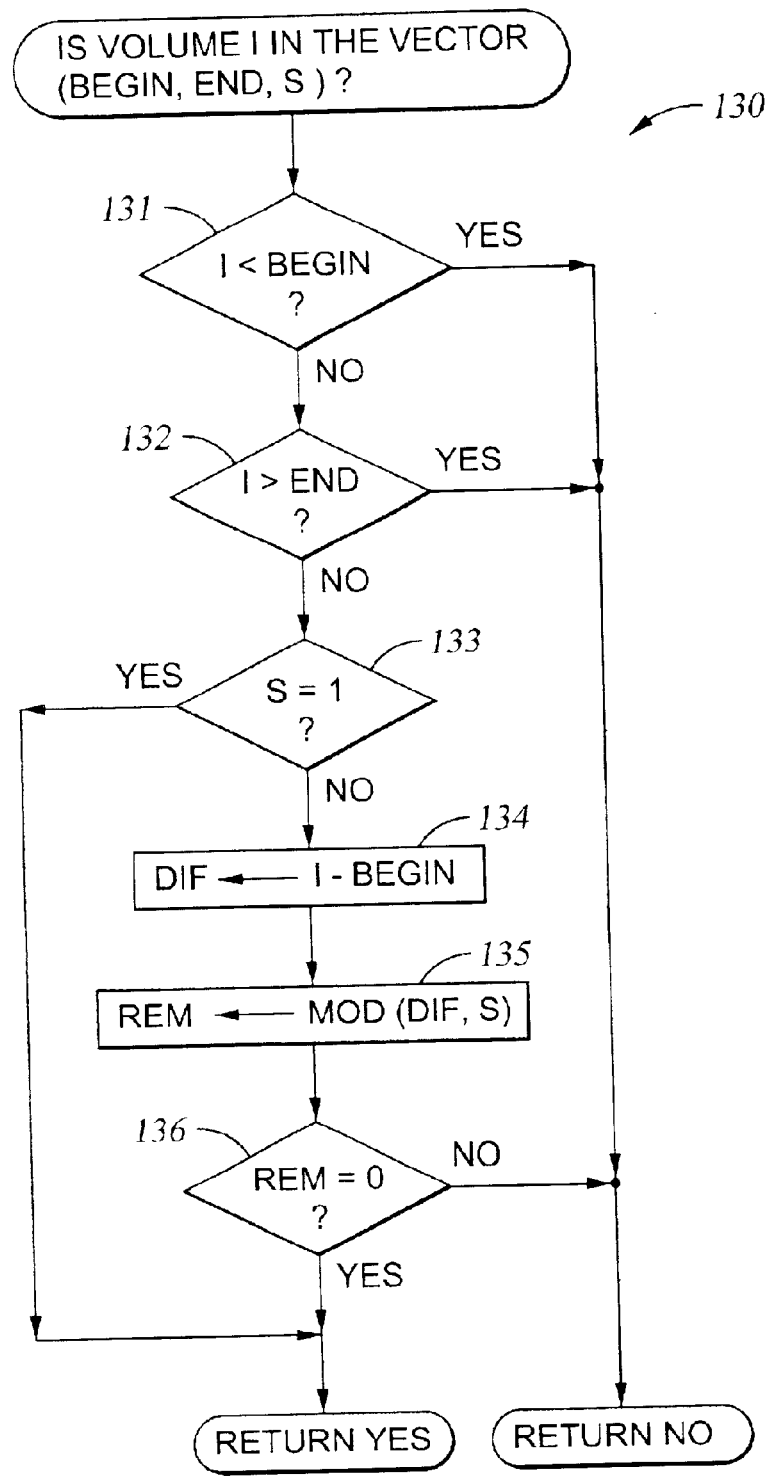
FIG. 13 is a flowchart of a microcode routine executed by a port adapter of the cached storage subsystem of FIG. 1 when determining whether a specified logical storage volume is included in a disk spread defined by the vector representation of FIG. 6.

Referring to FIG. 13, there is shown a flowchart 130 of a microcode routine executed by the microprocessor (76 in FIG. 4) of the port adapter (35 in FIG. 4) when determining whether or not a specified logical storage volume is included in a disk spread defined by the vector representation of FIG. 6. This routine is used, for example, in step 107 to determine whether or not the volume specified by a data access request is included in a disk spread defined by an entry of the volume list. In a first step 131, the volume index (I) is compared to the first logical volume number (BEGIN) of the disk spread. If the volume index (I) is less than the first logical volume number, the execution returns indicating that the specified logical storage volume is not included in the disk spread. Otherwise, execution continues from step 131 to step 132. In step 132, the volume index (I) is compared to the last logical volume number (END) of the disk spread. If the volume index (I) is greater than the last logical volume number, then execution returns indicating that the specified logical storage volume is not included in the disk spread. Otherwise, execution continues from step 132 to step 133.

In step 133, the stride (S) is compared to one. If the stride (S) is equal to one, then execution returns indicating that the specified logical storage volume is not included in the disk spread. Otherwise, execution continues to step 134. In step 134, the difference is calculated between the index I and the first logical volume number (BEGIN) of the disk spread. Then a value REM is computed which is the modulus of the difference (DIF) and the stride (S). In particular, if the difference (DIF) is zero, then REM is zero. Otherwise, DIF is divided by S using an integer division procedure, and REM is the remainder of the division. If REM is zero, then execution returns indicating that the specified logical volume is in the disk spread; otherwise, execution returns indicating that the specified logical volume is not in the disk spread.

Figure 14:
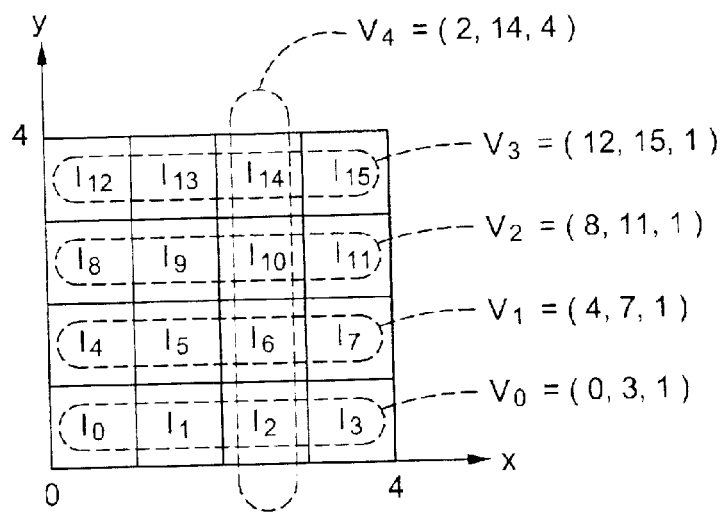
FIG. 14 is a graphical display of disk spreads in a two-dimensional volume space.

Referring to FIG. 14, there is shown a graphical display 140 of disk spreads in a two-dimensional volume space. For example, the logical volumes 10 to 112 are arranged as a four-by-four square matrix. The rows of the matrix correspond to respective disk spreads defined by the respective vectors V0=(0, 3, 1), V1=(4, 7, 1), V2=(8, 11, 1), and V3=(12, 15, 1). For each of these row vectors V0 to V3, the stride (S) is one. Also shown is a disk spread defined by a column vector V4=(2, 14, 4) having a stride (S) of four. In a multi-processor system, for example, the disk spreads represented by each of the row vectors V0, V1, V2, V3 could be assigned to a respective one of four host processors, and the disk spread represented by the column vector V4 could be assigned to a fifth host processor. In this case, none of the first four processors would share any of the volumes with any other of the first four processors, but each of the first four processors would share one volume with the fifth processor. In this fashion, a limited amount of information can be stored in the memory of a port adapter to define a rather large number of volumes having various shared and private relationships among a multiplicity of host processors.

Figure 15:
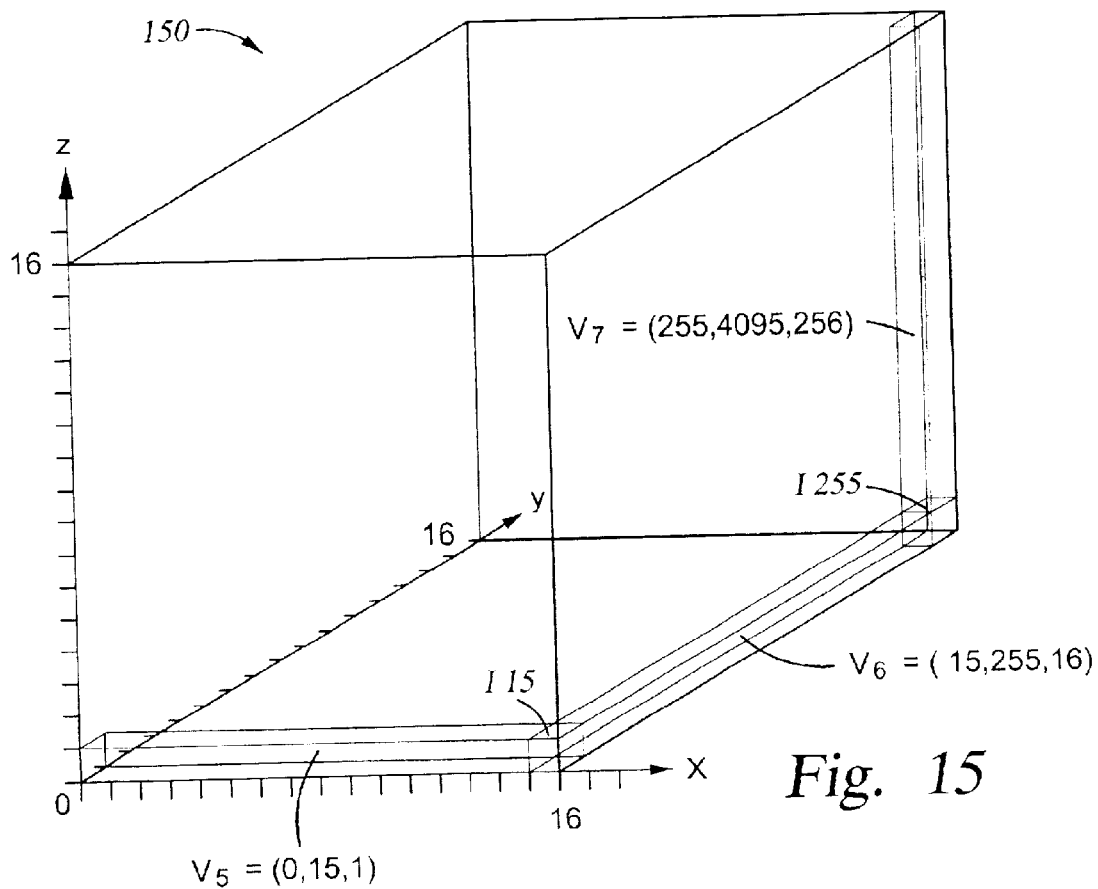
FIG. 15 is a graphical display of disk spreads in a three-dimensional volume space.

Referring to FIG. 15, there is shown a graphical display of disk spreads in a three-dimensional volume space. The volume space includes 4,096 volumes, or 16 volumes along each of the x, y, and z axes. Shown in this volume space is a first disk spread defined by a vector V5=(0, 15, 1) having a stride (S) of one, a second disk spread defined by a vector (15, 255, 16) having a stride (S) of sixteen, and a third disk spread defined by a vector V7=(255, 4095, 256). By using such a three-dimensional graphical display, it is possible to show complicated private and shared relationships between the volumes accessible to a large number of host computers. For example, the service processor 93 in FIG. 4 could provide such a three-dimensional view on the display. The volumes associated with a particular group name could be displayed in a corresponding primary color, so that the private and sharing relationships for up to three selected group names or host controller ports could be displayed simultaneously. For example, in FIG. 15, the disk spread specified by the vector V5 could be associated with a first host processor and displayed in red, the disk spread specified by the vector V6 could be associated with a second host processor and displayed in blue, and the disk spread specified by the vector V7 could be associated with a third host processor and displayed in green. Therefore the shared volume I15 would be displayed in magenta, and the shared volume I255 would be displayed in cyan. Moreover, the service processor could be programmed to display a colored two-dimensional 16×16 square matrix of the logical volumes for any selected one of 16 planes parallel to the x, y, or z axes in the logical volume space. In addition to indicating the private and shared relationships of the volumes to the hosts, the two-dimensional displays could provide additional information in the display region of each volume, such as a numeral or graph indicating of the free storage space in each volume.

Figure 16:
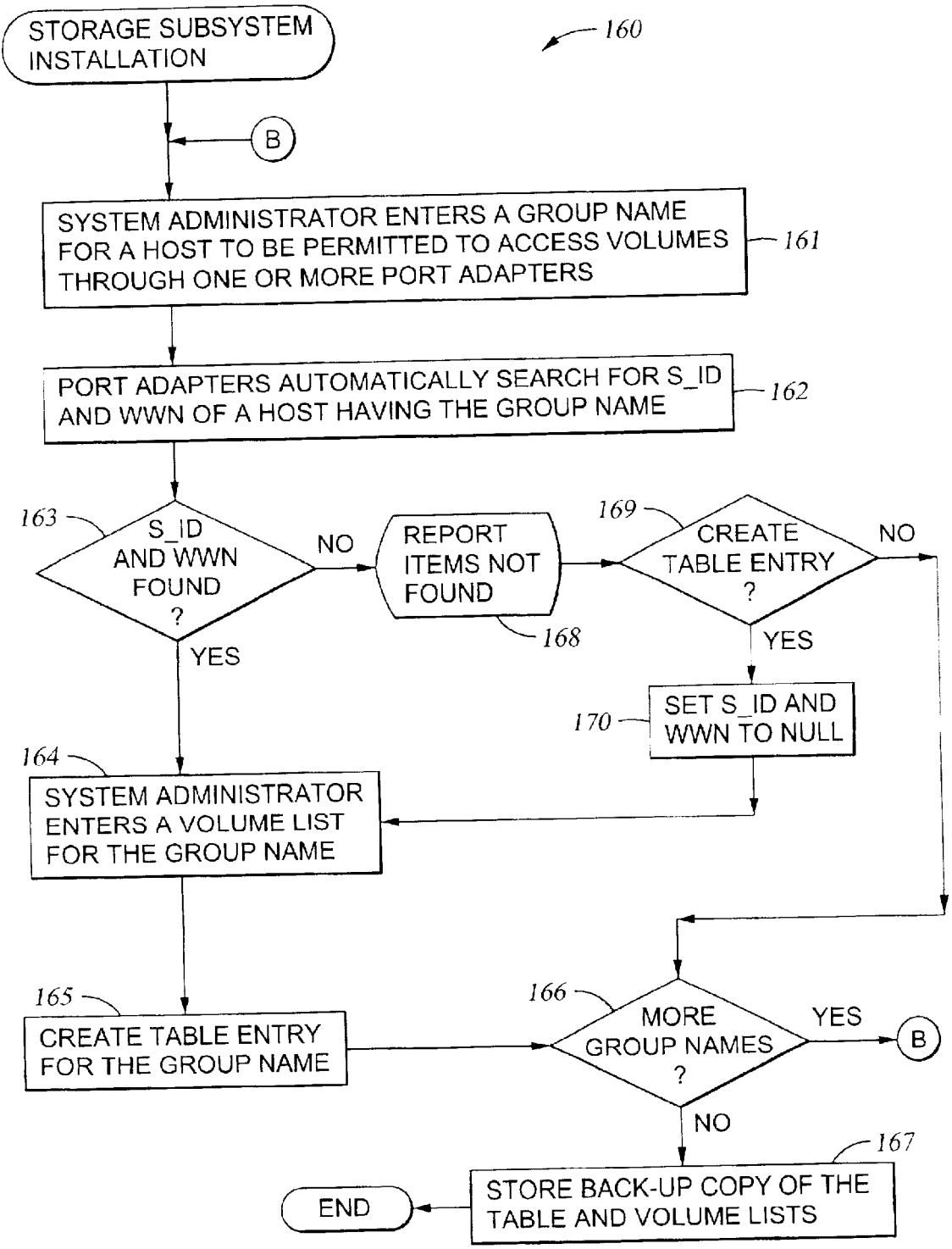
FIG. 16 is a flowchart of a microcode routine executed by a port adapter of the cached storage subsystem of FIG. 1 for volume configuration when installing the storage subsystem into the data processing system of FIG. 1.

Referring to FIG. 16, there is shown a flowchart 160 of a microcode routine executed by the microprocessor (76 in FIG. 4) of the port adapter (35 in FIG. 4) for volume configuration when installing the storage subsystem into the data processing system of FIG. 1. In a first step 160, the system administrator enters a group name for a host to be permitted access through one or more port adapters. For example, the system administrator manually operates the keyboard 92 in FIG. 4 to enter the host name, host controller number(s), and port adapter number(s). The service processor 93 forwards this information to the port adapter(s) and the microprocessor(s) in the port adapter(s) allocate(s) a table entry for each host controller number and places the respective group name into each table entry. Then in step 162, the port adapter(s) automatically search the network for the S_ID and WWN of the host controller ports corresponding to the group names. For example, the port adapters poll the ports of the hosts, and the host controllers are programmed to respond to port adapters by returning their host names and controller numbers. If the polling is successful in returning the S_ID and WWN associated with the group name, as tested in step 163, then execution continues to step 164. In step 164 the system administrator enters a volume list for the group name, for example by entering logical volume numbers, ranges of logical volume numbers, or vector specifications (beginning number, ending number, stride) at the keyboard 92 in FIG. 4. In step 165, the microprocessor creates a table entry for the group name and its associated S_ID, WWN, and a pointer to the volume list. In step 166, execution continues to step 167 if the system administrator has no more group names to enter; otherwise, execution loop back to step 161. In step 167, the volume access table and volume lists are copied to a storage volume as back-up for port adapter error recovery or diagnostic purposes, and the routine if finished. The back-up copy should be updated if additional group names are added to the volume access table or if the volume lists are changed.

If the polling is not successful in returning a S_ID and WWN for a host or group name, then execution branches from step 163 to step 168. In step 168, the items not found are reported to the system administrator, who has the option of creating or not creating a table entry if the items cannot be found. For example, it is possible for the system administrator to permit a table entry to be created for host controllers that are not presently logged into the data network, and the port adapter can fill in the missing items automatically if and when the host controller are booted. If the system administrator has selected the option of not creating a table when items are missing, then execution branches from step 169 to step 166. Otherwise, execution continues from step 169 to step 170. In step 170, the S_ID and WWN for the group name is set to null, and then execution continues to step 164.

Figure 17:
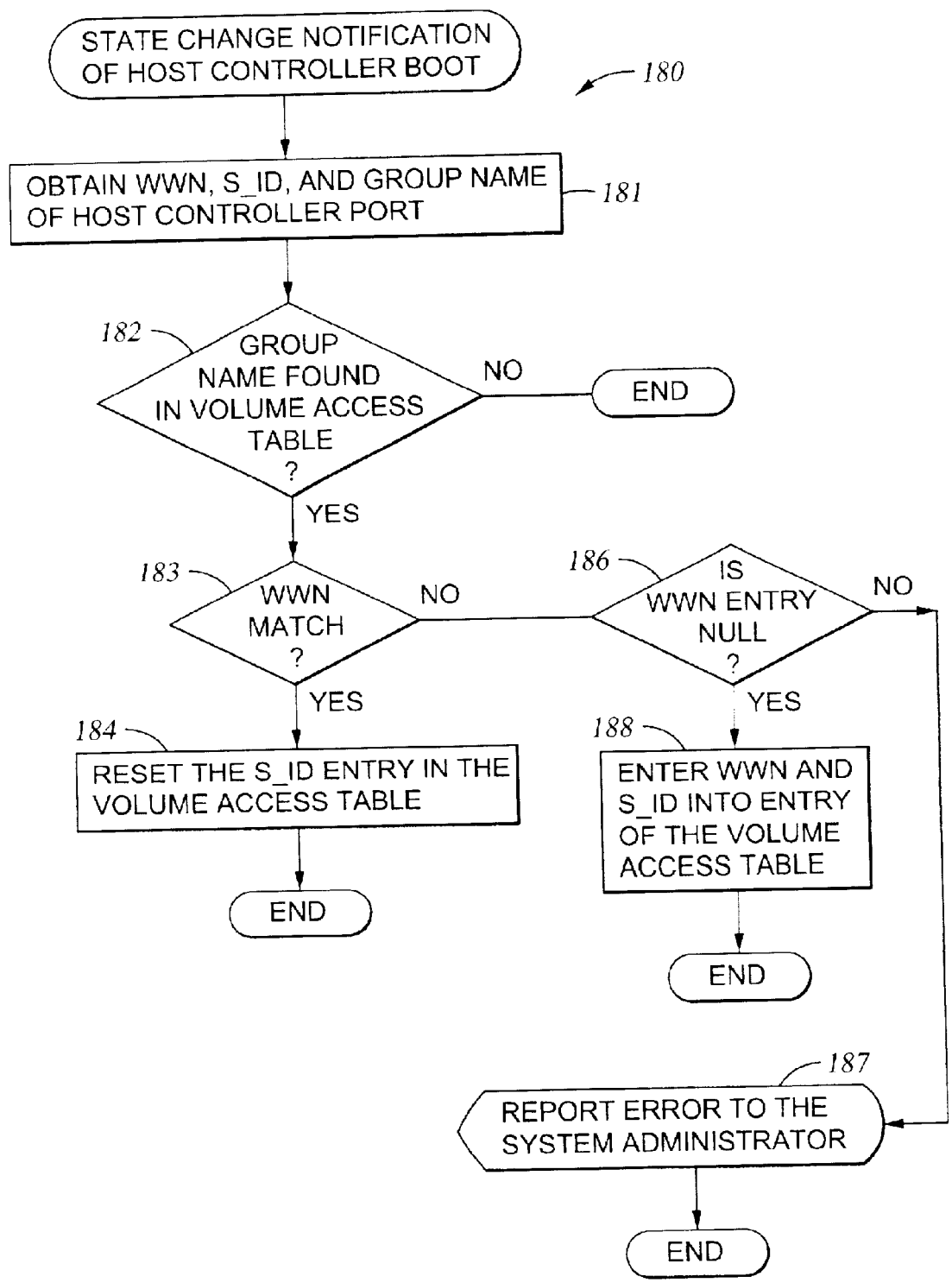
FIG. 17 is a flowchart of a microcode routine executed by a port adapter of the cached storage subsystem of FIG. 1 when notified of a network state change such as a host controller boot.

Referring to FIG. 17, there is shown a flowchart 180 of a microcode routine executed by the microprocessor (76 in FIG. 4) of the port adapter (35 in FIG. 4) when notified of a network state change such as a host controller boot. In a first step 181, the port adapter obtains the WWN, the S_ID, and the group name of the host controller port. Then in step 182, the volume access table is indexed with the group name. If no entry for the group name is found in the table, then the routine is finished. Otherwise, execution continues to step 183. In step 183, the WWN obtained from the host controller port is compared to the WWN in the table entry. If the WWN obtained from the host controller port is the same as the WWN in the table entry, then execution continues from step 183 to step 184. In step 184, the S_ID value in the table entry is reset to the value obtained by the port adapter in step 181, and the routine is finished.

If in step 183 the WWN obtained from the host controller port is different from the WWN in the table entry, then execution branches from step 183 to step 186. In step 186, execution branches to step 188 if the WWN in the table entry is null. The null value in the table indicates that the system administrator has authorized the WWN to be set during a controller boot, for example just after an authorized installation or change of a host controller circuit board. Therefore, in step 188 the WWN and S_ID obtained in step 181 are entered into the entry of the volume access table, and the routine is finished. In step 186, if the WWN entry is not null, then an unauthorized change in a host controller circuit board has occurred, and execution branches from step 186 to step 187 to report the error to the system administrator, and then the routine is finished.

Figure 18:
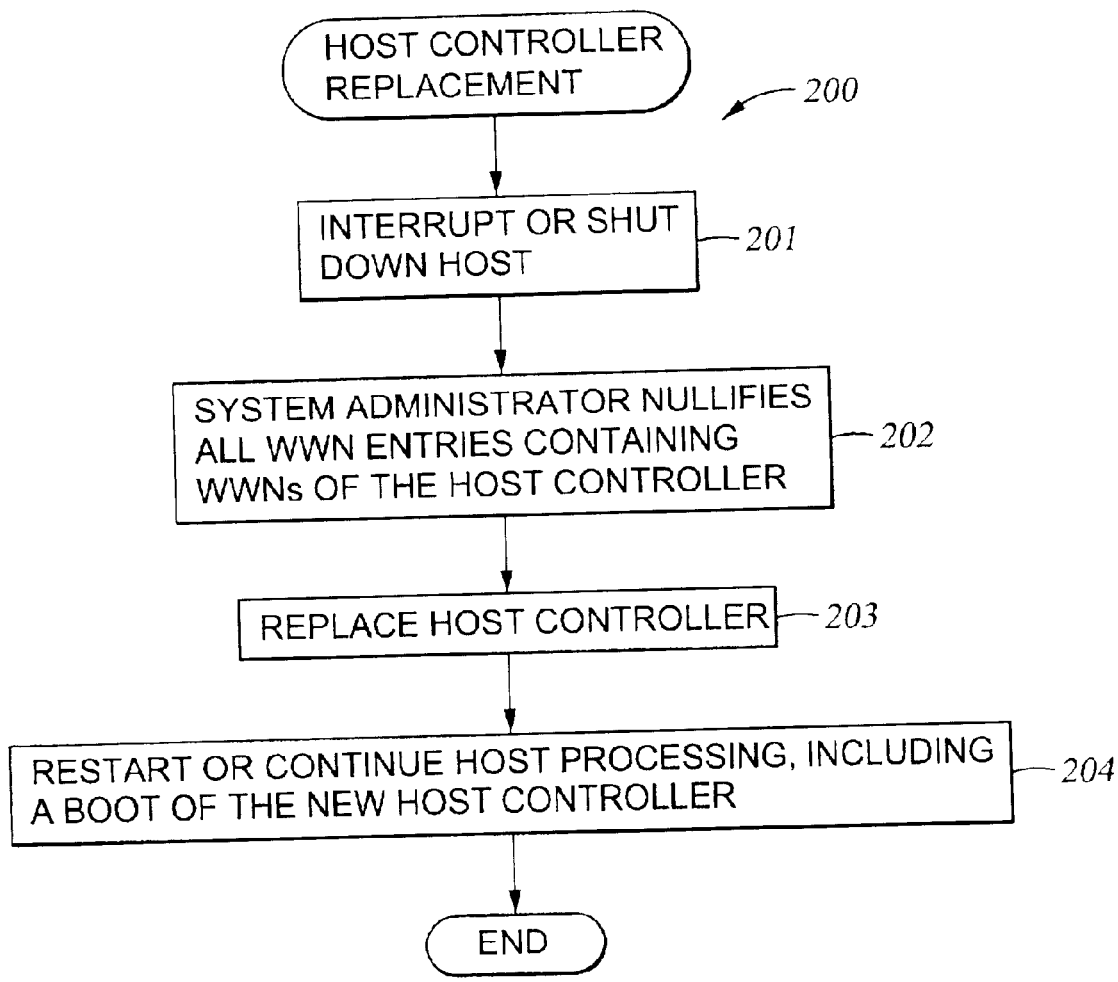
FIG. 18 is a flowchart of a procedure performed by a system administrator during host controller replacement.

Referring to FIG. 18, there is shown is a flowchart of the procedure that should be performed by a system administrator during host controller replacement. In step 201 the host is interrupted to suspend any communication over the data network or shut down to permit replacement of the host controller. Unless the host controller board has a "hot swap" capability, the host will be shut down to shut off power to the controller board before it is removed and replaced. Then in step 202, the system administrator nullifies the host controller's WWN in all such WWN entries in all volume access tables in all port adapters of the storage subsystem, and in step 203 the host controller is replaced. The replacement of the host controller board causes the WWNs of the ports of the host controller board to change. In step 204, host processing is restarted or continued, including a boot of the new host controller board, and the procedure is finished.

Mapping of LUNs to Logical Volume Numbers

As described above with reference to FIG. 7, a host may request access to a specified logical volume in the storage subsystem. If a host may access only a very limited set of the logical volumes in the data storage subsystem, however, it may be desirable for the port adapter to report back to each host a limited range of LUNs representing logical volumes that the host can access, and for the port adapter to map this limited range of LUNs to the limited set of logical volumes that each host can access. The host therefore does not need to deal with a large number of possible volumes, and minimal modification of the host programming is needed when a host is networked to the data storage subsystem. Instead of specifying a logical volume number when requesting access to a logical storage volume, the host specifies a LUN, and the port adapter receiving the storage access request translates the specified LUN to a corresponding logical volume number. There can be a different mapping of LUNs to logical volume numbers for each host or host controller port.

As shown in FIG. 19, the mapping of LUNs to logical volume numbers for a volume group name is specified by the entries in the volume list 210 associated with the volume group name. Each entry in the volume list 210 includes a LUN in the volume group and its corresponding logical volume number (VOL_NO.). The first entry 211 in the volume list, for example, maps LUN 1 to logical volume number 8.

In practice, it is desirable to assign ranges of contiguous LUNs to the volume groups or hosts. These ranges of contiguous LUNs, for example, are evident when the LUNs in the volume list are sorted by LUN, for example as shown in FIG. 19. In many cases, each range of contiguous LUNs corresponds to a range or vector of logical volume numbers. Therefore, in a data processing system having a large number of LUNs per host and an even larger number of logical volumes, it may be desirable to specify the LUN to logical mapping as a number of ranges of contiguous LUNs and corresponding vectors of logical storage volume numbers.

As shown in FIG. 20, for example, each entry in the volume list 220 associates a respective range of contiguous LUNs with a vector of logical volume numbers. Each entry includes the first LUN in the range, the number (N) of LUNs in the range, the beginning logical volume number in the associated vector of logical volume numbers, and the stride (S) of the vector. The first entry 221 in the volume list 220, for example, specifies a first LUN of one, a number (N) of three, a beginning logical volume number of eight, and a stride (S) of two. This maps the sequence of contiguous LUNs (1, 2, 3) to the sequence of logical volume numbers (8, 10, 12), and therefore the first entry 221 in the volume list 220 of FIG. 6 encodes the same information as the first three entries in the volume list 210 of FIG. 19.

To find whether a specified LUN is within the map of any entry in the volume list 220, the specified LUN value is compared to the LUN value in the entry, and if it is less than the LUN value in the entry, the specified LUN is not within the map of the entry. If the specified LUN value is greater or equal to the LUN value of the entry, then the specified LUN value is compared to the LUN value in the entry plus the value of N in the entry. If the specified LUN value is less than the LUN value in the entry plus the value of N in the entry, then the specified LUN is within the map of the entry; otherwise, it is not. If the specified LUN is within the map of the entry, then its corresponding logical storage volume number is computed as:

$$\mathrm{LOGICAL\_VOLUME\_NO.} = \mathrm{MAP\_VOL\_NO.} + (\mathrm{SPEC\_LUN} - \mathrm{MAP\_LUN})*S$$

where MAP_VOL_NO. is the VOL_NO in the map entry, SPEC_LUN is the specified LUN value, and MAP_LUN is the LUN value in the map entry.

Volume Partitioning by Virtual Ports

As described above with reference to FIG. 7, the port adapters can be programmed to provide a "Report LUNs" command that will report to each host only the LUNs or logical storage volumes assigned to the host. In other words, a host would not normally have the capability of seeing the LUNs or logical volumes assigned to another host. This offers some security, but it is incompatible with the conventional "Report LUNs" command of the Fibre Channel standards. In a Fibre Channel network, if a conventional "Report LUNs" command is used to discover LUNs, all ports will report back all of their LUNs.

The method of FIG. 7 also has the disadvantage that a significant amount of port adapter processing time is spent in managing variable-length volume lists or very long bitmaps. The method of FIG. 7 further has the disadvantage that the entire group of volumes for a host controller must be flagged as shared if only one of the volumes in the group are shared, which increases the access time of the private volumes in the group. It would be desirable to use a predefined, fixed-length format for the lists that are frequently accessed if this would not waste port adapter memory or unduly limit the set of logical volumes that could be assigned to each host. For a host controller having both shared and private volumes, it would be desirable to associate more than one group of volumes to the host controller, including one or more groups of all private volumes and one or more groups of all public volumes, so that each group can be separately flagged as private or public.

The method of virtual ports overcomes these disadvantages in a way that is compatible with the Fibre Channel specifications. In accordance with the method of virtual ports, the storage subsystem presents to the Fibre Channel network a set of "virtual" Fibre Channel ports that do not really exist on the network. A set of logical volumes is assigned to each of the virtual ports. The logical volumes within each set are accessible from the virtual port through at least one physical port of the storage subsystem. This physical port is therefore a fabric port and the storage subsystem provides a virtual switch from the physical port to each of the virtual ports accessible through the physical port. In particular, the physical port is a Fibre Channel FL_Port if it is in a loop of the Fibre Channel network, or it is a Fibre Channel E Port if it is connected to a switch, or otherwise it is a Fibre Channel F_Port. The port adapter providing the physical port is programmed to function as an FL_Port, E_Port or F_Port by responding to host login commands and assigning S_IDs; by responding to conventional Fibre Channel Report LUNs commands for reporting LUNs assigned to the virtual ports; and by responding to routing instructions from a host for routing data access requests to a specified virtual port and a specified LUN of the virtual port.

When using the method of virtual ports for volume partitioning, one or more virtual ports are assigned by the system administrator to each of the hosts having access to one or more of the virtual ports. Preferably logical storage volumes can be accessed through a single virtual port by no more than one assigned host. This simplifies the access control or filtering function of the storage subsystem, and does not unduly restrict the sets of logical volumes that can be accessed since a sufficiently large number of virtual ports can be created. A fixed-length format can be used for storing the lists of hosts, virtual ports, and LUN to logical storage volume mapping information for each virtual port because a variable number of virtual ports can be assigned to each host. If a host needs more logical storage volumes than can be included in the volume list for a single virtual port, another virtual port can be created and assigned to the host. Moreover, each virtual port can be accessible through any desired number of the storage subsystem adapter ports defined as FL_Ports, E_Ports, or F_Ports. The virtual port is made accessible by storing in the memory of the port adapter the access and mapping information for the virtual port.

A host uses conventional Fibre Channel commands and protocols for sending requests to its assigned virtual port or ports. Since the Fibre Channel standards do not restrict the ability of a host to send requests to all of the ports linked by the Fibre Channel network, there must be a mechanism for the system administrator's assignment of the virtual ports to the hosts to be communicated to the hosts, and the hosts must use this information to direct their storage access requests to the virtual ports to which they are assigned. This assignment information must also be used by the host if the host has an operating system that permits the host to boot from a logical volume in storage linked by the Fibre Channel network to the host, or that permits the operating system of the host to collect information about the logical storage volumes that it can access. In other words, the operating system routine that searches for the storage volumes that are accessible to the host must send Report LUNs commands to only the virtual ports assigned to the host and not to the virtual ports assigned to other hosts.

Figure 21:
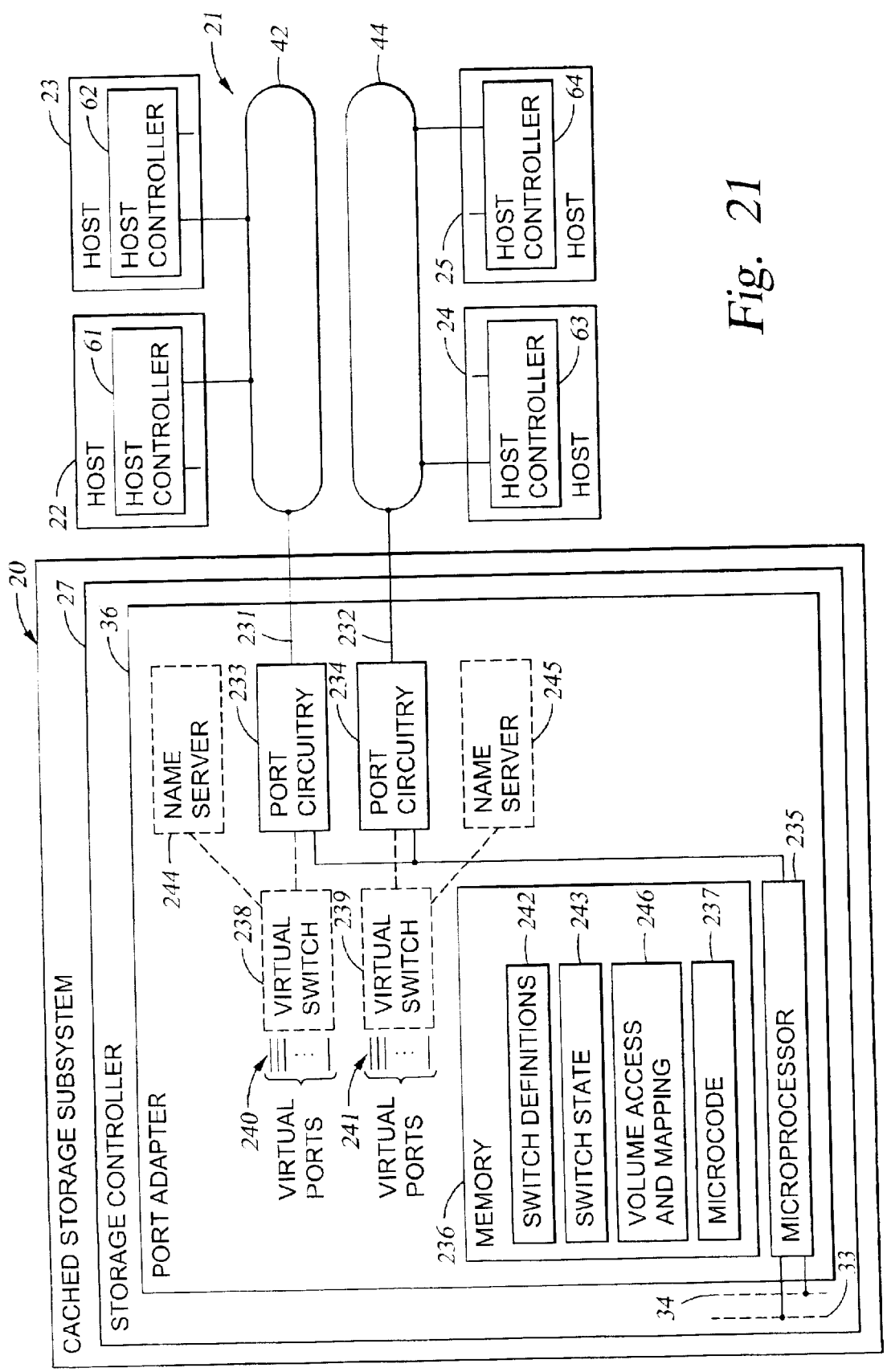
FIG. 21 is a schematic diagram of the data processing system of FIG. 1 showing one of the port adapters programmed to provide virtual ports for access to respective groups of logical storage volumes.

With reference to FIG. 21, the port adapter 36 of the cached storage subsystem is shown having been programmed to provide virtual ports for access to respective groups of logical storage volumes. The port adapter 36 has two physical ports 231 and 232 provided by port circuitry 233 and 234, respectively. The port circuitry performs serializing, framing, sequencing, flow control, and coordination of protocols and services in accordance with the Fibre Channel standards. The port adapter 36 further includes a microprocessor 235 and a random access memory 236. The microprocessor 235 executes microcode 237 in the random access memory 236. In particular, the microprocessor 235 is instructed by the microcode 236 to handle Fibre Channel requests received by the port circuitry 233 in such a way that there appears to be a respective switch 238, 239 in the storage controller 27 connecting each of the ports 123, 131 to a respective set of ports 240, 241 between the ports 123, 131 and the storage volumes (28, 29, 30, and 31) in the cached storage subsystem 20. Since the ports 240, 241 do not appear as physical nodes anywhere in the cached storage subsystem 20, the ports 240, 341 are called virtual ports, and the switches 238 and 239 are called virtual switches.

As far as the data network 21 is concerned, the virtual ports 240 and 241 function in a fashion similar to physical ports in the data network. The virtual ports are assigned respective port names, WWNs, and S_IDs, and requests from other nodes in the network are routed to them through their respective virtual switches 238, 239. For example, the virtual ports respond to Report LUN requests in a fashion similar to physical ports. In order to define the structure of the virtual switches, the random access memory 236 is programmed with switch definitions 242 and also stores switch state information 243. The switch definitions 242, for example, include the respective WWNs of the virtual switches 238 and 239, and the switch state 243 includes the S_IDs assigned at any given time to the virtual ports 240 and 241. The microcode 237 is also programmed to provide respective name servers 244 and 245 which provide nodes linked to the respective ports 231 and 232 with limited access to the switch definitions 242 and switch state 243. In particular, the name servers can provide the respective names, WWNs, and S_IDs of all the virtual and physical ports of the virtual switches.

The random access memory 236 is further programmed with volume access and mapping information 246. The volume access information indicates a respective set of storage LUNs that any host can access by requests addressed to the virtual ports 240, 241. The volume mapping information indicates respective logical volumes mapped to the virtual ports 240, 241. The volume access and mapping information for each of the virtual switches 238, 239 could be the same or it could be different. For example, it could be the same to permit any host to be disconnected from any one of the network loops 42, 44 and connected to the other loop without any change in the storage access privileges or procedures of the host. The set of logical storage volumes mapped to different virtual ports can be the same or different. For example, the set of logical storage volumes mapped to two virtual ports can be the same to permit two hosts to share the set of logical storage volumes mapped to the two virtual ports.

Figure 22:
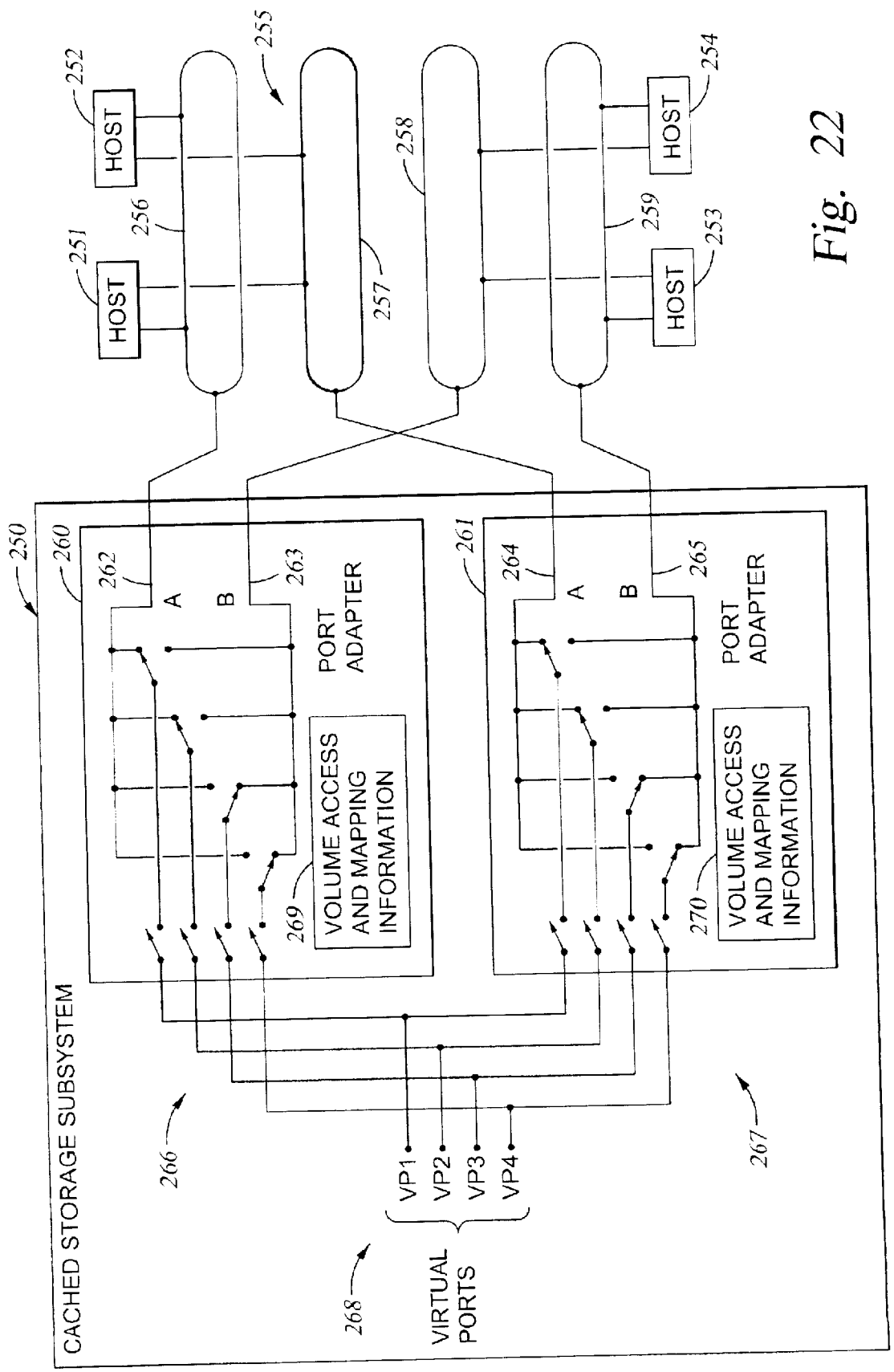
FIG. 22 is a schematic diagram of a data processing system in which port adapters are programmed to permit a host to access the same virtual ports through the physical ports of more than one of the port adapters.

With reference to FIG. 22, there is shown a data processing system having a cached storage subsystem 250 and four host computers 251, 252, 253, 254 linked to the cached storage subsystem by a data network 255. In this example, the hosts are linked by four loops 256, 257, 258, 259 to respective network port adapters 260 and 261 of the cached data storage subsystem. Each port adapter has two physical ports designated as "A" or "B". The physical port 262 of the port adapter 260 is an "A" port linked to the loop 256, the physical port 263 of port adapter 260 is a B port linked to the loop 257, the physical port 264 of port adapter 261 is an "A" port linked to the loop 258, and the physical port 265 of port adapter 261 is a "B" port linked to the loop 259. The port adapters 260, 261 are programmed to provide respective virtual switches 266, 267 linking their "A" and "B" physical ports to a set of virtual ports 268, including a respective virtual port VP1, VP2, VP3, VP4 assigned to each of the hosts 251, 252, 253, 254. Each of the port adapters 260 and 261 is programmed with respective volume access information 269, 270 which can be identical to permit any of the hosts 251, 252, 253, 254 to be disconnected from any one of the loops 156, 157, 158, 158 and reconnected to any other of the loops without any change in the storage access privileges or procedures of the host.

Figures 23, 24, 25:
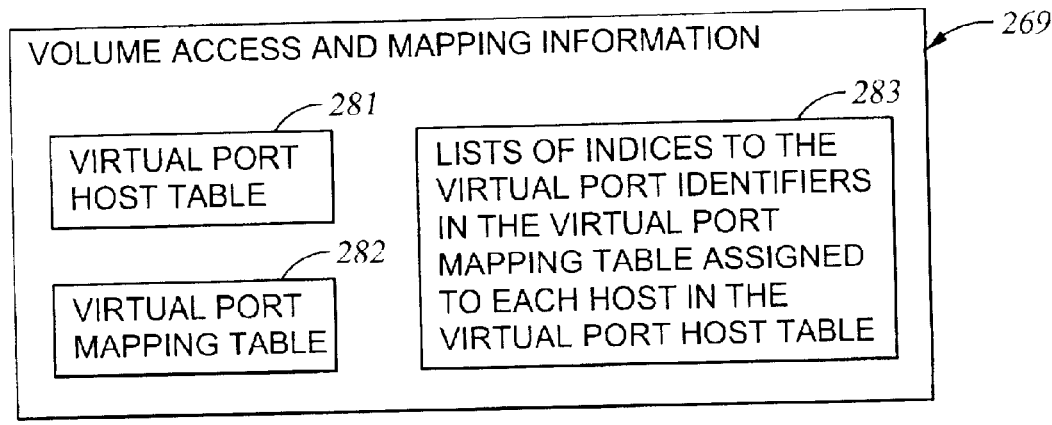
FIG. 23 is block diagram of data structures of volume access and mapping information stored in memory of port adapters of the storage subsystem of FIG. 21 or FIG. 22.
FIG. 24 is a diagram of a virtual port host table included in the volume access and mapping information of FIG. 23.
FIG. 25 is a diagram of a virtual port mapping table included in the volume access and mapping information of FIG. 23.

With reference to FIG. 23, there is shown an example of the volume access and mapping information 269 of FIG. 18. The volume access and mapping information 246 of FIG. 21 can have a similar format. The volume access and mapping information 269 includes a virtual port host table 281 listing each host having access rights through a virtual switch controlled with the volume access and mapping information, and a virtual port mapping table 282 listing each virtual port accessible through the virtual switch controlled with the volume access and mapping information. Separate tables are used because each host listed in the host table can have more than one assigned virtual port. Also included in the volume access and mapping information 269 are optional lists 283 of indices to the virtual port identifiers in the virtual port mapping table 282 assigned to each host in the virtual port host table 281. The lists 283 are optional because the information in the lists could be obtained by scanning through an entire column of host indices in the virtual port mapping table. The lists 283 are not needed for handling a storage access request by a host. The lists 283 are used for quickly responding to a host when the host requests a report of the virtual ports from which it can access logical storage volumes. It is desirable to compile the lists by scanning the host index column of the virtual port mapping table and store the lists if a large number of hosts will be requesting the information frequently, for example, if the hosts login to the network frequently and request the information during each network login. The lists 283 in total have a limited memory requirement because each virtual port in the virtual port mapping table can have only one assigned host, so that in total the lists 283 include no more than one occurrence of a virtual port index for each of the virtual ports listed in the virtual port mapping table.

Referring to FIG. 24, there is shown a format for the virtual port host table 281. The table 282 includes a unique row for each host controller port from which a host can access a virtual port defined in the virtual port mapping table (282 of FIG. 23). The table 281 includes a column for the HOST_ID of the host controller port, a flag PORT A/B indicating whether the host controller port is linked to the physical "A" or "B" port of the port adapter programmed with the table 281, the WWN of the host controller port, the S_ID of the host controller port, a V_PORT INDEX which is a first index to a row of information in the virtual port mapping table (282 in FIG. 23) to which the host controller port has access through the port adapter, and a V_PORT LIST POINTER which is zero if there is only one V_PORT associated with the host controller port and otherwise points to a list of additional virtual port mapping table indices to rows of information about additional virtual ports to which the host controller has access through the port adapter.

The HOST_ID, for example, is the IP address of the host controller port. The HOST_ID could have the same format as the volume group name of the table in FIG. 5; i.e., a host name and controller sequence number If the optional lists of indices to the virtual port table are not used, the V_PORT LIST POINTER would simply be a flag indicating whether or not there is more than one virtual port associated with the host controller port. If there is only one, it is found in the V_PORT INDEX column of the virtual port host table. If there is more than one, then the entire list can be found by scanning the HOST INDEX column of the virtual port mapping table 282 for entries having a HOST INDEX matching the index of the row in the virtual port host table containing the information for the host controller port.

Referring to FIG. 25, there is shown a format for the virtual port mapping table 282. The table 282 includes a unique row for each virtual port accessed through the port adapter. The table 282 includes a column for the V_PORT_ID of the virtual port, a HOST INDEX to a row of the virtual port host table for the host controller port associated with the virtual port, a private/shared flag, and a LUN TO LOGICAL VOLUME MAP specifying the set of LUNs at the virtual port, the set of logical storage volumes accessible from the virtual port, and the mapping between the LUNs and the logical storage volumes accessible from the virtual port. The V_PORT_ID is a primary key for the table 282. The table 282, for example, is sorted by the V_PORT_ID or has an associated hash table directory to facilitate searching of the table for a specified value of the V_PORT_ID. The VPORT_ID could be an IP address for the virtual port.

The LUN TO LOGICAL VOLUME MAP in each row of the table 282 could use the format of FIG. 19 or FIG. 20 with a fixed number of either the entries shown in FIG. 19 or the entries shown in FIG. 20. Since there would be a fixed number of possible entries of the format of FIG. 19 or FIG. 20 but less than all of the entries might be used at any given time, the unused entries could be filled in with a null value for the LUN, such as a zero LUN value. The first entry would always be used, and any other entries used would be contiguous with the first entry, so that all of the entries used could be found by scanning and testing the LUN value in the entry. Alternatively, the LUN TO LOGICAL VOLUME MAP for each virtual port could be preceded with an integer value indicating the number of entries used in the map at any given time.

The LUN TO LOGICAL VOLUME MAP in each row of the table 282 could be a bitmap in the form of a LUN to logical volume mapping matrix. The logical OR of all the rows of such a matrix would be a bitmap indicating all of the logical volumes accessible from the virtual port. The logical OR of all the columns of such a matrix would be a bitmap indicating all of the LUNs accessible from the virtual port. The use of such a mapping matrix would not be a practical alternative if there were a large number of virtual ports, hosts, possible LUNs, and logical volumes, since the number of bits of memory for storing such all of the mapping matrices would be the product of the number of virtual hosts, the number of possible LUNs, and the number of logical volumes.

Figure 26:
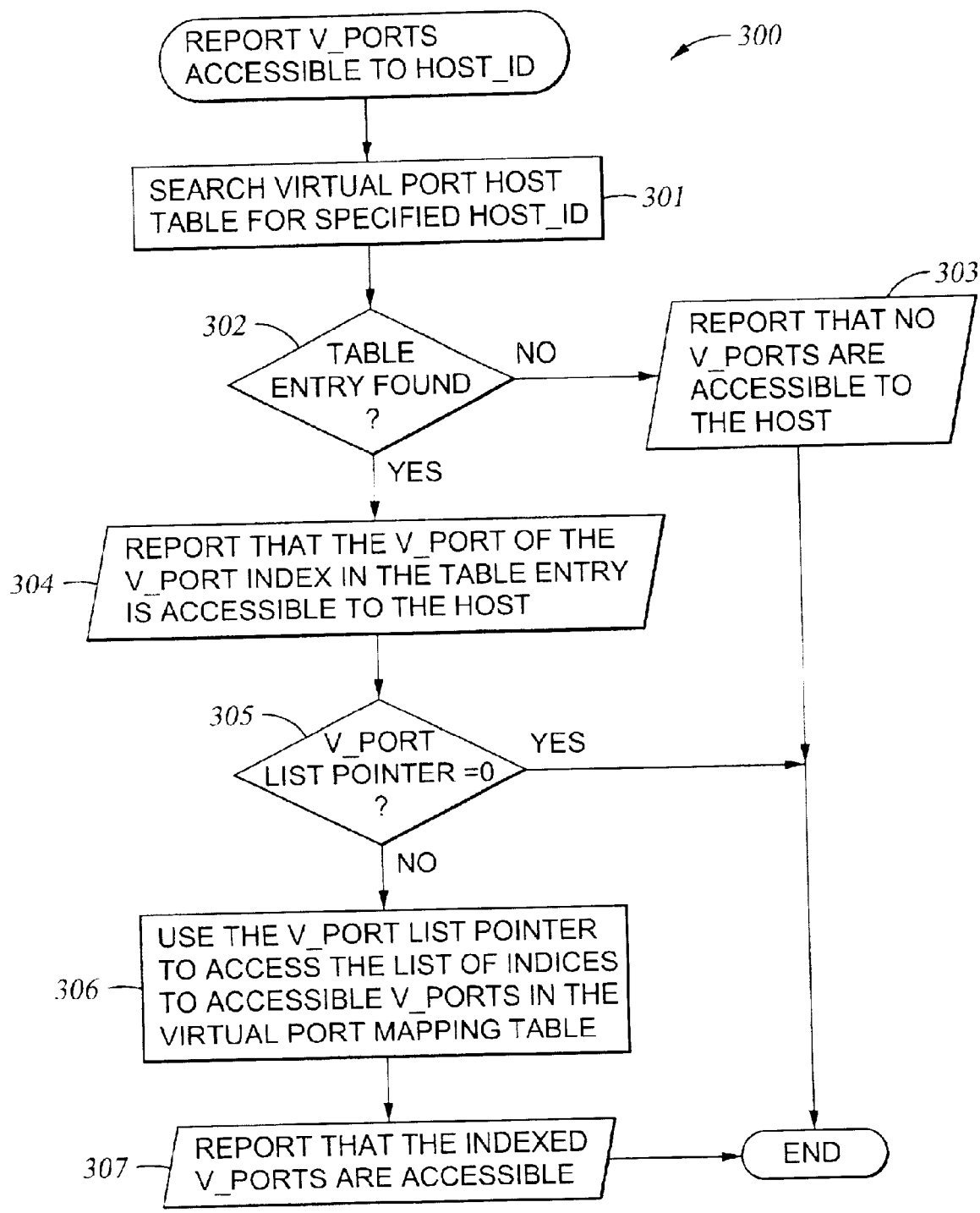
FIG. 26 is a flow chart of a routine performed by a port adapter when reporting the virtual ports accessible to a host controller port.

Referring to FIG. 26, there is shown a flowchart of a routine executed by the microprocessor of the port adapter to provide a service for reporting the virtual ports accessible to a host controller port through the port adapter. This service could provide such a report when a host controller logs in to the data network, or when a host controller port requests the information from a name server of the virtual switch provided by the port adapter. In a first step 301, the microprocessor searches the virtual port host table for an entry including a specified HOST_ID. In step 302, execution branches to step 303 if a table entry is not found for the specified HOST_ID. In step 303, the port adapter reports that there are no V_PORTS accessible to the host through the port adapter, and the routine is finished.

In step 302, execution continues to step 304 if a table entry is found for the specified HOST_ID. In step 304, the port adapter reports that the V_PORT of the V_PORT index in the table entry is accessible to the host. In other words, the microprocessor reads the V PORT INDEX from the row of the virtual port host table containing the specified HOST_ID, and then indexes the virtual port mapping table with the V_PORT INDEX to find the first V_PORT_ID associated with the HOST_ID. In step 305, the V_PORT LIST POINTER is compared to zero, and if it is zero, then the routine is finished. Otherwise, execution continues from step 305 to step 306.

In step 306, the V_PORT list pointer is used to access the list of additional indices to accessible V_PORTS in the virtual port mapping table. Finally, in step 307, the port adapter reports that the indexed V_PORTS are accessible to the host through the port adapter, and the routine is finished.

Figure 27:
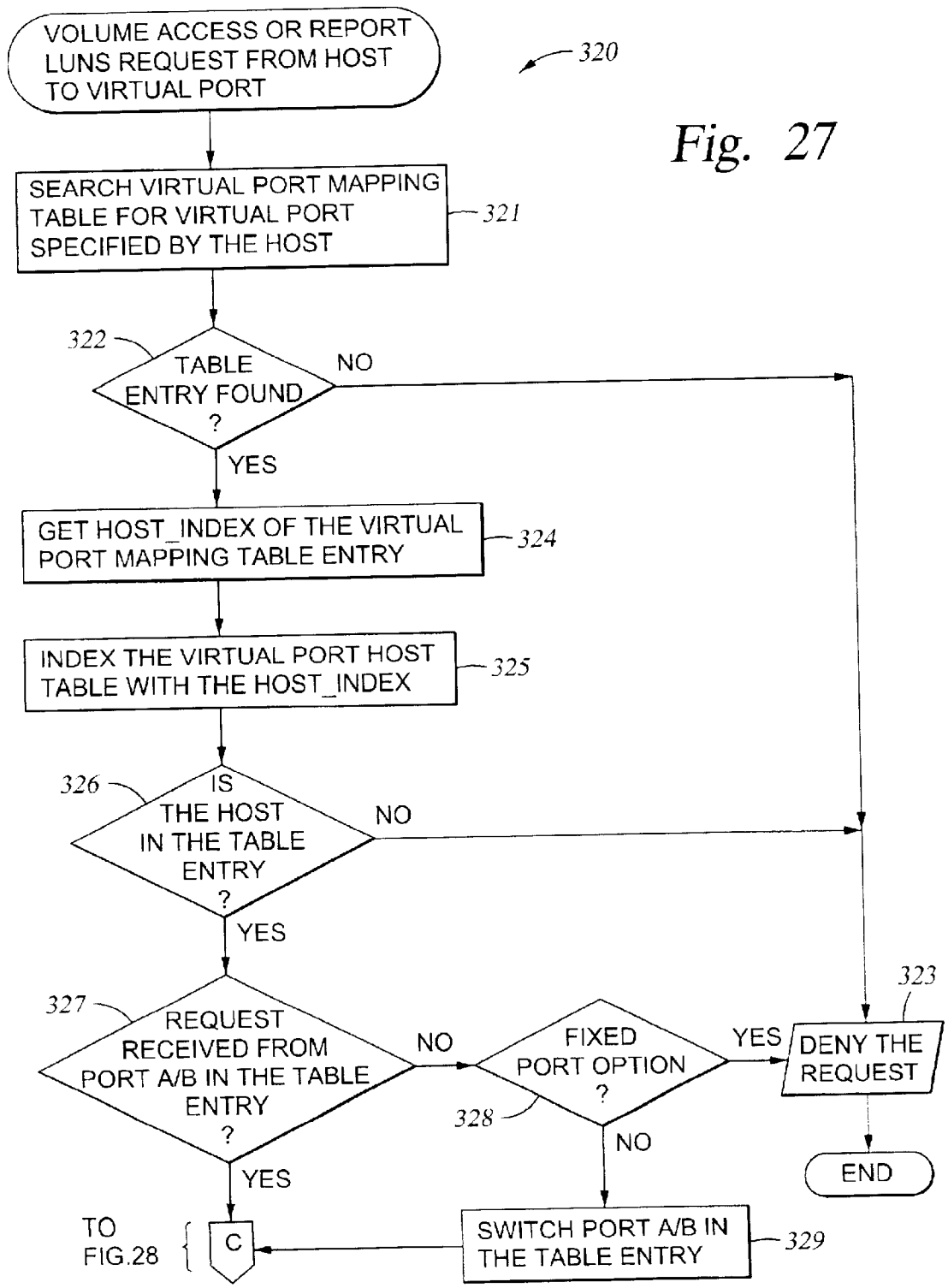
FIG. 27 is a first sheet of a flow chart of a routine performed by a port adapter when responding to a volume access request or "Report LUNs" request from a host.

Referring to FIG. 27, there is shown a flowchart 320 of a routine executed by the microprocessor of a port adapter when the port adapter receives from a host controller port a volume access or Report LUNs request to a specified virtual port. To ensure compliance with the Fibre Channel standards, this Report LUNs request might be different from and in addition to the standard Report LUNs command. The Report LUNs request of FIG. 27 reports the storage LUNs accessible to a specified host controller port, in contrast to the standard Report LUNs command which could report all LUNs accessible from a virtual port including all storage LUNs accessible from the virtual port by any of the hosts. In response to a standard Report LUNs command directed to a virtual port, the port adapter would search the virtual port mapping table 282 of FIG. 25 for the V_PORT_ID specified by the Report LUNs command to find the table entry including the V_PORT_ID, and then report all of the LUNs included in the LUN TO LOGICAL VOLUME MAP in the table entry.

In a first step 321 of the flowchart 320, the microprocessor searches the virtual port mapping table for the entry of the virtual port specified by the host. If such a table entry is not found, then execution branches from step 322 to step 323. In step 323, the request is denied, and the routine is finished. If such a table entry is found, then execution continues from step 322 to step 324. In step 324, the microprocessor obtains the HOST_INDEX of the entry of the virtual port mapping table. In step 325, the virtual port host table is indexed with the HOST_INDEX.

In step 326, the HOST_ID of the host controller port requesting access is compared to the HOST_ID in the indexed entry of the virtual port host table. If the HOST_ID of the host controller port requesting access is not equal to the HOST_ID in the indexed entry of the virtual port host table, then execution branches from step 326 to step 323. In step 323 the port adapter denies the request, and the routine is finished. If the HOST_ID of the host controller port requesting access is equal to the HOST_ID in the indexed entry of the virtual port host table, then execution continues from step 326 to step 327.

In step 327, the microprocessor checks whether the port adapter's physical port "A" or "B" from which the request was received is the same as the physical port "A" or "B" indicated by the PORT A/B flag in the indexed entry of the virtual port host table. If not, then execution branches from step 327 to step 328. In step 328, execution branches from step 328 to step 323 to deny the request if a "fixed port option" is selected. The "fixed port option" would be selected if it is desired for a host controller port to access the specified virtual port only through a specified one of the physical "A" or "B" ports of the port adapter. This option could apply or not apply to all of the host controller ports, or the option could be specified by a flag (not shown) in each entry of the virtual port host table to selectively apply the option to each host controller port. For example, the option could be selected for desktop workstations, and not be selected for portable host computers. If the fixed port option is not selected, then execution continues from step 328 to step 329. In step 329, the microprocessor switches the PORT A/B flag in the table entry. Execution continues from step 329 to step 330 of FIG. 27. Execution also continues from step 327 to step 330 of FIG. 27 if the request was received from the port adapter's physical "A" or "B" port indicated by the PORT A/B flag in the indexed entry of the virtual port host table.

Figure 28:
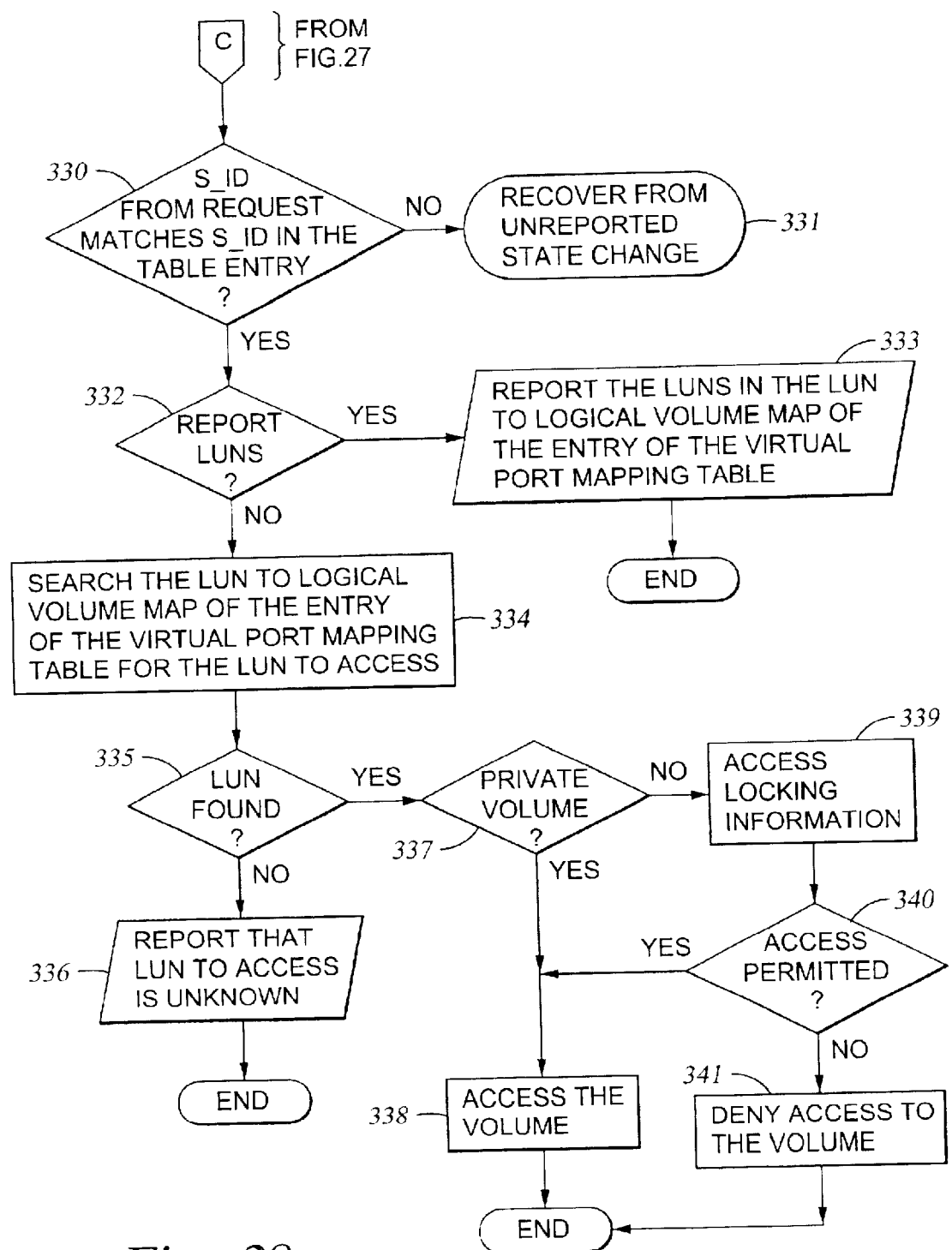
FIG. 28 is a second sheet of the flow chart begun in FIG. 27.

Referring to FIG. 28, in step 330 the S_ID from the request is compared to the S_ID in the indexed entry of the virtual port host table. If the S_ID of the request does not match the S_ID in the indexed entry, then execution branches from step 330 to step 331 to recover from the unreported state change. If the port adapter cannot verify the new S_ID in the request, then the request is denied; otherwise, the S_ID value in the indexed entry is changed to the new value in the request, and execution continues in step 332. Execution also continues from step 330 to step 332 if the S_ID from the request matches the S_ID in the indexed entry.

In step 332 execution branches to step 333 for processing a "Report LUNs" request from a host controller port. In step 333, the port adapter reports to the host controller port the LUNs in the LUN TO LOGICAL VOLUME MAP of the indexed entry of the virtual port mapping table, and the routine is finished. Execution branches from step 332 to step 334 for processing a storage access request from a host controller port. In step 334, the microprocessor searches the LUN TO LOGICAL VOLUME MAP of the indexed entry of the virtual port mapping table for the specified LUN to access. If the LUN to access is not found, then execution branches from step 335 to step 336. In step 336, the port adapter reports to the host controller port that the specified LUN to access is unknown, and the routine is finished.

Execution continues from step 335 to step 337 if the LUN to access is found in the LUN TO LOGICAL VOLUME MAP of the indexed entry of the virtual port mapping table. In step 337, the private/shared flag is inspected for the indexed entry of the volume access table. If the private/shared flag is set, then execution continues from step 337 to step 338. In step 338, the port adapter accesses the logical volume mapped to the LUN specified by the host controller, and the routine is finished. If the private/shared flag is not set, then execution branches from step 337 to step 339 to access locking information in the cache memory for the logical volume mapped to the LUN specified by the host controller. If the volume is private to the host controller, then access is permitted, and execution branches from step 340 to step 348 to access the volume. If the volume to access is public and is already locked in a fashion incompatible with the access requested by the host (e.g., the volume is already write locked and the host controller requests a read or a write access, or the volume is already read locked and the host controller requests a write access) then access not presently permitted. The host controller's S_ID is placed on a wait list, in order to notify the host controller when the logical volume becomes available; execution branches from step 340 to step 341 to temporarily deny access to the volume, and the routine is finished. If the volume to access is public and is not locked or is locked in a fashion compatible with the requested access by the host controller (e.g., the volume is already read locked and the host controller requests a read access), then a lock is granted to the host controller, and execution branches from step 340 to step 338 to access the volume, and the routine is finished.

Graphical User Interface for Virtual Ports

Figure 29:
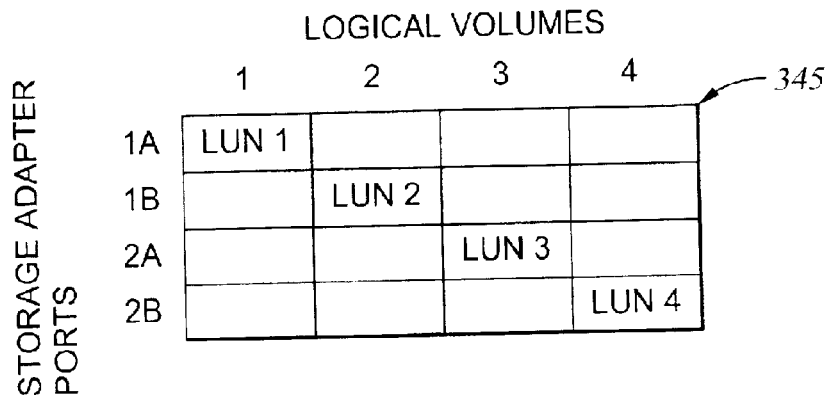
FIG. 29 is a diagram of a display generated by a graphical user interface to show a mapping relationship between logical volumes, storage adapter ports, and LUNs at a virtual port.

A conventional graphical user interface (GUI) for a cached storage subsystem of the type shown in FIG. 1 includes a grid of logical volumes to storage adapter ports. At each intersection of the grid, the target/LUN is assigned. This provides a mechanism for the system administrator to set and view the mapping of LUNs to logical storage volumes and the storage adapter ports used for accessing the physical storage volumes that make up the logical storage volumes. Referring to FIG. 29, there is shown an example of how the mapping of LUNs to logical storage volumes can be incorporated into a GUI for a cached storage subsystem that uses virtual ports. It is still possible to use a grid for defining the relationship between logical volumes, LUNs, and storage adapter ports, but the GUI display screen is partitioned into groups of V_PORTs by physical port of the port adapters. In this example, each intersection allows the definition of the LUN only. FIG. 29, for example, shows a single grid 345 for the logical volumes accessible by a host controller port linked to the physical port A of a port adapter 1 addressing LUNs at a virtual port 1. A similar grid could be displayed for each virtual port defined in the storage subsystem.

Figure 30:
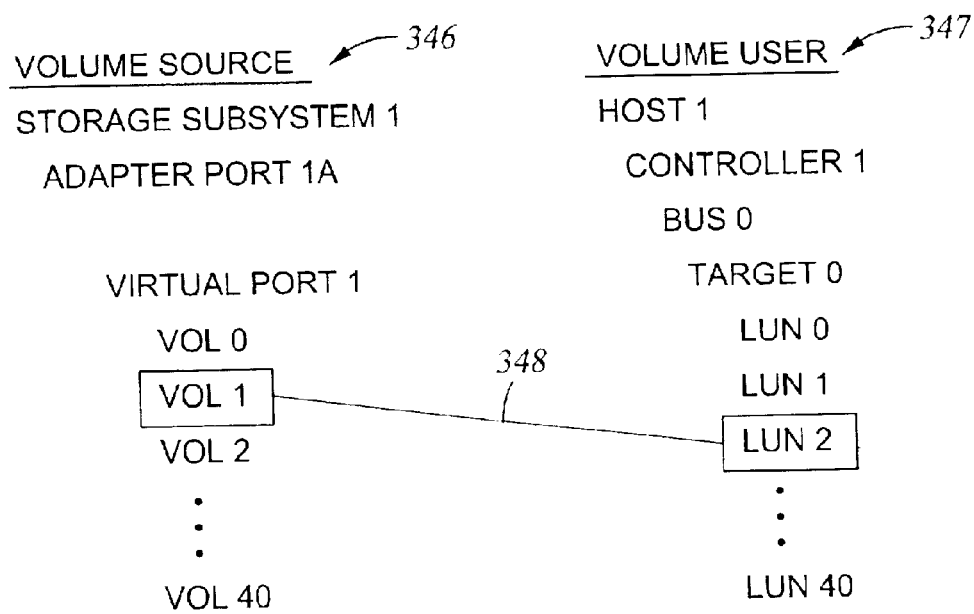
FIG. 30 is a diagram of a display generated by a graphical user interface to establish a mapping between volumes accessible at a virtual port for a host and the LUNs at the virtual port.

Referring to FIG. 30, there is shown a GUI display screen for permitting the system administrator to set up the relationship between logical storage volumes of the storage subsystem (the volume source) and the volumes addressed by a host (the volume user). In this example, the GUI display screen includes, on the left, a list 346 in outline form of storage subsystem components down to a set of logical volumes for one virtual port, and on the right, a list 347 in outline form of host components down to a set of LUNs as addressed from one host controller port. The "bus" in the right column refers to a host controller, and the "target" in the right column refers to a port of the host controller. The display starts out with a list of storage subsystems and a list of hosts linked by the data network. The system administrator selects a storage subsystem or host by clicking on it with a pointing device such as a mouse interfaced to the service processor, and expand the list to the next lower level by double clicking on a selected item of the list. By expanding the lists down to the port adapter and host controller port levels, the system administrator clicks on a particular physical adapter port in the left column to get to virtual ports and logical volumes for the particular adapter port, and then clicks on a particular controller bus and target to get the LUNs as addressed by the host. The system administrator selects an unallocated virtual port in the left column for a physical adapter port and then selects a host controller port in the right column to allocate the host controller port to the virtual port. The system administrator could then select a logical storage volume, or selected range of volumes, and select a LUN or range of LUNs as addressed by the host controller port, to establish the LUN to logical volume mapping. For example, in FIG. 30, the GUI display has drawn a line 348 between the selected logical storage volume VOL1 and the selected LUN 2 to show that such a mapping has been established. The system administrator could also select an item on either list and "collapse" the list to go back up to the level in the outline above the selected item. For data security, any unallocated logical volume should be re-formatted or erased of any pre-existing data before being allocated.

The system administrator could select an item on either list and select a "properties" option to display properties of the selected item. For example, the grid 345 of FIG. 29 could be one of the properties of the virtual port 1. The properties of a logical storage volume would include the host controller ports having access to the logical storage volume, and the paths or adapter ports and virtual port through which the host controller ports can access the logical storage volume.

The preferred embodiment of the graphical user interface used by the system administrator has the following additional functions. For security, password protection is desirable on a user and/or host level. For flexibility, it is desirable to have be able to modify or view a host's volume configuration from local or remote hosts. The systems administrator should have the ability to read and write the physical and virtual port names of storage subsystem as defined in the a configuration database. The configuration database should contain flags that indicate if a volume can be shared. If sharing of a volume is forbidden, the graphical user interface does not allow it to be allocated to more than one host. If it can be shared, the system administrator is notified of this upon configuration creations of shared volumes.

The graphical user interface may recognize an "Install" command to be use when a new host controller port is introduced. The install command writes the host's configuration information into the volume configuration database.

The graphical user interface may recognize a "Replace" command to replace a host controller port. The graphical user interface maintains a list of the WWNs for each controller port on the host. The graphical user interface also keeps a historical database of all WWNs ever known to be networked to the storage subsystem Using this information, the graphical user interface can determine that a known host controller port is not bound to a configuration and also a configuration that contains a new host controller port that did not previously exist on the host. As described above with reference to FIG. 18, the system administrator should be involved in the introduction of any new host controller ports into the configuration.

The graphical user interface may recognize a "Configuration" command to enter or modify a host's volume configuration information for a local or remote host. This configuration information should be stored in the configuration database in the storage subsystem.

The graphical user interface should recognize a "remove from service" command for use when removing a host or host controller from service. In response to this command, the graphical user interface deletes the associated volume configuration information from the database.

The graphical user interface may recognize a "View Configuration" command, and respond by displaying a schematic diagram of the fabric or loop in the data network, and displaying attribute information (such as port WWN) according to its availability.

The graphical user interface may provide separate displays of the assignments of the virtual ports to the host channel ports, the mappings of LUNs to logical volumes, and the allocation of the logical volumes to the storage adapter ports and to the storage devices.

One the system administrator defines the virtual ports and mappings between the logical volumes and LUNs, the storage subsystem can automatically assign network addresses, WWNs and S_IDs to the virtual ports, and obtain the WWNs and S_IDs of the host controller ports when the host controller ports log in to the network. This could be done in a fashion similar to that described above with respect to FIGS. 16 to 18, by setting unknown host controller port WWNs and S_IDs to null values.

Since a cached storage subsystem of the type shown in FIG. 1 typically has a small number of physical adapter ports, such as 16, the method of virtual ports can be introduced in such as system using a small number of V_PORTs per physical ports. For example using only 4 V_PORTs per physical port will allow the cached data storage system to 64 ports. Once users would become familiar with the concept of the virtual ports, the number of virtual ports permitted per physical port could be increased, and additional facilities could be introduced for volume configuration and site management of the Fibre Channel network. These facilities could permit involvement of the host in allocating and de-allocating logical storage volumes and changing the configuration and mapping of LUNs to logical storage volumes.

Host Involvement in Volume Configuration and Mapping.

A number of facilities could be used to permit host involvement in the storage volume configuration and mapping. The facilities should not assume the existence of "trusted" hosts. The identity of a host requesting a change in the volume configuration and mapping should be authenticated.

A primary copy of the configuration information for the volumes accessible to a host is kept in the storage subsystem and on the host. The host should be able to access the primary copy on the storage subsystem if a host's local copy is not available. II However, an exception to this would be a host that is responsible for storing the primary copy of another host. The configuration information should be accessed through read and write commands and should be protected against accidental writes. For example, the configuration information is stored in a predefined logical volume, such as a volume accessed at LUN0, that functions as a gatekeeper device.

No host should be able to gain access to another host's volume unless sharing is enabled. Sharing should be permitted when desired. For example, the volume attributes and locking information (89 in FIG. 7) associated with the logical volumes includes a flag for each volume to indicate whether or not sharing of the volume is permitted. This flag is inspected when the graphical user displays the logical volumes available for allocation, or when a host requests allocation of a volume. A host controller driver program also may limit (or filter) the number of volumes that can be seen by the host operating system (and thus the host applications) by using the information contained in the configuration database.

Each host should be allowed to use its own volume address space (LUNs) regardless of the volume address space used in the storage subsystem. This is the function of mapping LUNs to logical volumes, as described above.

Management of the configuration information should be permitted from any location within the data network enterprise. A system administrator should not be required to log into any host that is the target of the configuration changes.

The facilities should work well with a variety of existing host and storage system components, for example, by preserving SCSI conventions, and supporting both IP and SCSI conventions within a single host controller.

The facilities should provide for installation, volume reconfiguration, topology reconfiguration, boot from local disk, boot from Fibre Channel disk, normal I/O operation, replacement of a controller from existing host, replacement of a controller known in the current configuration with an unknown host during installation, and reuse of a controller known in the current configuration as a replacement controller. Suitable installation, volume configuration, normal I/O operation, and controller replacement facilities have been described above.

Topology reconfiguration occurs whenever a connection is added, deleted, or modified in the data network. Some of the types of problems that can occur is for the S_ID of a host controller port to change. Therefore, the ports should login to the data storage subsystem to register the new S_IDs. Otherwise, the port adapters may recognize and recover from unreported state changes, as described above. A host controller port may become unlinked from a physical "A" port and relinked to the physical "B" port. If the "portable host" option is selected, this causes no difficulty. A host controller port may become unlinked form the physical port of a first port adapter and relinked to the physical port of a second port adapter. Unless the same virtual port is defined as accessible to the host controller port in each of the port adapters, this will cause the second port adapter to reject host requests. In this case, it is necessary to transfer the virtual port definitions and mappings from the first storage adapter to the second storage adapter.

The facilities that can be used by a host for booting are the routine described above for reporting to a host the virtual ports available to the host, and the routine described above for reporting to the host the LUNs available to the host from a virtual port. These routines could be programmed into each port adapter. Alternatively, a host could read the primary copy of the configuration in formation in the "gatekeeper" volume of storage in the storage subsystem. In any case, the host must be programmed to seek out the LUNs that it can access. For example, a host controller routine first powers up and logs in to the network. Then a mapping driver in the host is loaded into the host's memory, and the mapping driver contains the network addresses of the data storage subsystem adapter ports to access, and contains instructions for sending the commands to these adapter ports to obtain the LUN information or read the primary copy of the configuration information in the storage subsystem. The host operating system invokes the mapping driver to obtain the LUNs accessible to it.

It is also desirable to provide the host with the capability of using a logical volume in the storage subsystem as a "boot disk." Booting over Fibre Channel allows support of diskless systems and, more importantly, provides reliability and a means for disaster recovery. Booting over the Fibre Channel is especially useful when the host is a commodity server. In this situation, the storage subsystem can provide the disk storage for a plurality of the commodity servers. The commodity servers can handle wide area network communication protocols with other hosts such as workstations, and file system management for file systems stored in the logical volumes of the storage subsystem.

The use of a logical volume in the storage subsystem as a "boot disk" increases reliability of a host because the standalone disk in a typical server represents the component with the worst mean time before failure. In the past, the system administrator has been willing to treat a local disk failure as a server failure. The storage subsystem, however, has a fault-tolerant architecture and uses techniques such as mirroring of the storage devices or RAID so that a logical volume in the storage subsystem has a much higher mean time before failure than the typical server or server disk. The storage subsystem also enhances disaster recovery capabilities because it is easy to recover from the destruction of a commodity server simply by plugging in a replacement commodity server having the same hardware configuration.

A host computer boots from a present disk address. This is accomplished through one of the following methods. In the PC environment, the host controller is a SCSI controller that must act like an IDE controller and answer all interrupts that are targeted for the disk. The host controller uses a specific SCSI target that has either been hardwired in the design of the host controller stored in nonvolatile memory on the host controller. In other environments, the motherboard of the host typically contains the SCSI address to use in non-volatile memory. The address must be available before any information on a disk is available to be read. This means that the nonvolatile memory must be used either on the motherboard or the host controller.

The address of the boot disk in the Fibre Channel environment is a storage subsystem port WWN and a storage subsystem LUN. The nonvolatile memory must store a complete path to the boot volume, including the SCSI address to be used by the host as well as the storage subsystem WWN and LUN.

To support booting from a storage subsystem volume, the host controller is provided with a facility to read and write the boot information. This information should also be saved in the storage subsystem volume configuration database in order that a replacement host controller can be loaded with the correct information during configuration. To facilitate this, the read and write boot commands would each use the following structure:

```
struct (int64 hba_wwn;     /* which host controller port to address with this cmd */
       int bus;            /* the value for the host bus */
       int target;         /* the value for the host target */
       int lun;            /* the value for the host lun */
       int64 symm_wwn;     /* the value for the storage subsystem port WWN */
       int symm_lun;       /* the LUN to use on the storage subsystem port */
```

Host Requests for Dynamic Allocation and De-allocation of Logical Volumes

After an initial configuration by the system administrator and during normal operation of the data processing system, a host application may need additional storage volumes, or may no longer need storage volumes allocated to it. To avoid significant involvement of the system administrator in this situation, the port adapters of the storage subsystem can be programmed to recognize "mount" and "unmount" commands from the host controller. These commands can be similar in form and function to the Unix mount/unmount commands, and would be sent to the storage subsystem gatekeeper (e.g., at LUN0). A command line for the mount command, for example, has the form:

storage_subsystem_mount volume_group_name host_controller host_lun1 . . . host_lunN A command line for the unmount command, for example, has the form:

Host controller ID (the value assigned by the switch at login time)
Hostname IP address
Volume group name
Host LUN 1
. . .
Host LUNn In the storage subsystem, the gatekeeper facility responds to the mount command by allocating free logical storage volumes to the specified LUNs, and creating an entry in the volume access table or tables for the specified volume group name and the LUN to logical volume mappings. The entry would include the host controller port's S_ID and WWN. The host could specify attributes for logical volume to be allocated to each volume, such sharing enabled, or sharing enabled for read-only access. In this example, the volumes allocated to the host would all be private, and the private/shared flag for the volume group name would be set. The system administrator would set up in advance any assignment of already volumes to be shared between different host controller ports. It would be possible, however, to have an option whereby one host controller port could request and obtain mounting of volumes shared with another host controller port. If LUN to logical volume mapping is used, this option could be limited to sharing between two ports of the same host controller, or two ports of the same host, because such an option assumes that the LUN to logical volume mapping would be the same for the two host controller ports. In response to such a command, the gatekeeper would check whether the attributes specified in the command for the LUNs to be assigned (such as shared, shared for read-only access) match those of the already allocated LUNs.

The mount command could also have an option to define the volume group name as local to just the port adapter that receives the command, or global for all of the port adapters in the storage subsystem. In the local case, an entry for the volume group name would be created only in the volume access table stored in the port adapter that received the mount command. In the global case, an entry would be created for the group name in the volume access table in each port adapter of the storage subsystem. In any case, it would be desirable for a host to or host controller have the ability to access the volumes assigned to it through more than two of the ports in order to provide load balancing. This would include not only resending a data access request to another storage subsystem adapter port in response to a port adapter busy signal, but also spreading the host's load over a multiplicity or all of the storage subsystem adapter ports, for example in a round-robin fashion, to decrease the likelihood of any adapter port becoming busy. Such a method can be employed by a host to provide load balancing without any knowledge of the actual loading conditions on any of the ports, and without any coordination with the storage subsystem or other hosts. The round robin technique can be implemented simply by the host or host controller incrementing an index prior to sending each data access request, testing whether the index is equal to the number of subsystem adapter ports accessible to the host and if so resetting the index, and then directing the host's data access request to the accessible storage subsystem adapter port specified by the index.

The gatekeeper facility responds to the unmount command by checking whether the specified LUNs are all the LUNs assigned to the volume group name in the volume access table, and if so, removing the volume group name, and deallocating the volumes allocated to the group name. Normally, private volumes are erased when they are deallocated. There also could be an option to deallocate some but not all of the logical volumes assigned to a volume group name, and in this case only the entry for the volume group name would remain, but the volume list or LUN to logical volume map for the entry would change.

When a controller is replaced, the "loss of light" condition (when the controller is taken off line) will cause the automatic logout of the port from the switch. (If a fabric exists, the problem of propagating the information through a fabric switch has not yet been solved by the FC standard.) This information will be passed on to the storage subsystem, which will remove the entry from the table. After the host is rebooted, the mount command will be executed and the connection will be re-established.

Some hosts such as servers should be continuously logged in to the storage subsystem in the absence of a failure condition or planned removal from the data processing system. In this case, the host should unmount all of their assigned volumes before logging out for a planned removal. To respond to a failure condition, the storage subsystem could be programmed to respond to a report of a state change indicating that such a host has been disconnected from the data network by checking the volume access table or tables for any volume group names corresponding to the host, and if any such volume group name has been found, reporting the error to the system administrator. The system administrator can then decide whether any volumes allocated to the host should be deallocated and erased for use by other hosts.

An example of a procedure using the host and storage subsystem facilities during a first-time host installation in the data network is as follows:

1. The host controller of the host powers up. It performs its own initialization but does not execute any operations related to volume configuration.

2. The host boots over a host CD-ROM drive or local disk (for example in the case of a Fibre Channel storage network added to an existing system) or network storage such as a logical volume in the storage subsystem.

3. Mount a network disk containing the host facilities (seen by the host as an application program) or load the host facilities from the host CD-ROM drive.

4. Start a graphical user interface for the host facilities and enter an Installation Mode.

5. The host installation facility of the graphical user interface queries each host controller port for its port WWN.

6. The host installation facility interrogates the data network for the WWNs of the storage subsystem ports. If the host controller port is in a Fibre Channel loop, then host installation facility probes the loop through a host controller for the WWNs . . . . Otherwise, the host installation facility calls the fabric name server to obtain a list of list of SCSI device WWNs, and the full list is searched for WWNs storage subsystem ports.

7. The host installation facility reads the storage subsystem port text names, for example from block zero of the port configuration data in each storage subsystem's "gatekeeper" volume at LUN0. If the port text name entries are zero, indicating that they have never been entered by the system administrator, then a default of <storage_sybsytem_name>/<storage_subsystem_adapter_port #> is used.

8. The host installation facility displays to the host user each storage subsystem adapter port WWN with its corresponding text name.

9. When the host user selects a given storage subsystem adapter port WWN, the host installation facility executes a "Report LUNs" command. Using an application interface (API) function called getallprtlun( ), all of the LUN bitmap entries and their corresponding volume group names are read from the storage subsystem volume configuration database in the storage subsystem's "gatekeeper" volume at LUN0. The logical OR of all of the bitmasks from each entry provide a single bitmask of all allocated volumes. While reading each entry, the host installation facility also checks each hostname as it appears in each volume group name returned from the API. This is compared with the current hostname in order to look for previous entries in the configuration database for this host. Upon completion of this sequence of actions, the host installation facility holds the following information:

All volumes available on the storage subsystem adapter port;

All volumes on the storage subsystem adapter port that are already allocated to other hosts;

All volumes that are already allocated to this host for this storage subsystem port;

Port WWNs for each host controller port of this host; and

Port WWNs and text names for all storage subsystem ports available.

10. The host user can create one set of allocated volumes for each host controller port residing on the host. The host facility graphical user interface associates an index number with each volume set, and displays to the host user each index number alongside each host controller port WWN.

The graphical user interface also displays the volumes allocated to the host and those volumes that are not allocated to any host. The graphical user interface also displays, on demand, a list of volumes that are allocated to other hosts. From these, the user can select volumes to be allocated to the a selected host controller port of the host. If the volume is already allocated to another host and is marked as unshareable, an error is generated.

11 If the host user initiates a save operation, the host installation facility writes all the configuration information along with the host controller port WWN to the storage subsystem volume configuration database through the gatekeeper. The storage subsystem makes corresponding revisions to the volume access tables in its cache memory and port adapter memory.

Host Authentication

In a storage system network, is desirable to authenticate host identity to prevent tampering with especially critical data such as the configuration information, which could enable unauthorized access to the most sensitive volumes of storage in the system. Therefore, whenever a host requests a change in the configuration information (i.e., write access), it is desirable to use a challenge-response protocol by which the host must identify itself in response to a request from the storage subsystem. Preferably this challenge-response protocol incorporates a machine-based security feature that generates a response that cannot be re-used if intercepted.

The machine-based security feature includes an encryption key stored in memory of the hosts or host controllers. Each host controller, for example, has a unique encryption key that is different from the keys of the other host controllers. Preferably the encryption key is stored in "write only" memory of a monolithic semiconductor integrated circuit chip (hereinafter referred to as an "identity" chip) in such a way that the stored encryption key can only be read by encryption circuitry on the chip. The "write only" memory could be an electrically erasable and programmable read-only memory (EEPROM) array with a metal shielding layer over the memory array so that the stored key would be virtually impossible to recover by probing, inspection, disassembly, or "reverse engineering" of the identity chip. In this case, would be possible to publish the method by which the identity of the chip is authenticated. The identity chip, for example, is a microcontroller having such a write-only EEPROM program memory programmed to perform a unique encoding function corresponding to the key. The "write only" memory and the encryption circuitry could be a small portion of the circuitry on the identity chip. For example, the identity chip could be a microprocessor chip used as the main processor of a host controller circuit card or workstation.

By incorporating the identity chip into the host controller, host motherboard, or the main processor chip of the host, is possible to verify the identity of the host controller, host motherboard, or main processor chip of the host. The identity chip, however, does not verify the identity of the user of the host. To guard against unauthorized users, it is still necessary to verify the identity of the user. User verification would be done by the operating system in the usual fashion, for example at a user login time when the user is requested to enter a password.

The identity chip could be attached to or incorporated into any kind of object or thing in order to authenticate the identity of that object or thing. For example, the chip could be embedded in a debit or credit card to authenticate the identity of the card before debiting or charging a corresponding account. The chip could be attached to an object or thing together with a wireless data transceiver to permit remote interrogation of the chip, for example in a tag implanted under the skin of an animal to remotely authenticate the identity of the animal. The identity chip could store descriptive information about the object or thing to which is attached, in order to permit verification that the identity chip has not been transferred to a different object or thing. If the descriptive information is unique to the particular object or thing, then the descriptive information could be incorporated into the secret key. For example, if the identity chip is used in a tag for an animal, part of the key could include a sequence of the genetic code of the animal.

Figure 31:
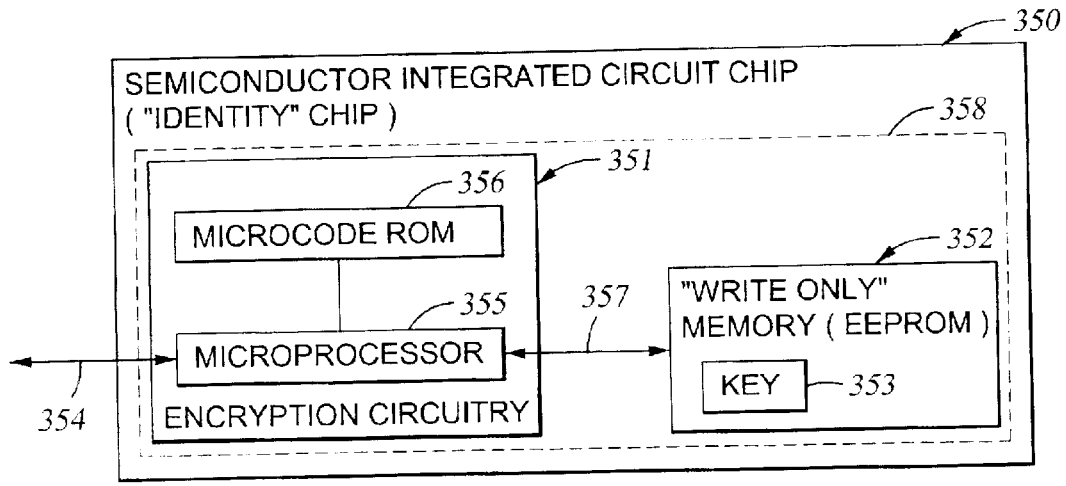
FIG. 31 is a block diagram of a semiconductor integrated circuit chip capable of authenticating itself in a secure fashion.

FIG. 29 shows a preferred construction for the identity chip. The identity chip 350 includes encryption circuitry 351 and a "write-only" EEPROM memory 352 for storing at least one key 353. The key 353 can be written into the memory 352 from a data path 354 including external leads connected to the chip. The key 353 can be read from the memory 352 by the encryption circuitry, but the key cannot be read from the data path 354 or any other external leads connected to the chip. For example, the encryption circuitry 352 includes a microprocessor 355 and a microcode read-only memory (ROM) 356 storing microcode executed by the microprocessor. The microprocessor is programmed to recognize a command from the data path 354 for writing into the memory 352 a key from the buys 354. The microprocessor is also programmed to recognize a command from the data path 354 for receiving a number from the data path, reading the key 353 from the memory 352, encrypting the number with the key, and transmitting the encryption result onto the data path. The microprocessor, however, will not recognize any command for transmitting the key onto the data path 354 or any other leads of the chip. In this sense, the memory 352 is a "write-only" memory. Moreover, the EEPROM memory 352 and at least the internal data path 357 to the memory 352 are covered by an upper layer of metal 358 (shown in dashed lines in FIG. 31) on the chip 350 so that it is virtually impossible for the key to be recovered by probing, inspection, disassembly, or "reverse engineering" of the chip. The EEPROM 352 could store a plurality of different keys, and the microprocessor could recognize a command from the data path 354 for selecting which of the keys to use for encrypting the number received on the data path.

Figure 32:
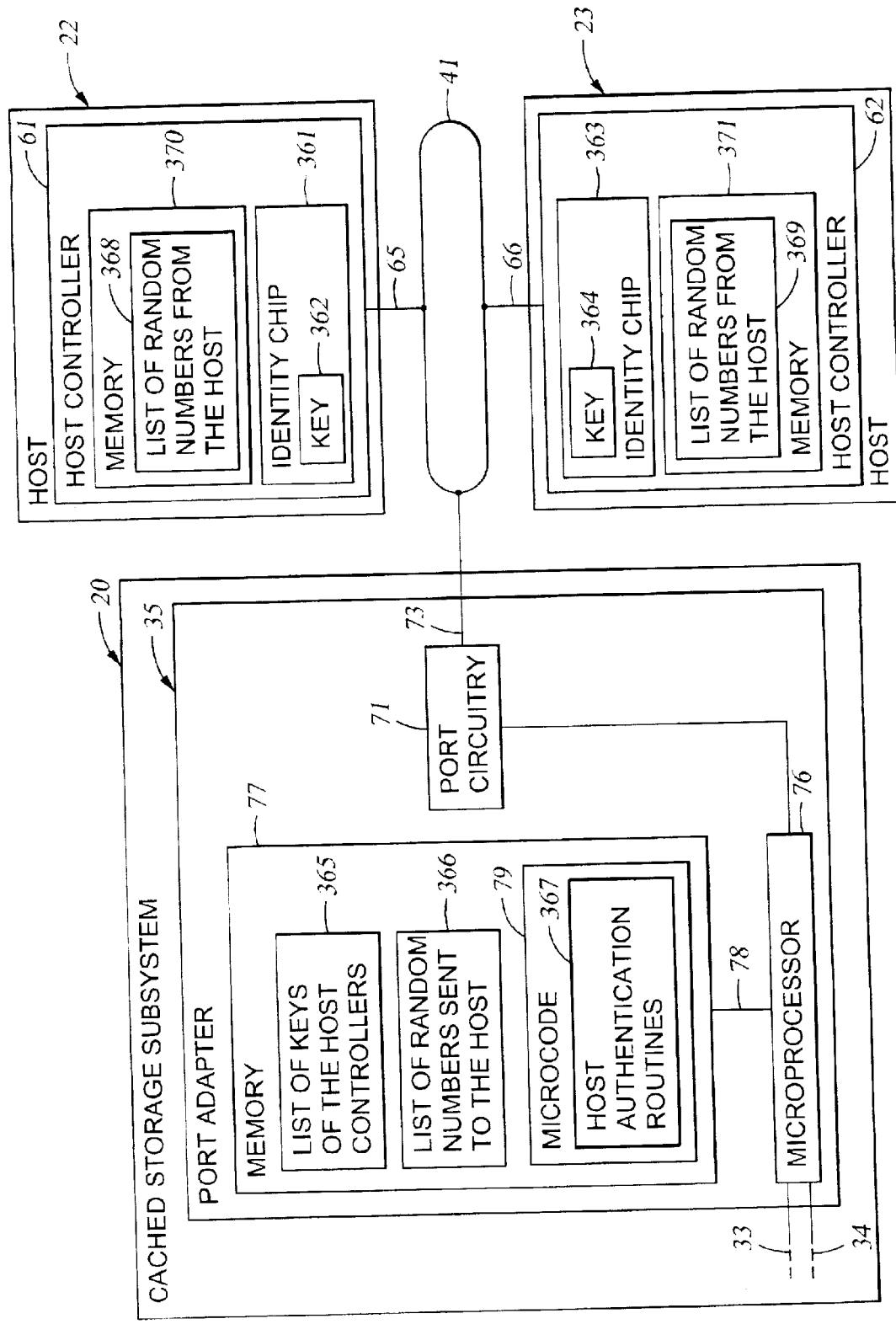
FIG. 32 is a block diagram showing semiconductor integrated circuit chips in accordance with FIG. 31 being used in the data processing system of FIG. 1 to permit a port adapter to authenticate the identity of host controllers.

FIG. 32 shows how identity chips 361, 363 are incorporated in the data processing system of FIG. 1 for authenticating host controller identity. In this example, the Fibre Channel loop 41 is used for access to highly sensitive data, such as configuration information, stored in the cached storage subsystem 20. The identity chip 361 in the host controller 61 stores a unique secret key 362 for the host controller 61, and the identity chip 363 in the host controller 62 stores a unique secret key 364 for the host controller 62. Copies of the keys 362, 364 are stored in a list 365 in the host controller. The list 365, for example, is a table, and each key in the list 365 is associated with the WWN of a respective host controller known to the port adapter. A copy of the list 365 of keys is stored in a logical storage volume of the storage subsystem, or the list of keys is stored in a nonvolatile portion of the port adapter memory 77, so that the list will be retained if power to the port adapter is lost. Such a nonvolatile portion of the port adapter memory 77 could be provided by one or more identity chips constructed as shown in FIG. 29. The port adapter memory 77 further includes a list 366 of random numbers sent to the hosts. The list 366, for example, is maintained as a queue. The list of random numbers 366 and the list of keys 365 are used by host authentication routines 367 in the port adapter microcode 79. As the random numbers are received by the hosts, the host controllers place the random numbers in similar lists 368, 269 in their respective memories 370, 371. As used in this specification, the term "random number" would include a so-called "pseudo-random number" so long as the number would appear to be selected at random during the typical duration of time that a host controller is logged in to a port adapter. For example, the random numbers transmitted by the port adapter to a host controller are generated by a conventional random number generator routine that is seeded at the time that the host controller logs in to the port adapter. The BASIC programming language, for example, provides such a random number generator routine.

Figure 33:
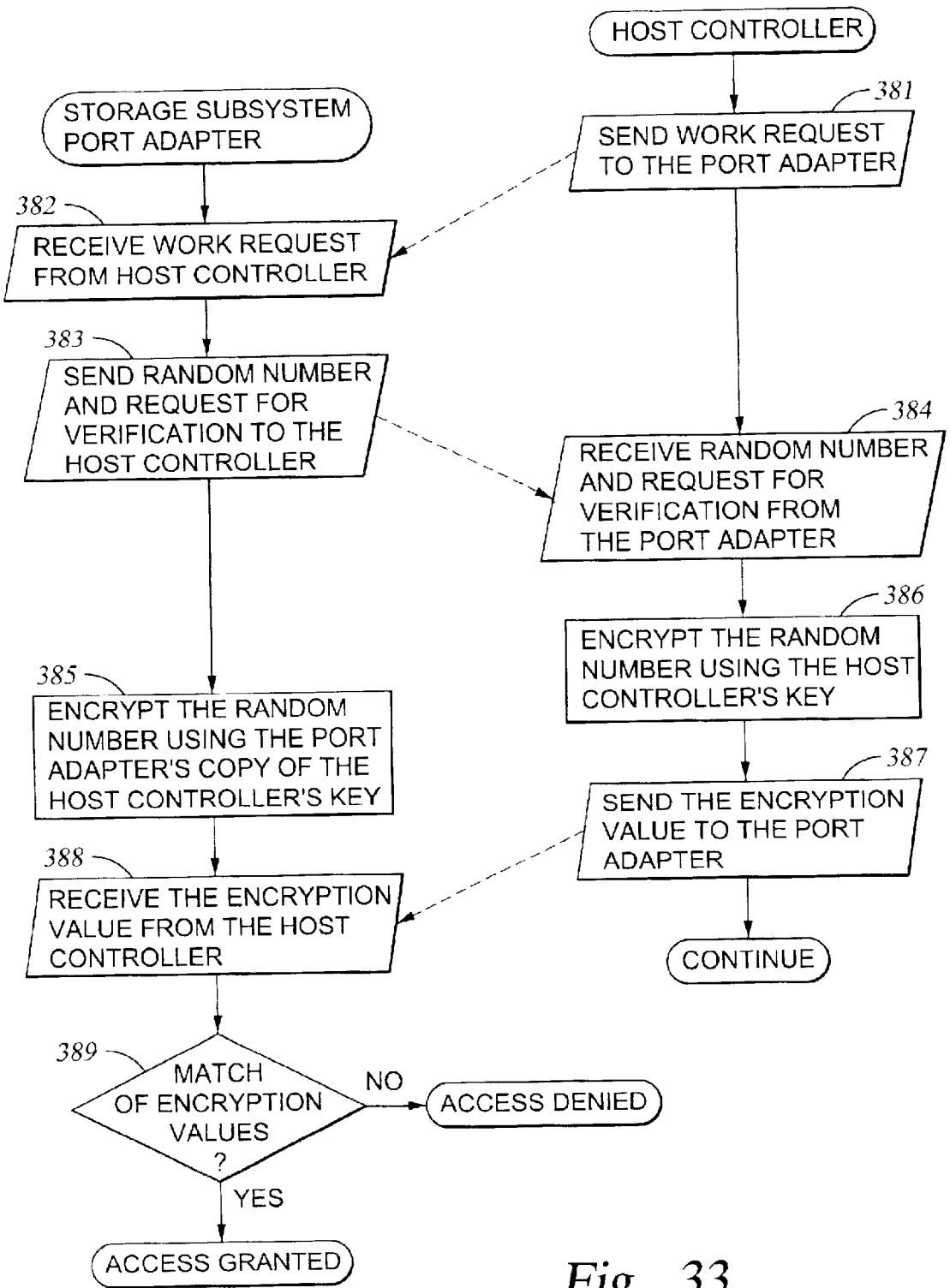
FIG. 33 is a flowchart of a "challenge-response" procedure used by the port adapter and host controllers of FIG. 32 to permit the port adapter to authenticate the identity of a host controller.

Shown in FIG. 33 is a flowchart of the challenge-response protocol. The actions of the port adapter are shown on the left side of the flowchart, and related actions of a host controller are shown on the right side of the flowchart. The steps of the left side of the flowchart, for example, are performed by one of the host authentication routines (367 in FIG. 32). The challenge-response protocol is used, for example, when a host controller logs in to the port adapter. Prior to login, however, the system administrator must load the host controller keys into the port adapter and host controllers. This should be done in a secure fashion, to guarantee that the keys cannot be intercepted when they are distributed to the host controllers. The system administrator could load the keys into the port adapters through the service processor when assigning the logical storage volumes to the host controllers. In a similar fashion, the keys could be entered into each host controllers through a dedicated I/O port to avoid any need to transmit the keys over the data network.

In a first step 381, the host controller sends a request to the port adapter for some work. In step 382, the port adapter receives the work request. In step 383, the port adapter responds to the work request by sending back a "challenge" request including a random number that is used as a one-time password. Since the number is random and changes every time it is needed, there is no way to predict it, nor record it and provide a false reply to a request for authentication.

In step 384, the host controller receives the random number and the request for verification from the port adapter. In step 385, the port adapter encrypts the random number with its copy of the host controller's key. Concurrently, in step 386, the host controller encrypts the random number with its copy of the encryption key. The encryption process can use any kind of encryption technique since the result never has to be decrypted. For example, the encryption could use the well-known method of the Data Encryption Standard (DES), or any sequence of encryption operations, for example, substitution, blocking, permutation, expansion, and compaction. It is also possible to use the well-known RSA public/private key system. In the conventional use of the RSA system, public keys are used for encryption, and a private keys are used for decryption. Therefore, if the port adapter and the host controller used RSA system, the public keys would be kept secret and would used for encoding, and the private keys would not be used.

In step 387, the host controller sends the encryption value to the port adapter. In step 388, the port adapter receives the encryption value from the port adapter. In step 389, the port adapter compares the encryption value that it computed with the encryption value received from the host controller. If they match, then the host controller is authenticated, and the host controller is granted access to the storage subsystem. If they do not match, the host controller is denied access to the storage subsystem.

One preferred way of applying the "challenge-response" protocol in a Fibre Channel network is by using the Exchange IDs (Originator and Responder) within the Fibre Channel header of the Frame Structure. The primary function of the Fibre Channel network is to receive Frames from a source port and route them to a destination port. As shown in FIG. 30, a Frame 400 includes information to be transmitted (Payload 401), the source address (S_ID 402), the destination address (D_ID 403), and various kinds of link control information.

Each Frame begins with a Frame Delimiter 404 indicating the start of the Frame. The Frame Delimiter 404 is immediately followed by a Frame Header 405. The Frame Header is used to control link applications, control device protocol transfers, and detect missing or out of order Frames. The Frame Header includes the source address (S_ID 402) and the destination address (D_ID 403). An optional header 406 may contain additional link control information. The Payload 401 follows the Frame Header or the optional header. Four bytes of Cyclic Redundancy Check (CRC) follows the Payload. The CRC is used to detect transmission errors. The Frame 400 concludes with an End of Frame delimiter 408.

The Exchange ID 409 is an end portion of the Frame Header 405. The Exchange ID includes an Originator ID 410 and a Responder_ID 411. The originator of a communication sends the first message with a value specified as the Originator_ID. The Originator ID must be unique amongst all the currently active exchanges. The responder receives the header. When it sends back a message, it places the Originator ID plus its own Responder ID into the header. This ID pair now comprises a unique Exchange_ID.

Once a host controller has logged in to a port adapter, it is desirable to authenticate the host controller for each storage access request. If the challenge-response protocol of FIG. 33 were used for each storage access request, however, the traffic on the data network would be substantially increased because the Frame for each storage access request from the host controller would be followed by a Frame for the "challenge" message from the port adapter, and a Frame for the "response" of the host controller. In order to eliminate the "challenge" and "response" Frames, the port adapter and host controllers maintain and use the lists 366, 368, and 369 of random numbers so that a host controller can include an encrypted value in the Exchange ID of each storage access request.

Figure 35:
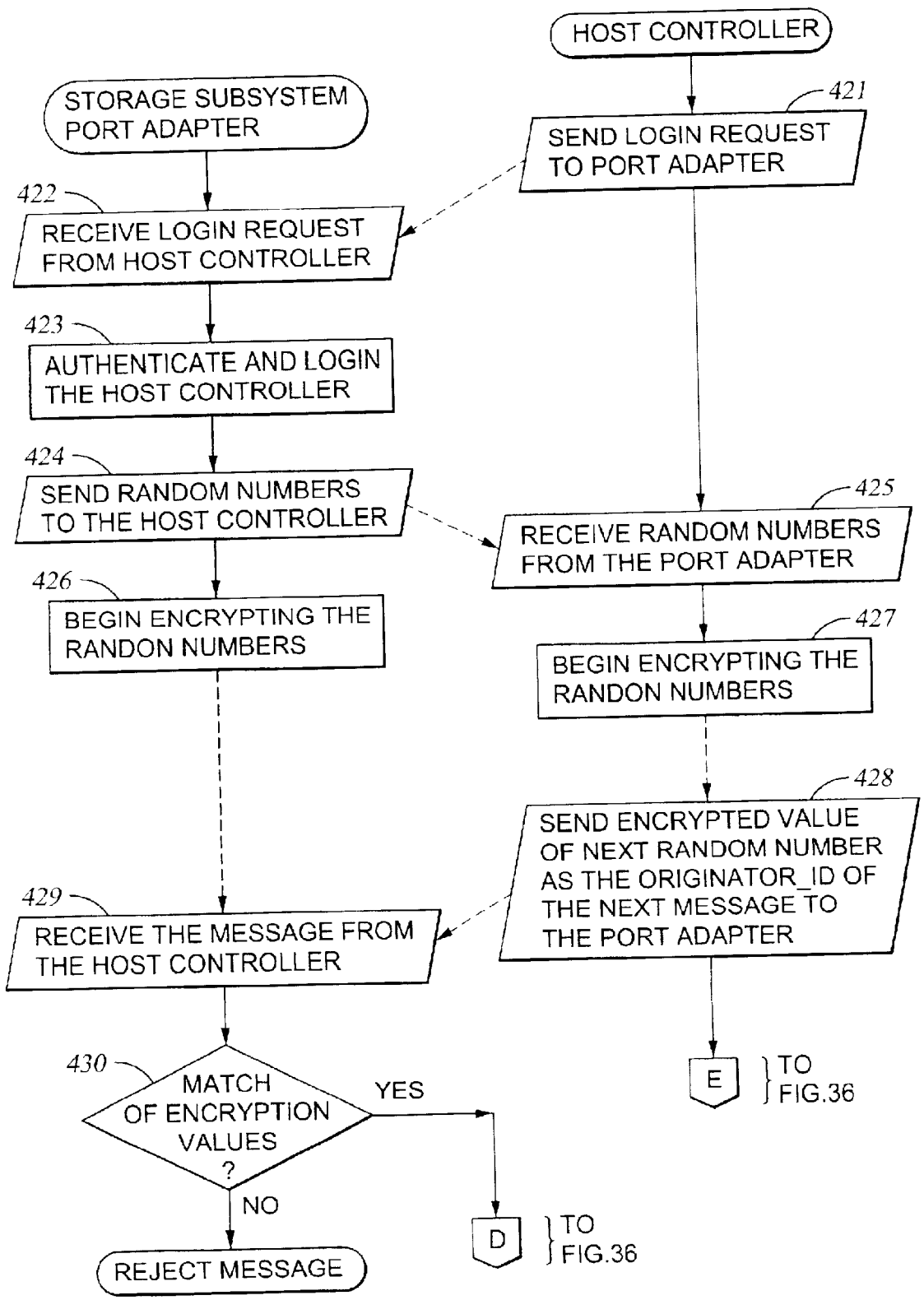
FIG. 35 is a first sheet of a flowchart of a procedure used by the port adapter and host controllers of FIG. 32 to permit the port adapter to authenticate each message from a host controller.
Figure 36:
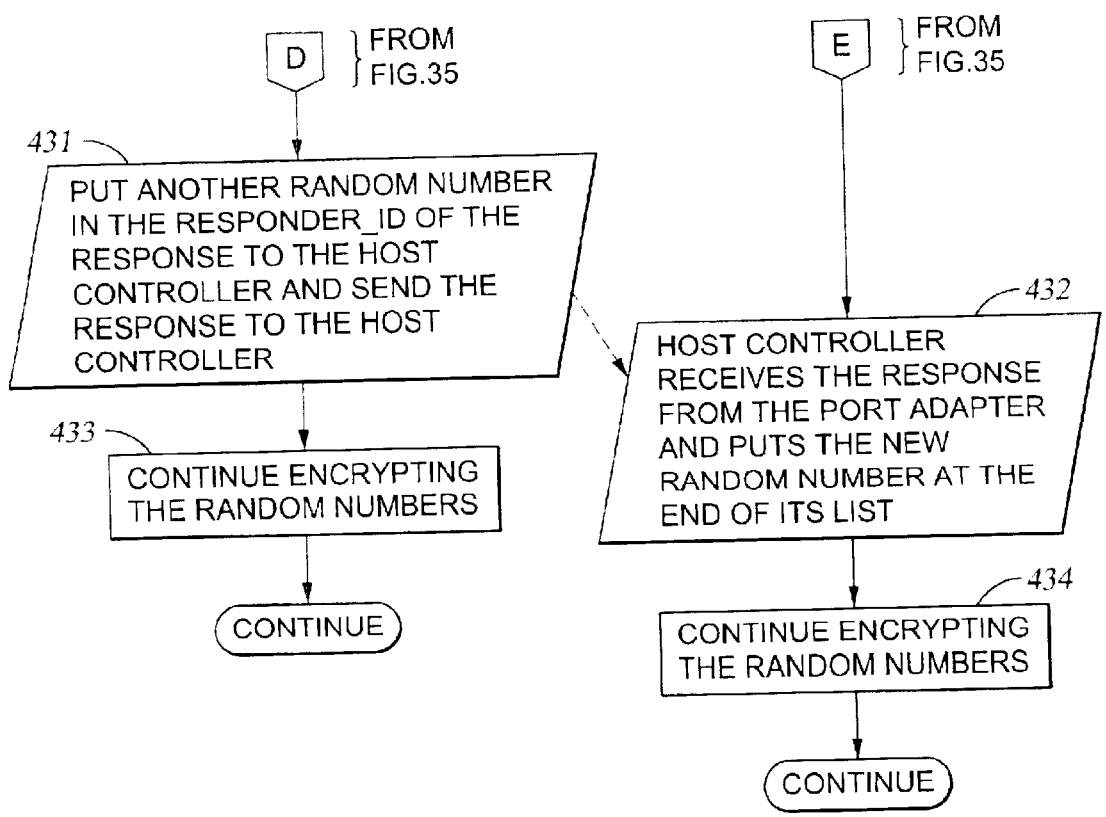
FIG. 36 is a second sheet of the flowchart begun in FIG. 35.

Referring to FIGS. 35 and 36, there is shown a flow chart of a preferred procedure for maintaining and using the lists of 366, 368, and 369 of the random numbers. In a first step 421 of FIG. 35, a host controller sends a login request to a port adapter. In step 422, the port adapter receives the login request from the host controller. In step 423, the port adapter authenticates the host, for example by using the "challenge-response" protocol of FIG. 33. Then in step 434, the port adapter sends an initial set of random numbers to the host controller. The port adapter places these random numbers in its list 377. The list 377 is maintained as a set of first-in, first-out (FIFO) queues including a respective queue allocated for the random numbers sent to each host controller. In a similar fashion, the host controller places the initial set of random numbers it receives in to its list 368 or 369 of random numbers. The host controller maintains its list as a set of FIFO queues including a respective queue for each port adapter that it has logged in to. The size of each FIFO queue, for example, is equal to the size of a queue that holds outstanding requests from the adapter ports or host controller ports. This is done so that the port adapter and host controller can encrypt the random numbers in their respective queues as a background task relative to the outstanding requests. The host controller should typically produce the encryption value by the time that the host controller receives a request from the host to transmit a corresponding storage access request to the port adapter, and the port adapter should typically produce an encryption value by the time that the port adapter receives the corresponding encryption value in a storage access request from the host controller. The port adapter begins encryption in step 426, and the host controller begins encryption in step 427.

Every time the host needs to send an authenticated storage access request to the storage subsystem, as shown in step 428, the host controller takes the encrypted value of the next one of the random numbers in the FIFO queue for the port adapter, and uses the encrypted value as the Originator ID in the Frame for the storage access request. In step 429, the port adapter receives the Frame from the host controller. In step 430, the port adapter compares the encrypted value in the Frame with its encryption of the next random number in its FIFO queue for that particular host controller. If there is no match, then the storage subsystem rejects the message. This is an error condition that is reported back to the host controller. If there is a match, then the requested storage access can proceed, as shown in FIG. 36. In step 431, the port adapter removes the last random number from the FIFO queue for the host controller, and generates a new random number used as the Responder_ID in its reply to the data access request from the host controller, and places this new random number at the end of its list, in its FIFO queue for the host controller. In step 432, the host controller receives the response from the port adapter, and places the new random number at the end of its list, in its FIFO queue for the port adapter. In step 433, the port adapter continues encrypting the random numbers in its list, in the order in which the random numbers were put into the list. Concurrently, the host controller continues encrypting the random numbers in its list. In this fashion, the host controller will have in advance a random number to use as the Originator_ID in a next message, and depending on the priority of any other tasks, the host controller can encrypt the random number well before the encryption need be inserted into the next message. This ensures that the authentication method will not significantly impact the storage access time in the data processing system.

Storage Network Configurations

FIG. 2 introduced a storage system configuration in which a respective Fibre Channel loop 41, 42, 43, 44 was liked to a storage subsystem adapter port, and a number of hosts 22, 23, 24, 25 were linked to each loop, and each host was linked through a respective controller port to two loops. Such a fault-tolerant network configuration should support from two (4K I/O) to ten (32K I/O) small server hosts per storage subsystem adapter port. The storage subsystem 20, for example, can be fully loaded with sixteen adapter ports, which should support from 32 to 160 small server hosts.

Figure 37:
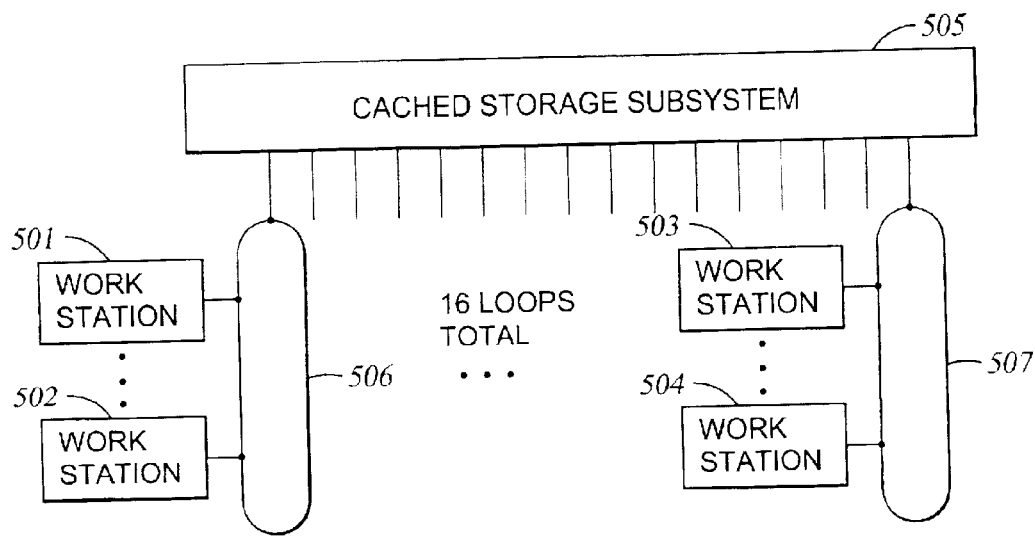
FIG. 37 is a block diagram of a storage network configuration especially suited for up to 800 workstations.

In contrast to small server hosts, workstation hosts have a relatively light loading on the storage subsystem adapter ports. Also, fault tolerant links usually are needed between the workstations and the storage subsystem adapter ports. Therefore, as shown in FIG. 37, it is possible to link a large number of workstations 501, 502, 503, 504 to a cached storage subsystem 505 through a respective loop 506, 507 linked to each adapter port. For example, in the storage network configuration of FIG. 37, each of sixteen loops could be linked to about fifty workstations, to network a total of about eight-hundred workstations to one storage subsystem.

In a file-only environment (i.e., no video service), a single storage subsystem is capable of supporting considerably more than eight-hundred workstations. If it is desired to network more than eight-hundred workstations to one storage subsystem, then a maximum of about fifty workstations per loop becomes a constraint. The number of workstations can be increased while meeting this constraint by using switches to increase the number of loops over the number of adapter ports. As shown in FIG. 38, for example, three sixteen-port switches 511, 512, 513 expand the number of ports connectable to loops from the sixteen of the cached storage subsystem 514 to fifty-five. Each of the three sixteen port switches 511, 512, 513 has three of its ports connected directly to three respective storage subsystem adapter ports, and thirteen of its ports connected directly to loops, such as the loops 515, 516, 517 shown directly connected to a port of a respective one of the switches 511, 512, 513. This would permit the fifty-five loops to support a total of thirty-three hundred workstations, although the loops would not have similar performance since thirty-nine of the loops would be linked directly to ports of the switches 511, 512, 513, and seven of the loops would be linked directly to storage subsystem adapter ports.

Another environment where multiple hosts are connected to a storage subsystem is known as the cluster of storage area networks (SAN) environment. In this case, multiple hosts are linked to more than one storage subsystem, and the storage subsystems are linked directly for the transfer of remote dual-copy data. This typically is not a high performance environment, but fault tolerance is a requirement. Therefore, there is a need for more than one path from each host to each storage subsystem. Shown in FIG. 39, for example, is a two-loop storage network configuration including a first cached storage subsystem 531, a second cached storage subsystem 532. The two cached storage subsystems are coupled by a direct link 533 for transfer of remote dual-copy data. The network configuration includes sixteen hosts, only the first host 534 and the sixteenth host 535 being shown. A first loop 536 has links to one port on each of the cached storage subsystems 531, 532 and links to one port on each of the sixteen hosts 534, 535. A second loop 537 also has links to another port on each of the cached storage subsystems 531, 532 and to another port on each of the sixteen hosts 534, 535.

Figure 39:
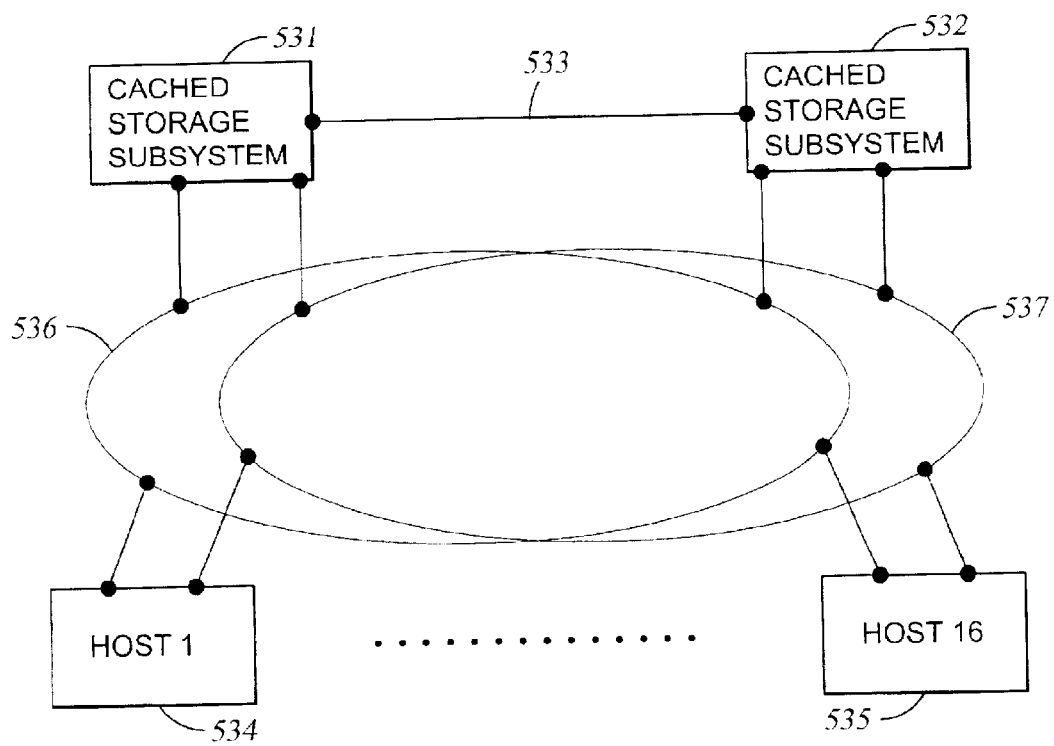
FIG. 39 is a block diagram of a storage area network providing fault tolerance and failover capability for hosts and storage subsystems in the network.
Figure 40:
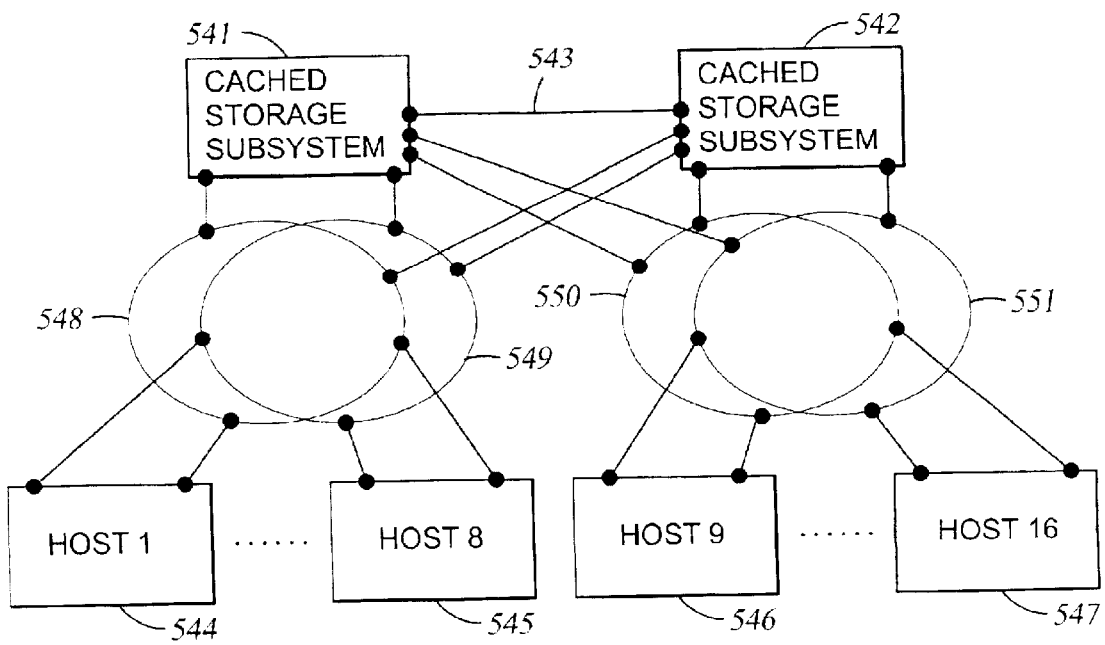
FIG. 40 is a block diagram of a storage area network similar to that shown in FIG. 39 but including additional network loops for higher throughput.

If the network configuration of FIG. 39 would not provide sufficient throughput performance, then additional loops are added, and the number of hosts directly linked to each loop is decreased. Shown in FIG. 40, for example, is a four-loop configuration, including as before two cached storage subsystems 541, 542 having a direct link 543 between them, and sixteen hosts, only the first host 544, the eighth host 545, the ninth host 546, and the sixteenth host 547 being shown. Two loops 548, 549 each have one direct link to one respective port on each of the cached storage subsystems 542, 543, and each of the first eight of the sixteen hosts, including, as shown, the first host 544 and the eighth host 545. None of the last eight of the sixteen hosts, including, as shown, the ninth host 546 and the sixteenth host, 547, have a port directly linked to the two loops 548, 549. Two loops 550, 551 each have one direct link to one respective port on each of the cached storage subsystems 542, 543 and each of the last eight of the sixteen hosts, including, as shown, hosts 9 to 16. None of the first eight of the sixteen hosts, including, as shown, the first host 544 and the eighth host 545 have a port directly linked to the loops 550, 551.

Conclusions

From the above, it is seen that a number of facilities have described to provide various features and advantages in a data processing system having a large number of hosts networked to one or more cached storage subsystems, some or all of which could be desired or required by any particular system users and managers. It should be apparent to a person of ordinary skill in the data processing art that the embodiments described above can be constructed to meet some or all of the following requirements:

A. General Requirements

1. Any number of storage subsystems should be simply plugged into the network and easily configured by a system administrator for host access to selected volumes.

2. Each entity in the data processing system (storage subsystem, data network, a nd host) should have separate and distinct management interfaces. The system administrator graphical user interface, or host graphical user interface, may provide a point of integration for the management interfaces of the entities.

B. Data Network Requirements:

1. No path management internal to the data network should be required. Path analysis is undesirable for providing connectivity to a host while retaining required performance, in a system having a very large number of hosts, and current network technology such as Fibre Channel fabric switches having at most a few tens of ports. The internal structure of the data network can be complex, and in this case it is relatively difficult to analyze each path inside the data network, from the host to the storage subsystem, to determine the correct port and path for each host. Since the number of hosts is very large, it is also an almost impossible task to directly control the performance requirements for a single host. With a large number of hosts, the performance typically will not cluster, but will have random hot spots constantly changing over time.

2. Invisible internal path redundancy. There should always be at least two full redundant paths to reach the storage subsystem volumes from an external port of the data network.

3. The ports and protocol to/from the storage subsystem and data network should comply with current standards, including both fabric and loop. Given the cost of a switch port and the number of hosts involved, it is expected that the fabric will be made up of a combination of loops and fabric direct connect. Each port going to/from the storage subsystem should simultaneously support the different types of protocols. The external port type should be determined by the specific solution.

4. The storage subsystem should be allowed to register for notification of login state changes. The storage subsystem should keep current state information about the hosts and connections, especially to allow single use of a group of volumes. One limitation of the Fibre Channel protocol is that it does not support a logout. Along with that is the issue of detecting the loss of a host (this functionality is currently being developed in the FC standard).

5. On-line "hot" management of data network configuration.

6. Replacement of a host controller or storage subsystem director should not require any manual host-to-volume reconfiguration of the data network:

7. The switches used in the data network should be interoperable with multiple fabric vendors.

C. Storage Subsystem Requirements:

1. It is desirable to the storage subsystem to permit all volumes to be seen through a single storage subsystem port. This eliminates the difficult management problem of configuring and maintaining the storage subsystem and the data network to guarantee a path from a given external port of the data network to a given volume.

2. It is desirable to have a partitioning feature that will define the set of volumes that can be seen by a single host. This will restrict other hosts from seeing volumes they are not configured to see.

3. A change of a port ID (source id or worldwide name) in the host should not affect the partitioning definition in requirement 2 above.

4. It is desirable to have a mapping feature that will allow the host to specify its own LUN, which would be mapped to a logical LUN within the storage subsystem.

5. It is desirable to have the capability of selecting between "simultaneous multi host access" to a volume, and a "single host access" at a time. This is to control data sharing capabilities.

6. It is desirable to limit host-to-volume access to read-only or read/write.

7. Each port should simultaneously support all SCSI address modes.

8. Each port should simultaneously support both Fibre Channel class 2 and class 3.

9. Both loop and fabric Fibre Channel topologies should be supported.

10. It should be possible to back up and restore the host-to-volume connectivity configuration information.

11. The storage subsystem should allow a volume to be used as boot disk for a host.

12. Replacement of a host controller or storage subsystem director should not require any manual host-to-volume reconfiguration of the storage subsystem.

D. Host Requirements:

1. The host should be responsible for establishing a connection with the storage subsystem.

2. The host should have the capability of specifying the target LUN information to be used in mapping LUNs to logical storage volumes.

3. The host should provide security for the configuration information (volume group and LUNs) that it uses to establish connectivity with the storage subsystem.

What is claimed is:

1. A data storage subsystem comprising, in combination:
    data storage; and
    a storage controller coupled to the data storage for controlling access to the data storage, the storage controller having at least one physical data port for connecting the storage controller into a data network for data transmission between the data storage and host processors in the data network, wherein the storage controller is programmed to provide a plurality of virtual ports that are not physical ports in the data network but that appear to the host processors to be physical ports in the data network that provide access to the data storage and that are connected to the physical data port by a switch in the storage controller for routing storage access requests from the physical data port to the virtual ports.

2. The data storage subsystem as claimed in claim 1, wherein the virtual ports and the switch are defined by software contained in the storage controller.

3. The data storage subsystem as claimed in claim 1, wherein the storage controller is programmed with a permanent network name for each of the virtual ports, is programmed with a temporary network address for each of the virtual ports, and is programmed to route from the physical data port to a specified virtual port a storage access request containing a temporary address that specifies the specified virtual port.

4. The data storage subsystem as claimed in claim 1, wherein the storage controller is programmed so that the virtual ports and the switch are substantially compliant with Fibre-Channel network standards applicable to Fibre-Channel physical ports and Fibre-Channel fabric.

5. The data storage subsystem as claimed in claim 1, wherein the storage controller is programmed to provide a name server for responding to a name server request from the network by identifying the virtual ports and providing network addresses of the virtual ports.

6. The data storage subsystem as claimed in claim 1, wherein the storage controller is programmed to provide access at each virtual port to only a respective assigned subset of the data storage.

7. The data storage subsystem as claimed in claim 6, wherein the storage controller is programmed to permit no more than a respective assigned one of the host processors to access the subset of the data storage accessible from said each virtual port.

8. The data storage subsystem as claimed in claim 6, wherein the storage controller is programmed to as sign a host processor to each virtual port and to establish a respective mapping at said each virtual port between logical unit numbers addressable by the assigned host processor and corresponding storage volumes which the assigned host processor may access from said each virtual port.

9. The data storage subsystem as claimed in claim 6, wherein the storage controller is programmed to assign a respective set of the virtual ports to each host processor, and to permit each host processor to access the subset of the data storage accessible from said each virtual port only when the respective set of virtual ports assigned to said each host processor contains said each virtual port.

10. The data storage subsystem as claimed in claim 9, wherein the storage controller is programmed to provide a facility for reporting to a host processor the virtual ports from which the host processor may access the data storage, and the subset of the data storage that the host processor may access from each of the virtual ports from which the host processor may access the data storage.

11. The data storage subsystem as claimed in claim 1, wherein the storage controller is programmed to assign a respective set of virtual ports to each host processor, and to permit said each host processor to access the storage from each virtual port only when the respective set of virtual ports assigned to said each host processor contains said each virtual port.

12. The data storage subsystem as claimed in claim 11, wherein the storage controller is programmed to permit only one respective assigned host processor to access the data storage from each virtual port.

13. The data storage subsystem as claimed in claim 11, wherein at least one respective set of virtual ports assigned to at least one host processor includes a first virtual port from which said at least one host processor can access private storage that is not shared with any other host processor, and a second virtual port from which said at least one host processor can access storage that is shared with another host processor.

14. The data storage subsystem as claimed in claim 1, wherein the storage controller is programmed with a directory of the virtual ports, wherein the directory includes an indication of whether or not only private storage is accessible from each virtual port, and the program is executable by the storage controller to respond to a storage access request for access to specified storage accessible from said each virtual port by checking said indication, and if said indication does not indicate that only private storage is accessible from said each virtual port, then accessing a storage locking facility to check whether or not the specified storage is already locked, and if said indication indicates that only private storage is accessible from said each virtual port, then not accessing the storage locking facility for checking whether or not the specified storage is already locked.

15. A machine-readable program storage device containing a program that is executable by a storage controller for controlling access to data storage, the storage controller having at least one physical data port for connecting the storage controller into a data network for data transmission between the data storage and host processors in the data network,
wherein the program is executable by the storage controller to provide a plurality of virtual ports that are not physical ports in the data network but that appear to the host processors to be physical ports in the data network that provide access to the data storage and that are connected to the physical data port by a switch in the storage controller for routing storage access requests from the physical data port to the virtual ports.

16. The machine-readable program storage device as claimed in claim 15, wherein the virtual ports and the switch are defined by the program.

17. The machine-readable program storage device as claimed in claim 15, wherein the program is executable by the storage controller so that each of the virtual ports has a permanent network name, and each of the virtual ports is assigned a temporary network address, and the program is executable to route from the physical data port to a specified virtual port a storage access request containing a temporary address that specifies the specified virtual port.

18. The machine-readable program storage device as claimed in claim 15, wherein the program is executable by the storage controller so that the virtual ports and the switch are substantially compliant with Fibre-Channel network standards applicable to Fibre-Channel physical ports and Fibre-Channel fabric.

19. The machine-readable program storage device as claimed in claim 15, wherein the program is executable by the storage controller to provide a name server for responding to a name server request from the network by identifying the virtual ports and providing network addresses of the virtual ports.

20. The machine-readable program storage device as claimed in claim 15, wherein the program is executable by the storage controller to provide access at each virtual port to only a respective assigned subset of the data storage.

21. The machine-readable program storage device as claimed in claim 20, wherein the program is executable by the storage controller to permit no more than a respective assigned one of the host processors to access the subset of the data storage accessible from said each virtual port.

22. The machine-readable program storage device as claimed in claim 20, wherein the program is executable by the storage controller to assign a host processor to each virtual port and to establish a respective mapping at said each virtual port between logical unit numbers addressable by the assigned host processor and corresponding storage volumes which the assigned host processor may access from said each virtual port.

23. The machine-readable program storage device as claimed in claim 20, wherein the program is executable by the storage controller to assign a respective set of the virtual ports to each host processor, and to permit each host processor to access the subset of the data storage accessible from said each virtual port only when the respective set of virtual ports assigned to said each host processor contains said each virtual port.

24. The machine-readable program storage device as claimed in claim 23, wherein the program is executable by the storage controller to provide a facility for reporting to a host processor the virtual ports from which the host processor may access the data storage, and the subset of the data storage that the host processor may access from each of the virtual ports from which the host processor may access the data storage.

25. The machine-readable program storage device as claimed in claim 15, wherein the program is executable by the storage controller to assign a respective set of virtual ports to each host processor, and to permit said each host processor to access the storage from each virtual port only when the respective set of virtual ports assigned to said each host processor contains said each virtual port.

26. The machine-readable program storage device as claimed in claim 25 wherein the program is executable by the storage controller to permit only one respective assigned host processor to access the data storage from each virtual port.

27. The machine-readable program storage device as claimed in claim 25, wherein the program is executable by the storage controller to assign to at least one host processor a first virtual port from which said at least one host processor can access private storage that is not shared with any other host processor, and to assign to said at least one host processor a second virtual port from which said at least one host processor can access storage that is shared with another host processor.

28. The machine-readable program storage device as claimed in claim 15, wherein the program is executable by the storage controller to maintain in the storage controller a directory of the virtual ports, wherein the directory includes an indication of whether or not only private storage is accessible from each virtual port, and the program is executable by the storage controller to respond to a storage access request for access to specified storage accessible from said each virtual port by checking said indication, and if said indication does not indicate that only private storage is accessible from said each virtual port, then accessing a storage locking facility to check whether or not the specified storage is already locked, and if said indication indicates that only private storage is accessible from said each virtual port, then not accessing the storage locking facility for checking whether or not the specified storage is already locked.

29. A method of operating a storage controller for controlling access to data storage, the storage controller having at least one physical data port for connecting the storage controller into a data network for data transmission between the data storage and host processors in the data network, said method comprising:
the storage controller receiving storage access requests from the host processors at the physical data port, and inspecting network addresses in the storage access requests to find network addresses of virtual ports in the storage controller to which the storage access requests are directed, and controlling access to the data storage in accordance with the network addresses of the virtual ports to which the storage access requests are directed, wherein the virtual ports are not physical data ports in the data network, but the storage controller is operated to cause the virtual ports to appear to the host processors to be physical ports in the data network that provide access to the data storage and that are connected to the physical data port by a switch in the storage controller for routing storage access requests from the physical port to the virtual ports.

30. The method as claimed in claim 29, wherein the storage controller receives data from and transmits data to the network in such a way that the virtual ports and the switch are substantially compliant with Fibre-Channel network standards applicable to Fibre-Channel physical ports and Fibre-Channel fabric.

31. The method as claimed in claim 29, wherein the storage controller responds to a name server request from the network by identifying the virtual ports and providing network addresses of the virtual ports.

32. The method as claimed in claim 29, wherein the storage controller provides access at each virtual port to only a respective assigned subset of the data storage.

33. The method as claimed in claim 32, wherein the storage controller permits no more than a respective assigned one of the host processors to access the subset of the data storage accessible from said each virtual port.

34. The method as claimed in claim 32, wherein the storage controller assigns a host processor to each virtual port and establishes a respective mapping at said each virtual port between logical unit numbers addressable by the assigned host processor and corresponding storage volumes which the assigned host processor may access from said each virtual port.

35. The method as claimed in claim 32, wherein the program is executable by the storage controller to assign a respective set of the virtual ports to each host processor, and to permit each host processor to access the subset of the data storage accessible from said each virtual port only when the respective set of virtual ports assigned to said each host processor contains said each virtual port.

36. The method as claimed in claim 35, wherein the storage controller reports to a host processor the virtual ports from which the host processor may access the data storage, and the subset of the data storage that the host processor may access from each of the virtual ports from which the host processor may access the data storage.

37. The method as claimed in claim 29, wherein the storage controller assigns a respective set of virtual ports to each host processor, and permits said each host processor to access the storage from each virtual port only when the respective set of virtual ports assigned to said each host processor contains said each virtual port.

38. The method as claimed in claim 37, wherein the storage controller permits only one respective assigned host processor to access the data storage from each virtual port.

39. The method as claimed in claim 37, wherein the storage controller assigns to at least one host processor a first virtual port from which said at least one host processor can access private storage that is not shared with any other host processor, and to assign to said at least one host processor a second virtual port from which said at least one host processor can access storage that is shared with another host processor.

40. The method as claimed in claim 29, wherein the storage controller maintains a directory of the virtual ports, wherein the directory includes an indication of whether or not only private storage is accessible from each virtual port, and the storage controller responds to a storage access request for access to specified storage accessible from said each virtual port by checking said indication, and if said indication does not indicate that only private storage is accessible from said each virtual port, then accessing a storage locking facility to check whether or not the specified storage is already locked, and if said indication indicates that only private storage is accessible from said each virtual port, then not accessing the storage locking facility for checking whether or not the specified storage is already locked.

* * * * *

UNITED STATES PATENT AND TRADEMARK OFFICE
CERTIFICATE OF CORRECTION

PATENT NO. : 6,988,130 B2
DATED : January 17, 2006
INVENTOR(S) : Steven M. Blumenau and Yoav Raz It is certified that error appears in the above-identified patent and that said Letters Patent is hereby corrected as shown below:

<u>Column 44,</u>
Line 19, delete "as sign" and insert -- assign --.

Signed and Sealed this

Fourth Day of April, 2006

JON W. DUDAS
*Director of the United States Patent and Trademark Office*